US012762007B2

(12) United States Patent
Grigoryan et al.

(10) Patent No.: US 12,762,007 B2
(45) Date of Patent: Oct. 13, 2026

(54) MACHINE LEARNING METHODS AND SYSTEMS FOR DISCOVERING PROBLEM INCIDENTS IN A DISTRIBUTED COMPUTER SYSTEM

(71) Applicant: VMware LLC, Palo Alto, CA (US)

(72) Inventors: Naira Movses Grigoryan, Yerevan (AM); Ashot Nshan Harutyunyan, Yerevan (AM); Arnak Poghosyan, Yerevan (AM); Nicholas Kushmerick, Seattle, WA (US); Janislav Jankov, San Jose, CA (US)

(73) Assignee: VMware LLC, Palo Alto, CA (US)

(*) Notice: Subject to any disclaimer, the term of this patent is extended or adjusted under 35 U.S.C. 154(b) by 620 days.

(21) Appl. No.: 17/342,423

(22) Filed: Jun. 8, 2021

(65) Prior Publication Data

US 2022/0391279 A1 Dec. 8, 2022

(51) Int. Cl.

| | |
|---|---|
| ***G06F 11/00*** | (2006.01) |
| ***G06F 11/07*** | (2006.01) |
| ***G06F 16/28*** | (2019.01) |
| ***G06N 5/04*** | (2023.01) |
| ***G06N 20/00*** | (2019.01) |

(52) U.S. Cl.

CPC ...... *G06F 11/0793* (2013.01); *G06F 11/0709* (2013.01); *G06F 11/0757* (2013.01); *G06F 11/076* (2013.01); *G06F 16/285* (2019.01); *G06N 5/04* (2013.01); *G06N 20/00* (2019.01)

(58) Field of Classification Search

CPC ............ G06F 11/0793; G06F 11/0709; G06F 11/0757; G06F 11/076; G06F 11/3006; G06F 11/0754; G06F 11/0751; G06F 11/3612; G06F 11/3466

See application file for complete search history.

(56) References Cited

U.S. PATENT DOCUMENTS

2010/0262858 A1* 10/2010 Chen ...................... G06N 20/00 707/769

* cited by examiner

*Primary Examiner* — Bryce P Bonzo

(74) *Attorney, Agent, or Firm* — Quarles & Brady LLP

(57) ABSTRACT

Methods and systems are directed to discovering problem incidents in a distributed computing system. Events corresponding to historical problems incidents for the distributed computing system are retrieved from a data base. Sets of representative events of the various historical problem incidents for the distributed computing system are determined. A runtime problem incident in the distributed computing system is characterized by runtime events. The runtime problem incident is classified as corresponding to a historical problem incident of the historical problem incidents based on the runtime events and the sets of representative events. Remedial measures used to correct the historical problem incident may be used to correct the runtime problem.

21 Claims, 50 Drawing Sheets

1902

1904 1905 1906 1910

```
log.write([$Time_date] [Thread-$X/$IP/INFO]
[com.vmware loginsight commons executor.ProcessExecutor] [ [[/usr/lib/loginsight/application/
lib/apache-cassandra-2.0.10/bin/nodetool, -h, montools-prod-loginsight.vmware com, repair]]
[$Time_date] Repair session $RS for range $range finished)
```

1908

FIG. 19

2002

2004 2005 2006

```
[2019-03-10 23:43:36.859+0000] [Thread-1822496/127 0 0 1 INFO]
[com.vmware loginsight.commons.executor.ProcessExecutor] [ [[/usr/lib/loginsight/application/
lib/apache-cassandra-2.0 10/bin/nodetool, -h, montools-prod-loginsight.vmware com, repair]]
[2015-03-10 23:43:36,716] Repair session 51312720-c77e-11e4-ad72-4769d614a3f2 for range
(-6899937477723537626, -6896547230076663429) finished]
```

FIG. 20

| | *Alert_definition_name* |
|---|---|
| $e_1$ | VM experiencing memory compression, due to memory limit |
| $e_2$ | VM has CPU contention |
| $e_3$ | VM has unexpected high memory workload |
| $e_4$ | VM has memory contention |
| $e_5$ | VM has high I/O workload |
| ⋮ | |
| $e_{\|M\|}$ | Not enough resources to start the VM |

FIG. 28A

| | *Alert_definition_name* |
|---|---|
| $e_1$ | Host has CPU contention caused by VMs |
| $e_2$ | Host has CPU contention caused by overpopulation of VMs |
| $e_3$ | Host has memory contention caused by VMs |
| $e_4$ | Host has memory contention caused by overpopulation of VMs |
| $e_5$ | Host is experiencing high number of received or transmitted packets dropped |
| ⋮ | |
| $e_{\|M\|}$ | System board sensors are reporting problems |

FIG. 28B

| | *Alert_definition_name* |
|---|---|
| $e_1$ | Fully-automated DRS-enabled cluster has CPU contention caused by VMs |
| $e_2$ | Fully-automated DRS-enabled cluster has unexpected high CPU workload |
| $e_3$ | Fully-automated DRS-enabled cluster has memory contention caused by VMs |
| $e_4$ | More than 5% of VMs in cluster have memory contention |
| $e_5$ | Fully-automated DRS-enabled cluster has unexpected high memory |
| ⋮ | |
| $e_{\|M\|}$ | vSphere HA failover resources are insufficient |

FIG. 28C $$V_x = \begin{bmatrix} 0 \\ 1 \\ 1 \\ 0 \\ 1 \\ 0 \\ 0 \\ 1 \\ 0 \\ 0 \\ 1 \end{bmatrix} \qquad V_y = \begin{bmatrix} 1 \\ 1 \\ 1 \\ 0 \\ 0 \\ 1 \\ 0 \\ 1 \\ 0 \\ 1 \\ 0 \end{bmatrix}$$
FIG. 30A
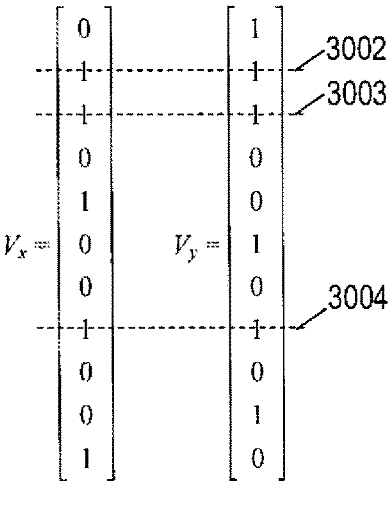
FIG. 30B
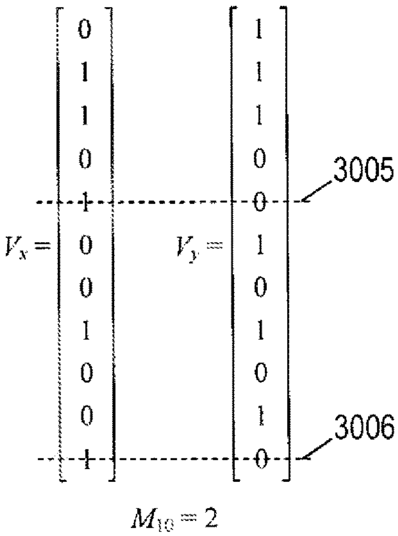
FIG. 30C
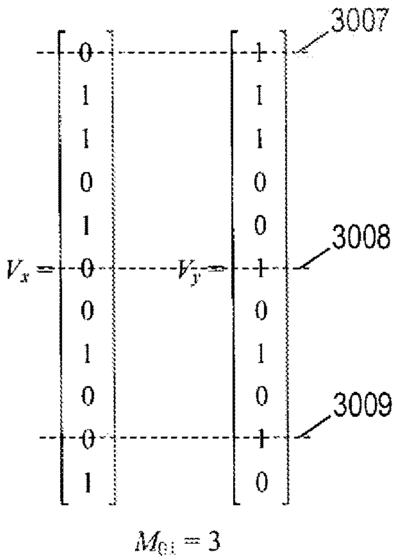
FIG. 30D
$$J(V_x, V_y) = \frac{M_{11}}{M_{01} + M_{10} + M_{11}} = \frac{3}{8}$$
$$d(V_x, V_y) = 1 - J(V_x, V_y) = 1 - \frac{3}{8} = \frac{5}{8}$$
FIG. 30E

| | $V_A$ | $V_B$ | $V_C$ | $V_D$ | $V_E$ | $V_F$ | $V_G$ |
|---|---|---|---|---|---|---|---|
| $V_A$ | 0 | .5 | .42 | 1 | .25 | .625 | .375 |
| $V_B$ | | 0 | .704 | .834 | .667 | .2 | .777 |
| $V_C$ | | | 0 | 1 | .429 | .667 | .333 |
| $V_D$ | | | | 0 | 1 | .8 | .857 |
| $V_E$ | | | | | 0 | .767 | .375 |
| $V_F$ | | | | | | 0 | .75 |
| $V_G$ | | | | | | | 0 |

| | $V_A$ | $(V_B, V_F)$ | $V_C$ | $V_D$ | $V_E$ | $V_G$ |
|---|---|---|---|---|---|---|
| $V_A$ | 0 | .5 | .42 | 1 | .25 | .375 |
| $(V_B, V_F)$ | | 0 | .667 | .8 | .667 | .75 |
| $V_C$ | | | 0 | 1 | .429 | .333 |
| $V_D$ | | | | 0 | 1 | .857 |
| $V_E$ | | | | | 0 | .375 |
| $V_G$ | | | | | | 0 |

3202 (row $(V_B, V_F)$)

3204 (entry .667)

| | $(V_A, V_E)$ | $(V_B, V_F)$ | $V_C$ | $V_D$ | $V_G$ |
|---|---|---|---|---|---|
| $(V_A, V_E)$ | 0 | .5 | .42 | 1 | .375 |
| $(V_B, V_F)$ | | 0 | .667 | .8 | .75 |
| $V_C$ | | | 0 | 1 | .333 |
| $V_D$ | | | | 0 | .857 |
| $V_G$ | | | | | 0 |

3208

3206

| | $(V_A,V_E)$ | $(V_B,V_F)$ | $(V_C,V_G)$ | $V_D$ |
|---|---|---|---|---|
| $(V_A,V_E)$ | 0 | .5 | .375 | 1 |
| $(V_B,V_F)$ | | 0 | .667 | .8 |
| $(V_C,V_G)$ | | | 0 | .857 |
| $V_D$ | | | | 0 |

| | $(V_A,V_E,V_C,V_G)$ | $(V_B,V_F)$ | $V_D$ |
|---|---|---|---|
| $(V_A,V_E,V_C,V_G)$ | 0 | .5 | .857 |
| $(V_B,V_F)$ | | 0 | .8 |
| $V_D$ | | | 0 |

| | $(V_A, V_E, V_C, V_G, V_B, V_F)$ | $V_D$ |
|---|---|---|
| $(V_A, V_E, V_C, V_G, V_B, V_F)$ | 0 | .8 |
| $V_D$ | | 0 |

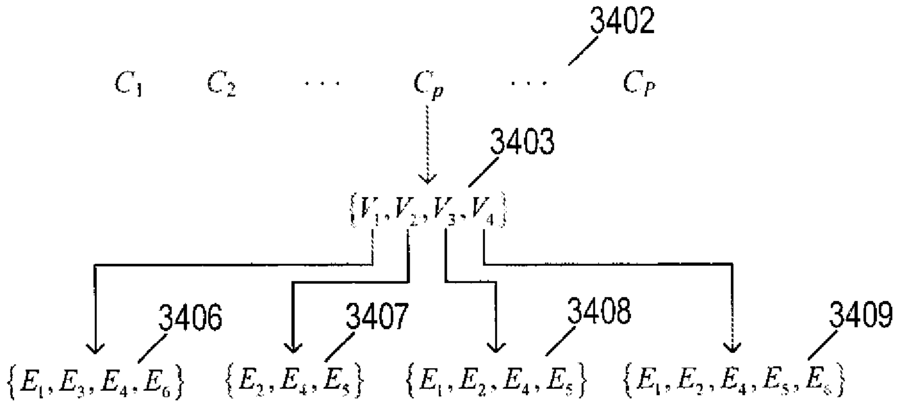
FIG. 34A
3410
| Event (3412) | $n(E_r)$ (3413) | $w_{IDF}(E_r, C_p)$ (3414) |
|---|---|---|
| $E_1$ | 3 | 0.42 |
| $E_2$ | 3 | 0.42 |
| $E_3$ | 1 | 2 |
| $E_4$ | 4 | 0 |
| $E_5$ | 3 | 0.42 |
| $E_6$ | 2 | 1 |
3416, 3418
$$W_p = \frac{1}{6}\sum_{r=1}^{6} w_{IDF}(E_r, C_p) = 0.71$$
FIG. 34B
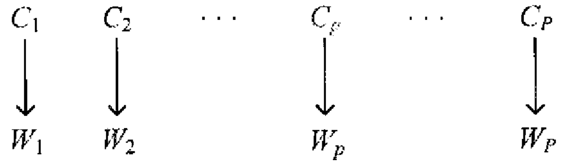
FIG. 34C 3604 3606 3602

| Event | $n(E_r)$ |
|---|---|
| $E_1$ | 3 |
| $E_2$ | 3 |
| $E_3$ | 1 |
| $E_4$ | 4 |
| $E_5$ | 3 |
| $E_6$ | 2 |

3608

Representative events: $\{E_1, E_2, E_4, E_5\}$

3812

| Clusters | No. of FV |
|---|---|
| $C_1$ | 5 |
| $C_2$ | 10 |
| $C_3$ | 0 |
| $C_4$ | 1 |
| $C_5$ | 20 |
| $C_6$ | 4 |

MACHINE LEARNING METHODS AND SYSTEMS FOR DISCOVERING PROBLEM INCIDENTS IN A DISTRIBUTED COMPUTER SYSTEM

TECHNICAL FIELD

This disclosure is directed to automated machine learning methods and systems for discovering incidents that correspond to potential problems in a distributed computing system.

BACKGROUND

In recent years, large, distributed computing systems have been built to meet the increasing demand for information technology ("IT") services. Data centers, for example, execute thousands of applications that enable businesses, governments, and other organizations to offer services over the Internet, such as providing business and web services to millions of customers. These organizations cannot afford performance problems that result in downtime or slow execution of their applications. Performance issues frustrate users, damage a brand name, result in lost revenue, and in some cases deny people access to vital services.

In order to aid system administrators and application owners with detecting performance problems in distributed computing systems, various management tools have been developed to collect and store time-series metrics, log messages, and traces of applications. Time-series metrics include CPU and memory usage, CPU latency, network traffic, and network throughput. Log messages are unstructured or semi-structured time-stamped messages that record information about the state of an operating system, application, service, or computer hardware at points in time. An application trace is a representation of a workflow executed by an application, such as the workflow of applications comprising a distributed application. Typical management tools aid users in monitoring metrics, log messages, and traces for events that are indications of problem incidents in a distributed computing system. A problem incident may be, for example, a hardware failure or a software performance problem. A single problem incident may create a variety of incidentally related problem incidents that are identified as events recorded in metrics, log messages, and application traces within a short period of time. Although management tools alert users to each event, these same tools are not able to help users timely sort through a multitude of events occurring close in time to identify events that reveal the root problem incident. In other words, many of the events recorded in metrics, log messages, and traces are indications of problem incidents that are only indirectly related to the actual problem incidents, which makes it challenging for a user to identify events that reveal the source of the problem incident. For example, a management tool that monitors a distributed application run on a cluster of server computers collects and stores terabytes of metric data, millions of log messages, and thousands of application traces each day. A memory failure in a server computer of a cluster may cause within minutes a series of events, such as packet drops, a network traffic slowdown, decrease in CPU usage, log messages describing various warnings, errors, and critical failures associated with cluster hardware and software, and a number of application traces that deviate from normal. A typical management tool reports the events as alerts in a data center dashboard of a user interface as the events occur. However, many of the alerts that point to the memory failure are typically buried in numerous alerts created by tangential problem incidents. Moreover, because the events are numerous and associated alerts are reported in rapid succession, a user is quickly overwhelmed by all the alerts, making it challenging for the user to sort through the multitude of alerts to determine one or more events that identify the memory failure. System administrators and application owners seek automated methods and systems that can rapidly discover a problem incident from a plurality of events that includes tangentially related problem incidents.

SUMMARY

Methods and systems described herein are directed to discovering problem incidents in a distributed computing system. Computer-implemented methods and system retrieve events corresponding to historical problems incidents for the distributed computing system from a database. Sets of representative events of the various historical problem incidents for the distributed computing system are determined. A runtime problem incident in the distributed computing system is characterized by runtime events. Computer-implemented methods and systems classify the runtime problem incident as corresponding to a historical problem incident of the historical problem incidents based on the runtime events and the sets of representative events. Remedial measures used to correct the historical problem incident may be used to correct the runtime problem.

DESCRIPTION OF THE DRAWINGS

FIG. 19 shows an example of a log write instruction.

FIG. 20 shows an example of a log message generated by the log write instruction in FIG. 19.

FIGS. 28A-28C show tables of example alert definition names.

FIGS. 30A-30E show calculation of a Jaccard-Needham ("JN") distance for example pair of feature vectors.

FIGS. 34A-34C show an example of calculating a set of scores that corresponds to a set of clusters.

DETAILED DESCRIPTION

This disclosure presents computer-implemented machine learning methods and systems for discovering problem incidents in a distributed computing system. In a first subsection, computer hardware, complex computational systems, and virtualization are described. Computer-implemented methods and systems for discovering problem incidents in a distributed computing system are described below in a second subsection.

Computer Hardware, Complex Computational Systems, and Virtualization

The term "abstraction" as used to describe virtualization below is not intended to mean or suggest an abstract idea or concept. Computational abstractions are tangible, physical interfaces that are implemented, ultimately, using physical computer hardware, data-storage devices, and communications system. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces.

Figure 1:
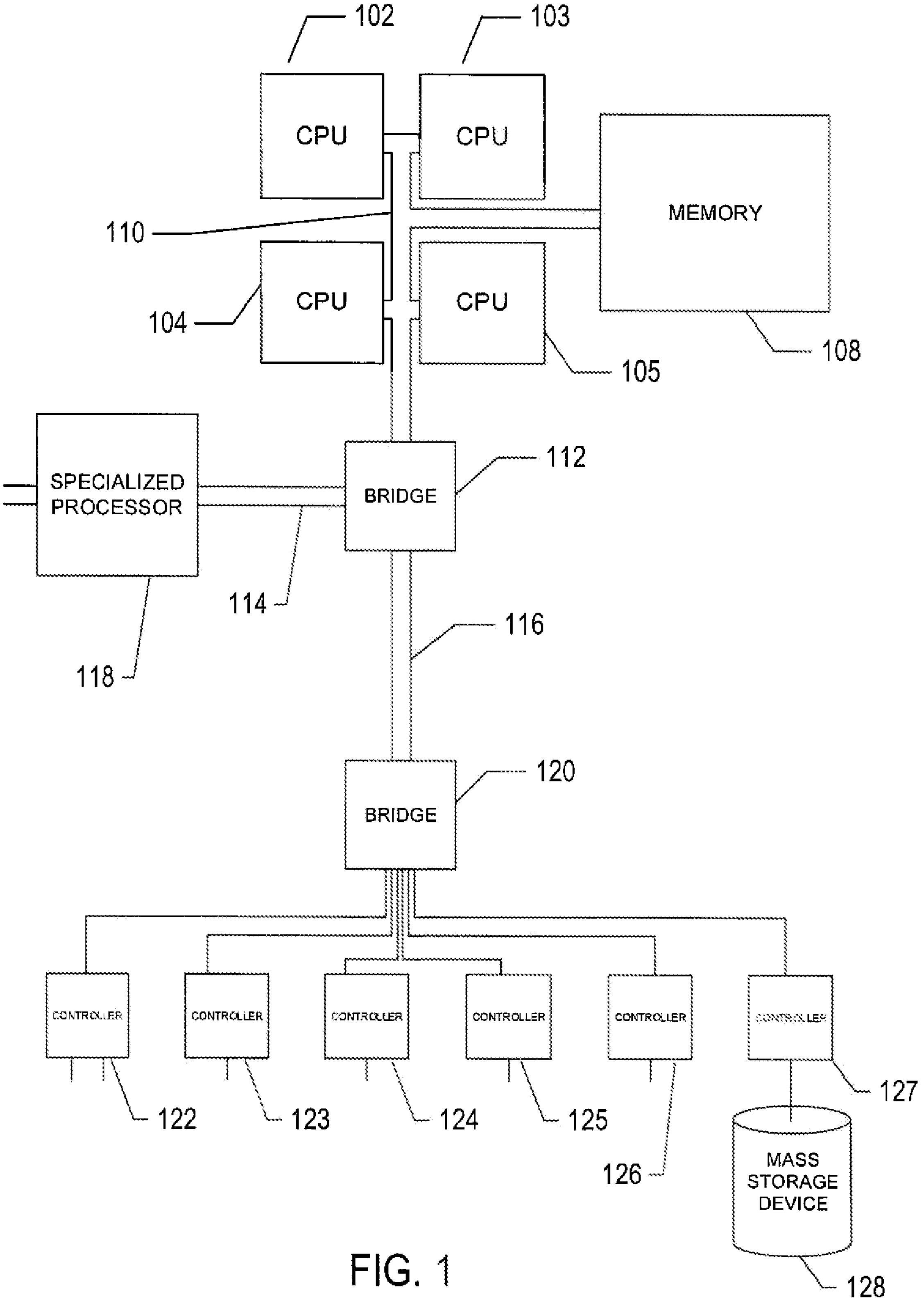
FIG. 1 shows an architectural diagram for various types of computers.

FIG. 1 shows a general architectural diagram for various types of computers. Computers that receive, process, and store log messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational devices. It should be noted that computer-readable data-storage devices include optical and electromagnetic disks, electronic memories, and other physical data-storage devices.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of server computers and workstations, and higher-end mainframe computers, but may also include a plethora of various types of special-purpose computing devices, including data-storage systems, communications routers, network nodes, tablet computers, and mobile telephones.

Figure 2:
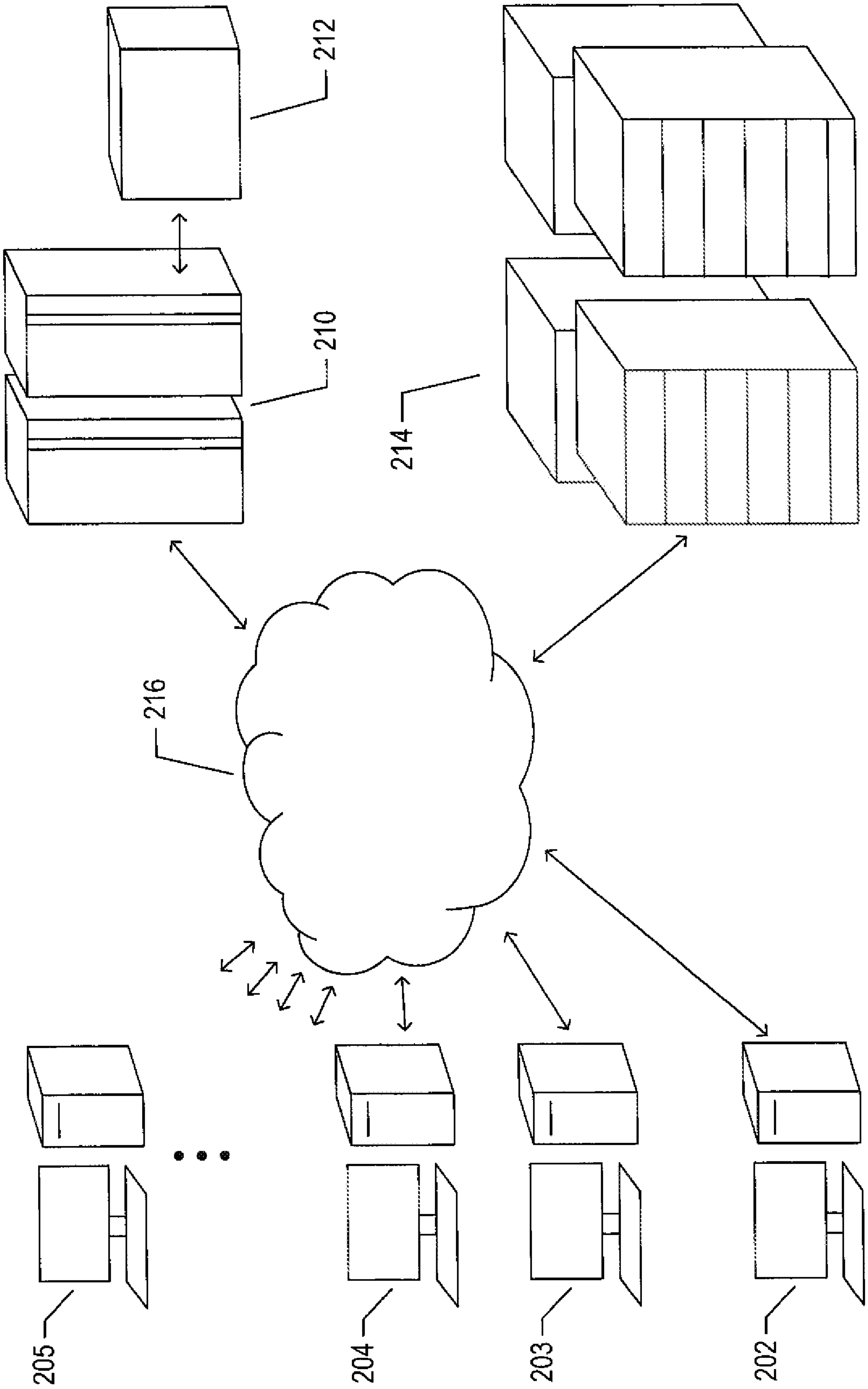
FIG. 2 shows an Internet-connected distributed computer system.

FIG. 2 shows an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted server computers or blade servers all interconnected through various communications and networking systems that together comprise the Internet 216. Such distributed computing systems provide diverse arrays of functionalities. For example, a PC user may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web server computers, back-end computer systems, and data-storage systems for serving web pages to remote customers, receiving orders through the web-page interface, processing the orders, tracking completed orders, and other myriad different tasks associated with an e-commerce enterprise.

Figure 3:
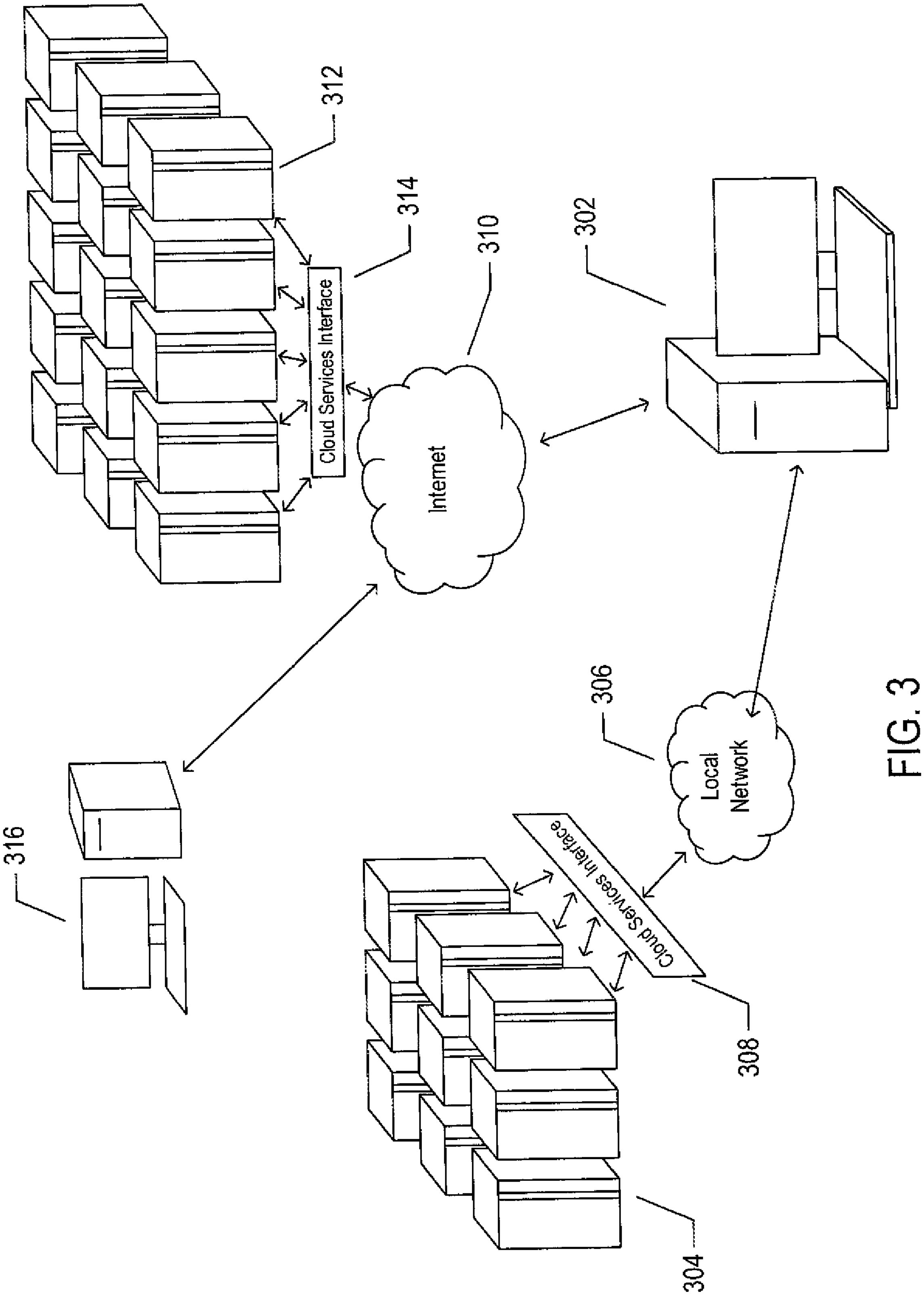
FIG. 3 shows cloud computing.

FIG. 3 shows cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of. subscribing to computing services provided by public cloud-computing service providers. In FIG. 3, a system administrator for an organization, using a PC 302, accesses the organization's private cloud 304 through a local network 306 and private-cloud interface 308 and accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the devices to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
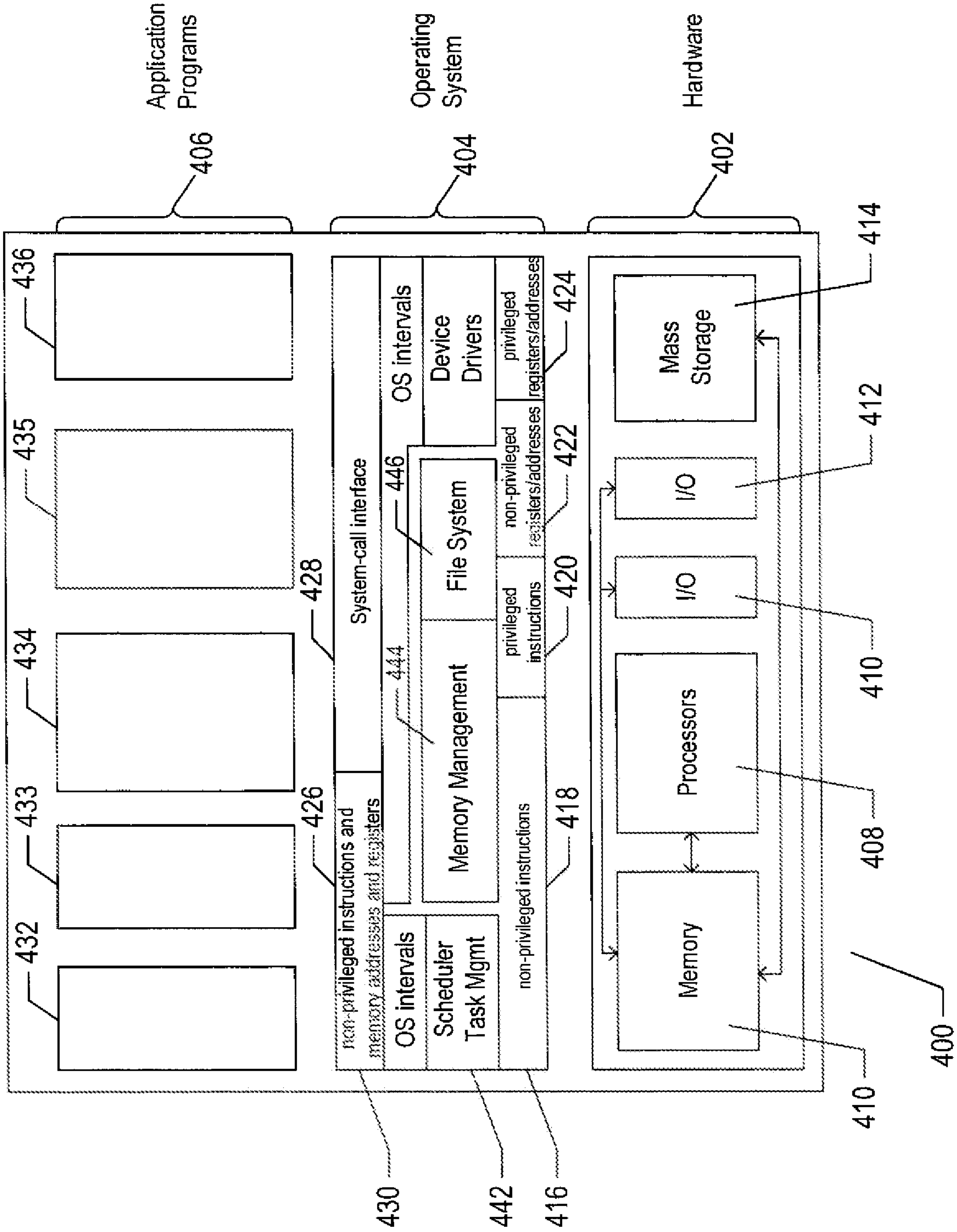
FIG. 4 shows generalized hardware and software components of a general-purpose computer system.

FIG. 4 shows generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor devices and other system devices with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 446 facilitates abstraction of mass-storage-device and memory devices as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems and can therefore be executed within only a subset of the different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
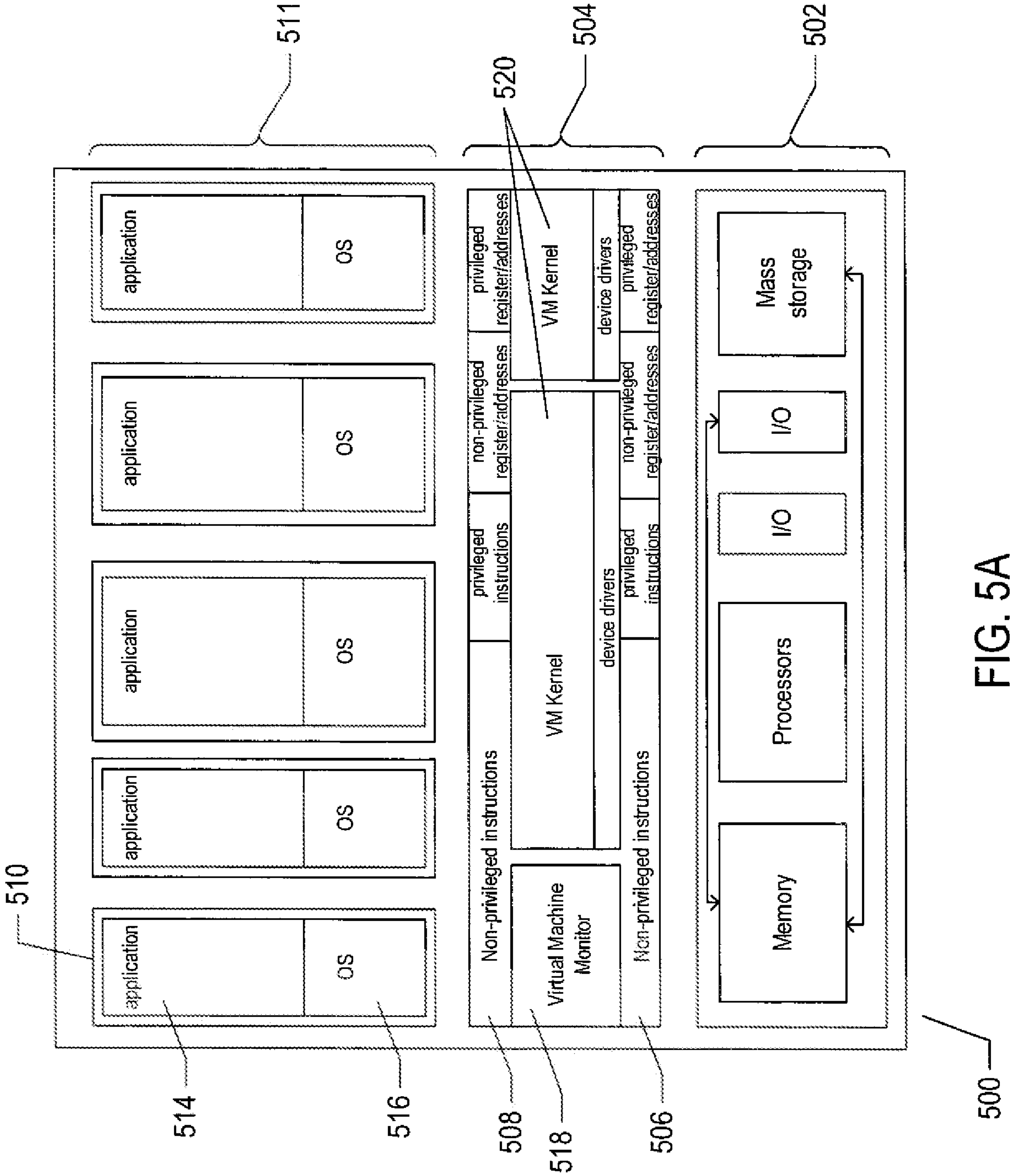
FIGS. 5A-5B show two types of virtual machines ("VMs") and VM execution environments.
Figure 5B:
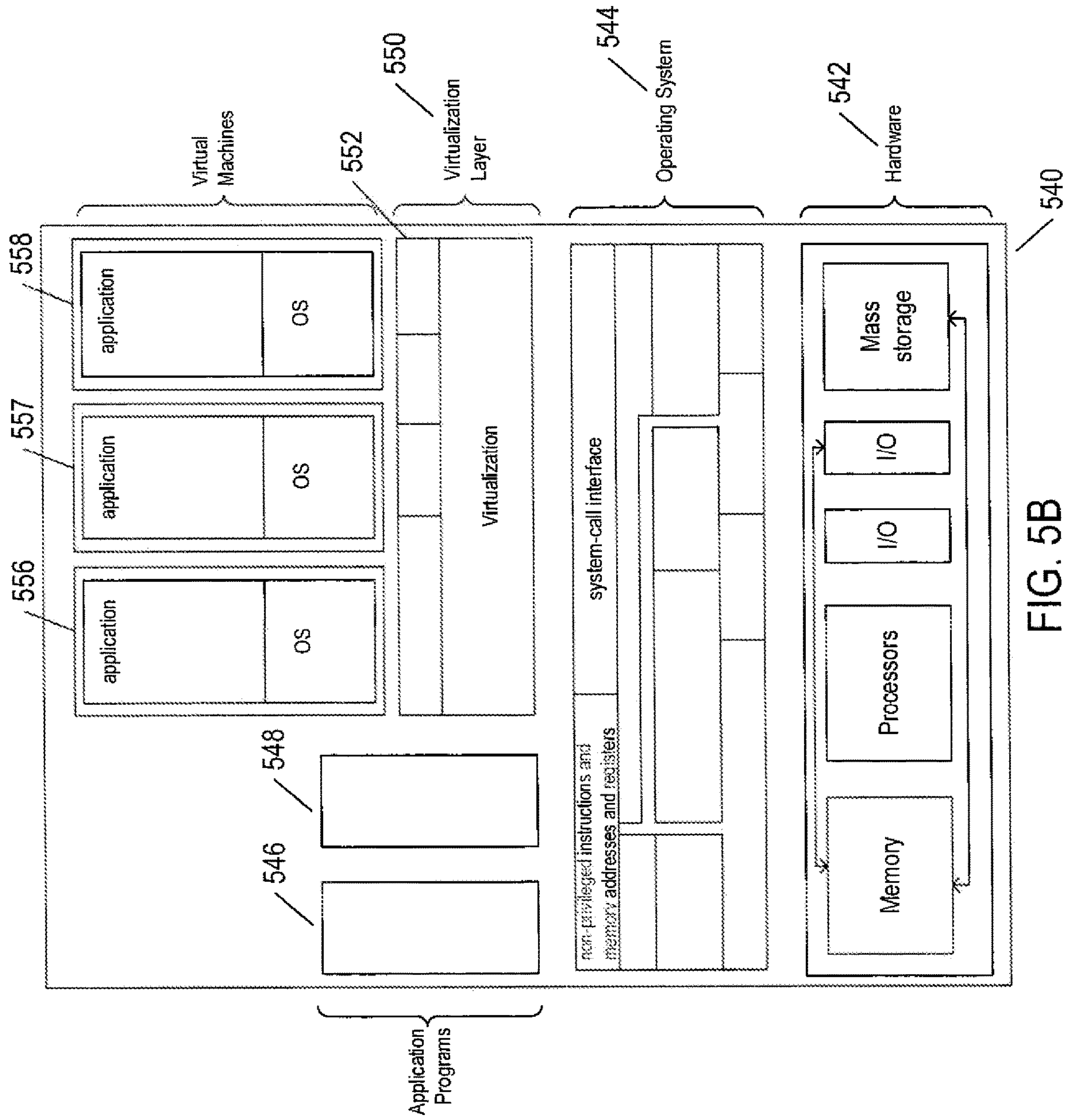

For all of these reasons, a higher level of abstraction, referred to as the "virtual machine," ("VM") has been developed and evolved to further abstract computer hardware in order to address many difficulties and challenges associated with traditional computing systems, including the compatibility issues discussed above. FIGS. 5A-B show two types of VM and virtual-machine execution environments. FIGS. 5A-B use the same illustration conventions as used in FIG. 4. FIG. 5A shows a first type of virtualization. The computer system 500 in Figure SA includes the same hardware layer 502 as the hardware layer 402 shown in FIG. 4. However, rather than providing an operating system layer directly above the hardware layer, as in FIG. 4, the virtualized computing environment shown in FIG. 5A features a virtualization layer 504 that interfaces through a virtualization-layer/hardware-layer interface 506, equivalent to interface 416 in FIG. 4, to the hardware. The virtualization layer 504 provides a hardware-like interface to VMs, such as VM 510, in a virtual-machine layer 511 executing above the virtualization layer 504. Each VM includes one or more application programs or other higher-level computational entities packaged together with an operating system, referred to as a "guest operating system," such as application 514 and guest operating system 516 packaged together within VM 510. Each VM is thus equivalent to the operating-system layer 404 and application-program layer 406 in the general-purpose computer system shown in FIG. 4. Each guest operating system within a VM interfaces to the virtualization layer interface 504 rather than to the actual hardware interface 506. The virtualization layer 504 partitions hardware devices into abstract virtual-hardware layers to which each guest operating system within a VM interfaces. The guest operating systems within the VMs, in general, are unaware of the virtualization layer and operate as if they were directly accessing a true hardware interface. The virtualization layer 504 ensures that each of the VMs currently executing within the virtual environment receive a fair allocation of underlying hardware devices and that all VMs receive sufficient devices to progress in execution. The virtualization layer 504 may differ for different guest operating systems. For example, the virtualization layer is generally able to provide virtual hardware interfaces for a variety of different types of computer hardware. This allows, as one example, a VM that includes a guest operating system designed for a particular computer architecture to run on hardware of a different architecture. The number of VMs need not be equal to the number of physical processors or even a multiple of the number of processors.

The virtualization layer 504 includes a virtual-machine-monitor module 518 ("VMM") that virtualizes physical processors in the hardware layer to create virtual processors on which each of the VMs executes. For execution efficiency, the virtualization layer attempts to allow VMs to directly execute non-privileged instructions and to directly access non-privileged registers and memory. However, when the guest operating system within a VM accesses virtual privileged instructions, virtual privileged registers, and virtual privileged memory through the virtualization layer 504, the accesses result in execution of virtualization-layer code to simulate or emulate the privileged devices. The virtualization layer additionally includes a kernel module 520 that manages memory, communications, and data-storage machine devices on behalf of executing VMs ("VM kernel"). The VM kernel, for example, maintains shadow page tables on each VM so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer 504 essentially schedules execution of VMs much like an operating system schedules execution of application programs, so that the VMs each execute within a complete and fully functional virtual hardware layer.

FIG. 5B shows a second type of virtualization. In FIG. 5B, the computer system 540 includes the same hardware layer 542 and operating system layer 544 as the hardware layer 402 and the operating system layer 404 shown in FIG. 4. Several application programs 546 and 548 are shown running in the execution environment provided by the operating system 544. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The hardware-layer interface 552, equivalent to interface 416 in FIG. 4, provides an execution environment for a number of VMs 556-558, each including one or more application programs or other higher-level computational entities packaged together with a guest operating system.

In FIGS. 5A-5B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
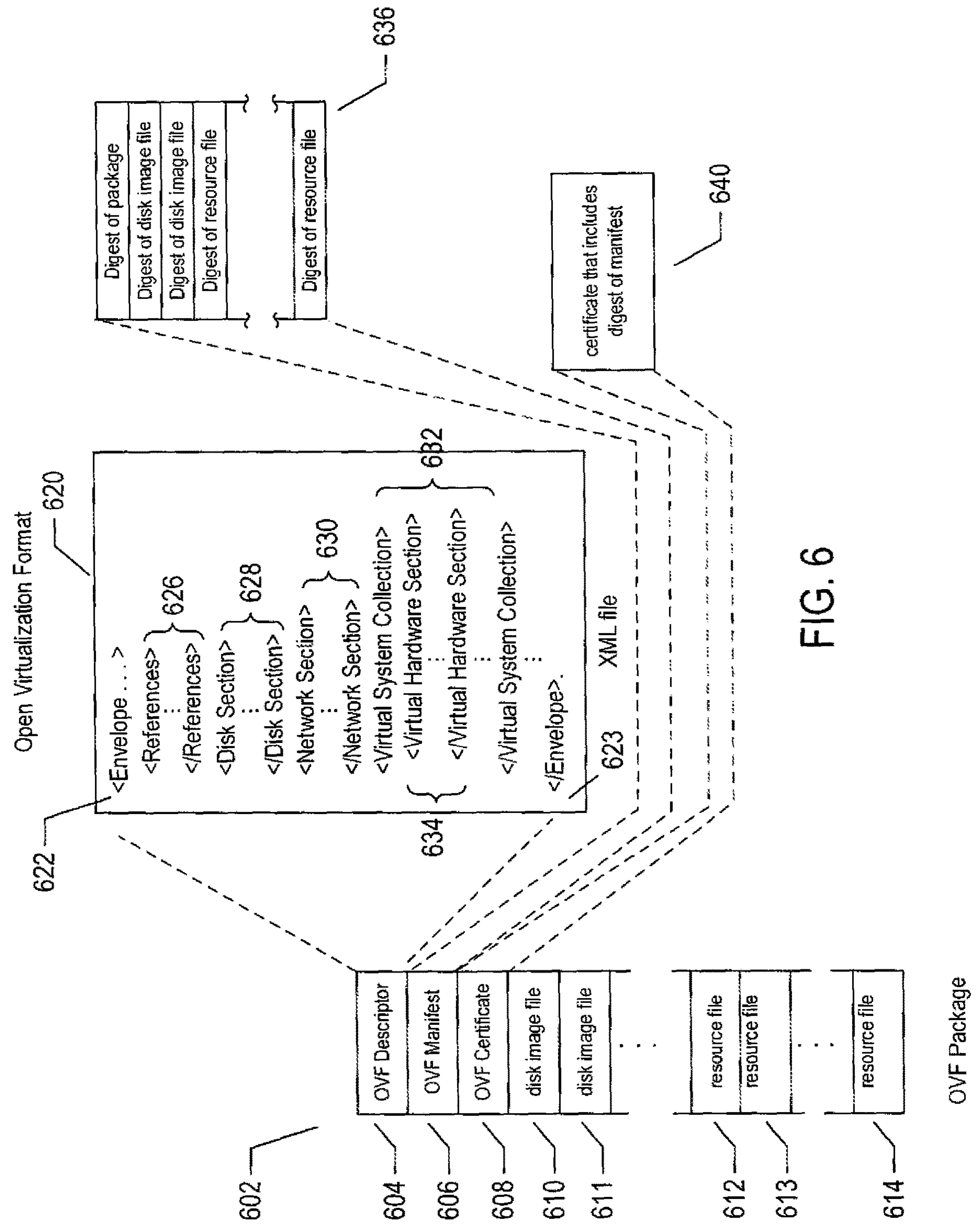
FIG. 6 shows an example of an open virtualization format package.

A VM or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a VM within one or more data files. FIG. 6 shows an OVF package. An OVF package 602 includes an OVF descriptor 604, an OVF manifest 606, an OVF certificate 608, one or more disk-image files 610-611, and one or more device files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a network section 630 that includes meta information about all of the logical networks included in the OVF package, and a collection of virtual-machine configurations 632 which further includes hardware descriptions of each VM 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and device files 612 are digitally encoded content, such as operating-system images. A VM or a collection of VMs encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more VMs that is encoded within an OVF package.

The advent of VMs and virtual environments has alleviated many of the difficulties and challenges associated with traditional general-purpose computing. Machine and operating-system dependencies can be significantly reduced or eliminated by packaging applications and operating systems together as VMs and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers.

Figure 7:
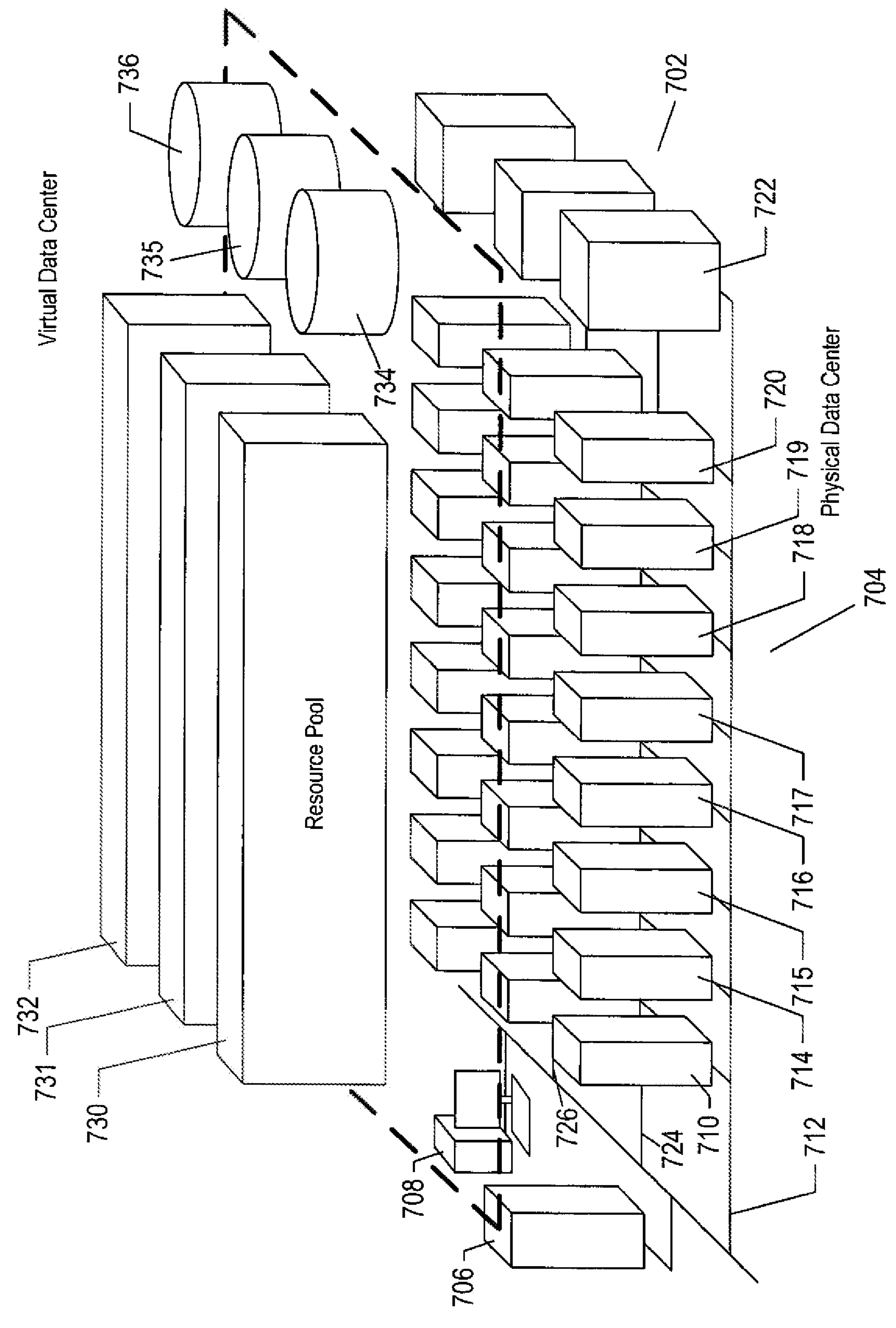
FIG. 7 shows examples of virtual data centers provided as an abstraction of underlying physical-data-center hardware components.

FIG. 7 shows virtual data centers provided as an abstraction of underlying physical-data-center hardware components. In FIG. 7, a physical data center 702 is shown below a virtual-interface plane 704. The physical data center consists of a virtual-data-center management server computer 706 and any of various different computers, such as PC 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight server computers and a mass-storage array. The individual server computers, such as server computer 710, each includes a virtualization layer and runs multiple VMs. Different physical data centers may include many different types of computers, networks, data-storage systems and devices connected according to many different types of connection topologies. The virtual-interface plane 704, a logical abstraction layer shown by a plane in FIG. 7, abstracts the physical data center to a virtual data center comprising one or more device pools, such as device pools 730-732, one or more virtual data stores, such as virtual data stores 734-736, and one or more virtual networks. In certain implementations, the device pools abstract banks of server computers directly interconnected by a local area network.

The virtual-data-center management interface allows provisioning and launching of VMs with respect to device pools, virtual data stores, and virtual networks, so that virtual-data-center administrators need not be concerned with the identities of physical-data-center components used to execute particular VMs. Furthermore, the virtual-data-center management server computer 706 includes functionality to migrate running VMs from one server computer to another in order to optimally or near optimally manage device allocation, provides fault tolerance, and high availability by migrating VMs to most effectively utilize underlying physical hardware devices, to replace VMs disabled by physical hardware problems and failures, and to ensure that multiple VMs supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of VMs and virtual appliances as well as to provide high-level, distributed functionalities that involve pooling the devices of individual server computers and migrating VMs among server computers to achieve load balancing, fault tolerance, and high availability.

Figure 8:
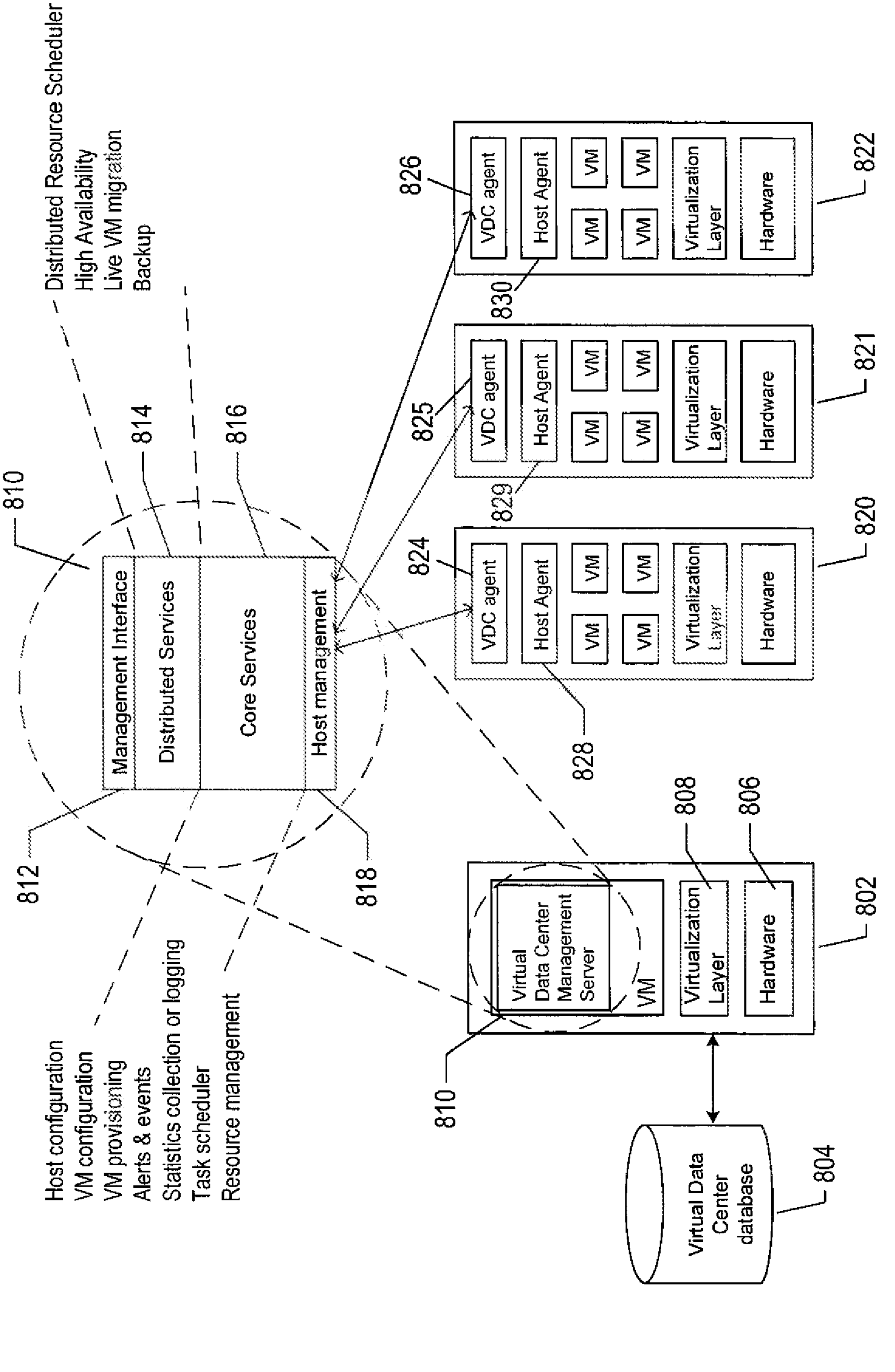
FIG. 8 shows virtual-machine components of a virtual-data-center management server and physical servers of a physical data center.

FIG. 8 shows virtual-machine components of a virtual-data-center management server computer and physical server computers of a physical data center above which a virtual-data-center interface is provided by the virtual-data-center management server computer. The virtual-data-center management server computer 802 and a virtual-data-center database 804 comprise the physical components of the management component of the virtual data center. The virtual-data-center management server computer 802 includes a hardware layer 806 and virtualization layer 808 and runs a virtual-data-center management-server VM 810 above the virtualization layer. Although shown as a single server computer in FIG. 8, the virtual-data-center management server computer ("VDC management server") may include two or more physical server computers that support multiple VDC-management-server virtual appliances. The virtual-data-center management-server VM 810 includes a management-interface component 812, distributed services 814, core services 816, and a host-management interface 818. The host-management interface 818 is accessed from any of various computers, such as the PC 708 shown in FIG. 7. The host-management interface 818 allows the virtual-data-center administrator to configure a virtual data center, provision VMs, collect statistics and view log files for the virtual data center, and to carry out other, similar management tasks. The host-management interface 818 interfaces to virtual-data-center agents 824, 825, and 826 that execute as VMs within each of the server computers of the physical data center that is abstracted to a virtual data center by the VDC management server computer.

The distributed services 814 include a distributed-device scheduler that assigns VMs to execute within particular physical server computers and that migrates VMs in order to most effectively make use of computational bandwidths, data-storage capacities, and network capacities of the physical data center. The distributed services 814 further include a high-availability service that replicates and migrates VMs in order to ensure that VMs continue to execute despite problems and failures experienced by physical hardware components. The distributed services 814 also include a live-virtual-machine migration service that temporarily halts execution of a VM, encapsulates the VM in an OVF package, transmits the OVF package to a different physical server computer, and restarts the VM on the different physical server computer from a virtual-machine state recorded when execution of the VM was halted. The distributed services 814 also include a distributed backup service that provides centralized virtual-machine backup and restore.

The core services 816 provided by the VDC management server VM 810 include host configuration, virtual-machine configuration, virtual-machine provisioning, generation of virtual-data-center alerts and events, ongoing event logging and statistics collection, a task scheduler, and a device-management module. Each physical server computers 820-822 also includes a host-agent VM 828-830 through which the virtualization layer can be accessed via a virtual-infrastructure application programming interface ("API"). This interface allows a remote administrator or user to manage an individual server computer through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server computer. The virtual-data-center agents relay and enforce device allocations made by the VDC management server VM 810, relay virtual-machine provisioning and configuration-change commands to host agents, monitor and collect performance statistics, alerts, and events communicated to the virtual-data-center agents by the local host agents through the interface API, and to carry out other, similar virtual-data-management asks.

The virtual-data-center abstraction provides a convenient and efficient level of abstraction for exposing the computational devices of a cloud-computing facility to cloud-computing-infrastructure users. A cloud-director management server exposes virtual devices of a cloud-computing facility to cloud-computing-infrastructure users. In addition, the cloud director introduces a multi-tenancy layer of abstraction, which partitions VDCs into tenant-associated VDCs that can each be allocated to an individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
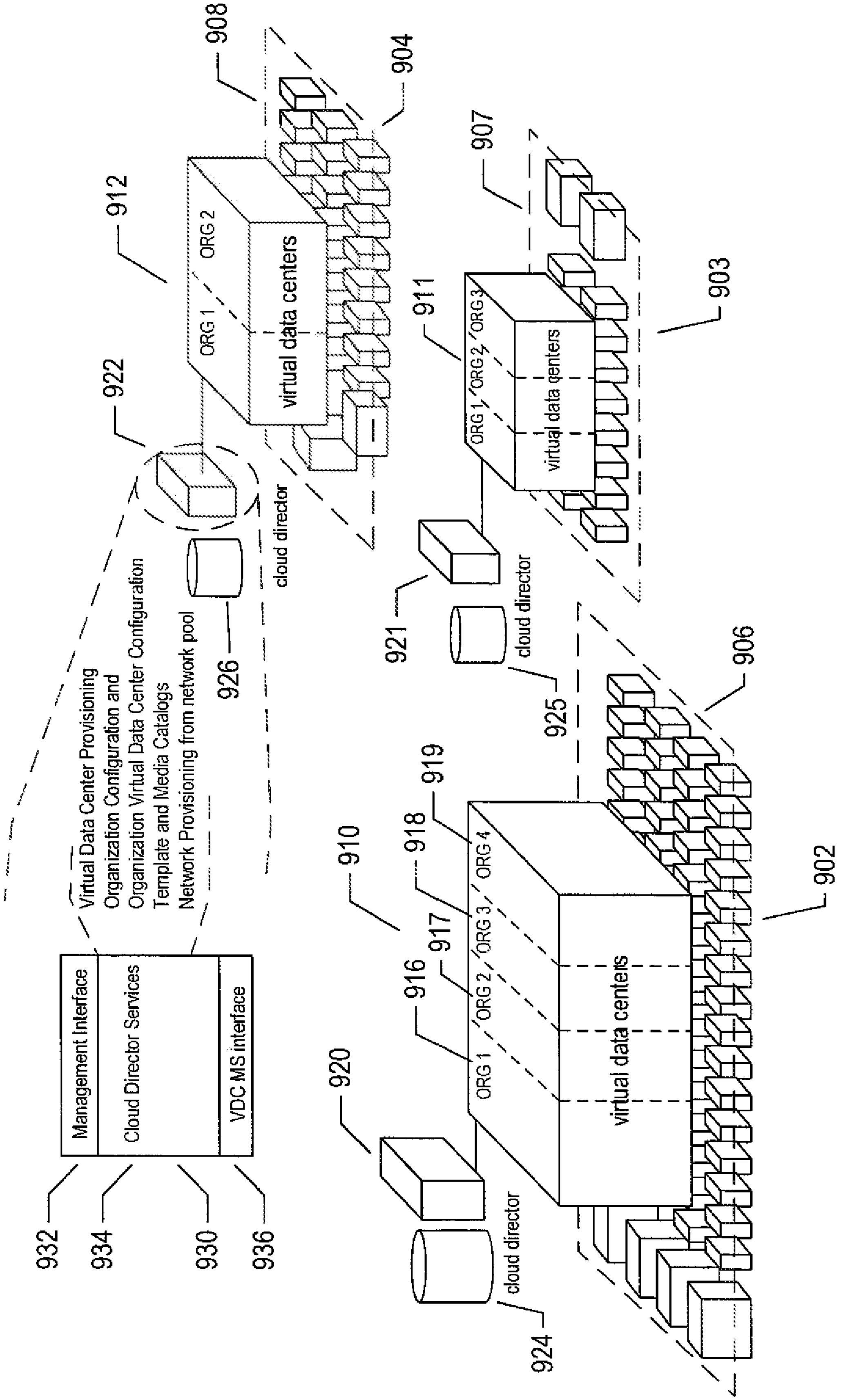
FIG. 9 shows a cloud-director level of abstraction.

FIG. 9 shows a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The devices of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director server computers 920-922 and associated cloud-director databases 924-926. Each cloud-director server computer or server computers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are VMs that each contains an OS and/or one or more VMs containing applications. A template may include much of the detailed contents of VMs and virtual appliances that are encoded within OVF packages, so that the task of configuring a VM or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
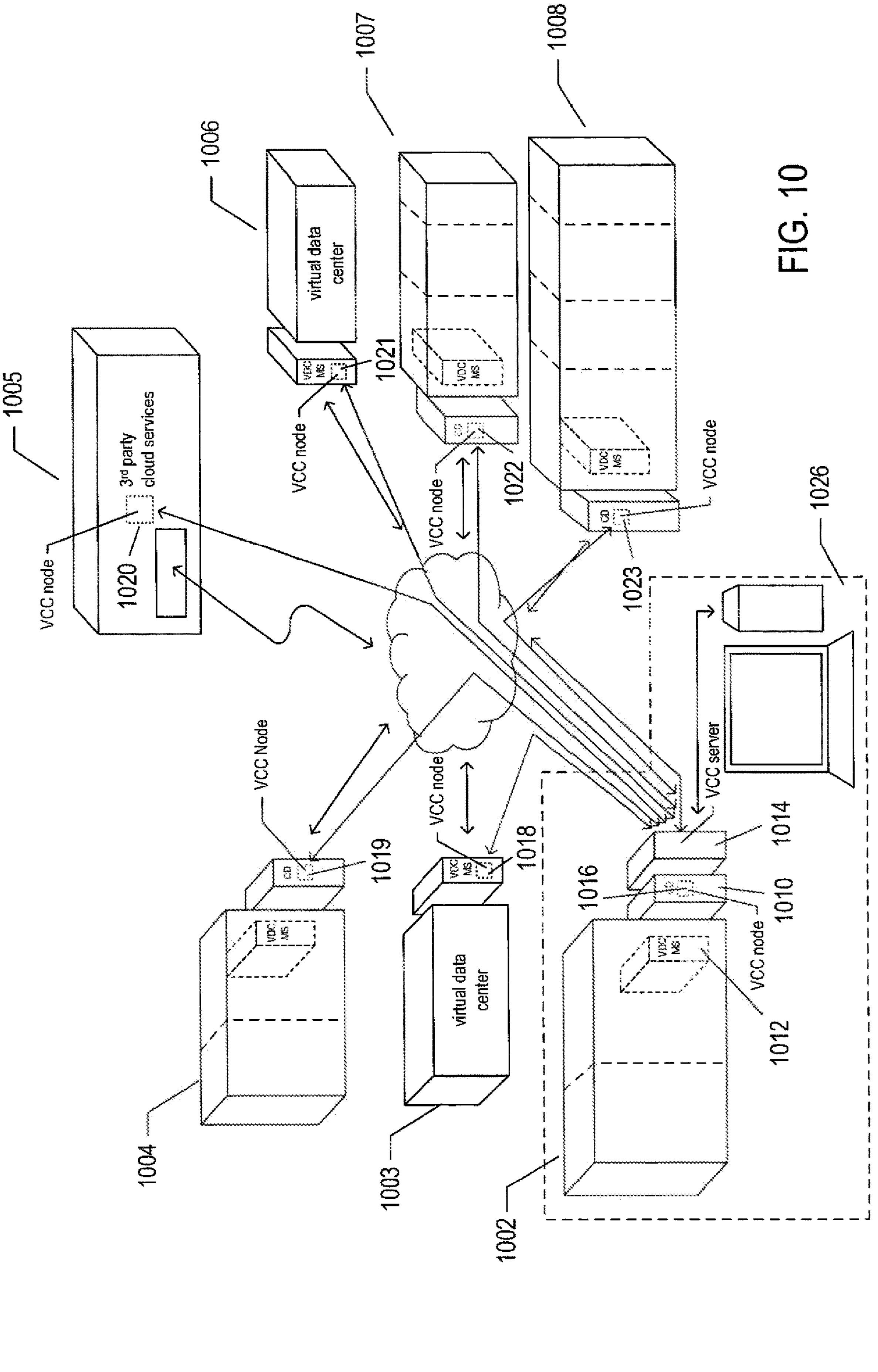
FIG. 10 shows virtual-cloud-connector nodes.

FIG. 10 shows virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are shown 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

As mentioned above, while the virtual-machine-based virtualization layers, described in the previous subsection, have received widespread adoption and use in a variety of different environments, from personal computers to enormous distributed computing systems, traditional virtualization technologies are associated with computational overheads. While these computational overheads have steadily decreased, over the years, and often represent ten percent or less of the total computational bandwidth consumed by an application running above a guest operating system in a virtualized environment, traditional virtualization technologies nonetheless involve computational costs in return for the power and flexibility that they provide.

While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system of the host. In essence, OSL virtualization uses operating-system features, such as namespace isolation, to isolate each container from the other containers running on the same host. In other words, namespace isolation ensures that each application is executed within the execution environment provided by a container to be isolated from applications executing within the execution environments provided by the other containers. A container cannot access files that are not included in the container's namespace and cannot interact with applications running in other containers. As a result, a container can be booted up much faster than a VM, because the container uses operating-system-kernel features that are already available and functioning within the host. Furthermore, the containers share computational bandwidth, memory, network bandwidth, and other computational resources provided by the operating system, without the overhead associated with computational resources allocated to VMs and virtualization layers. Again, however, OSL virtualization does not provide many desirable features of traditional virtualization. As mentioned above, OSL virtualization does not provide a way to run different types of operating systems for different groups of containers within the same host and OSL-virtualization does not provide for live migration of containers between hosts, high-availability functionality, distributed resource scheduling, and other computational functionality provided by traditional virtualization technologies.

Figure 11:
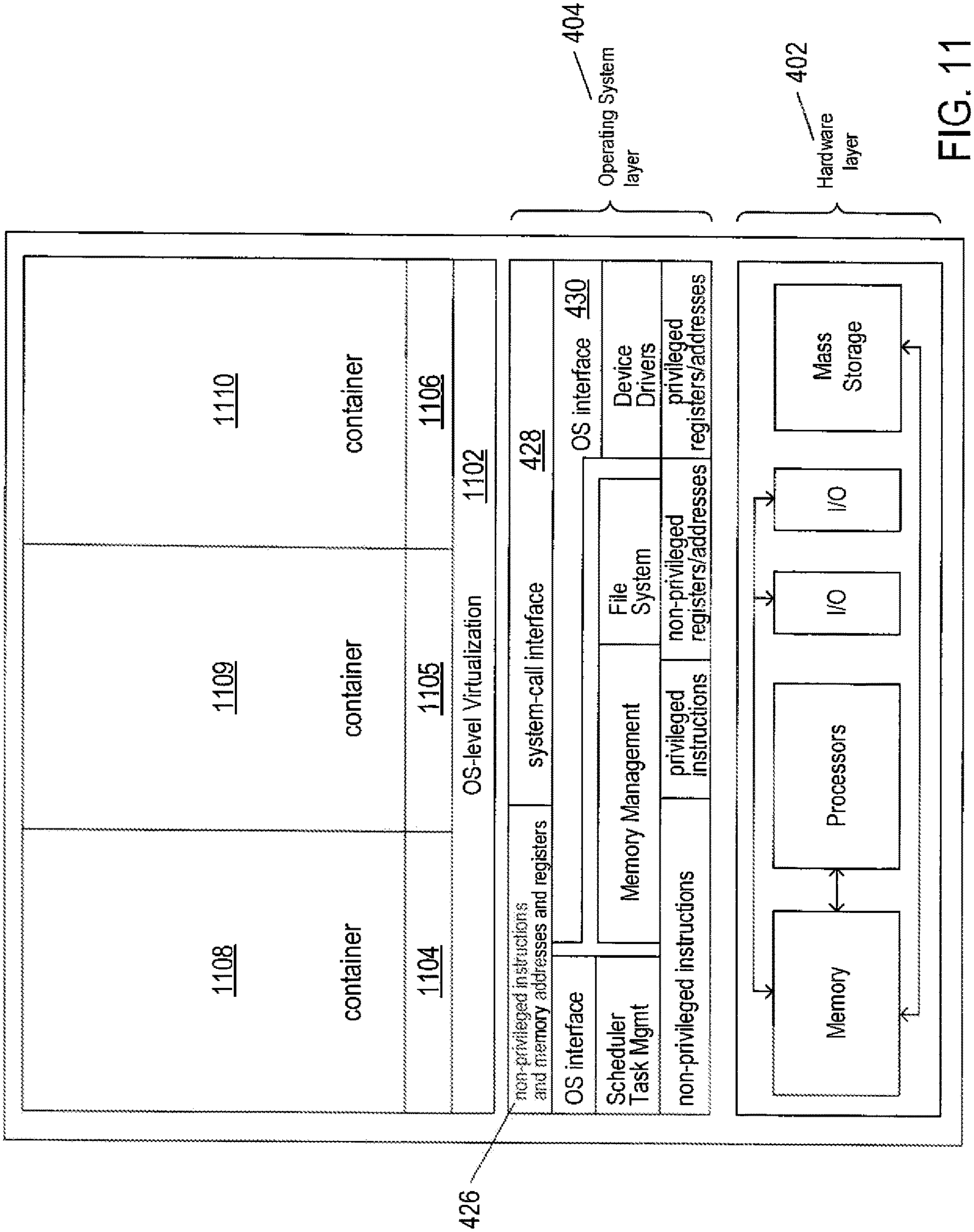
FIG. 11 shows an example server computer used to host three containers.

FIG. 11 shows an example server computer used to host three containers. As discussed above with reference to FIG. 4, an operating system layer 404 runs above the hardware 402 of the host computer. The operating system provides an interface, for higher-level computational entities, that includes a system-call interface 428 and the non-privileged instructions, memory addresses, and registers 426 provided by the hardware layer 402. However, unlike in FIG. 4, in which applications run directly above the operating system layer 404, OSL virtualization involves an OSL virtualization layer 1102 that provides operating-system interfaces 1104-1106 to each of the containers 1108-1110. The containers, in turn, provide an execution environment for an application that runs within the execution environment provided by container 1108. The container can be thought of as a partition of the resources generally available to higher-level computational entities through the operating system interface 430.

Figure 12:
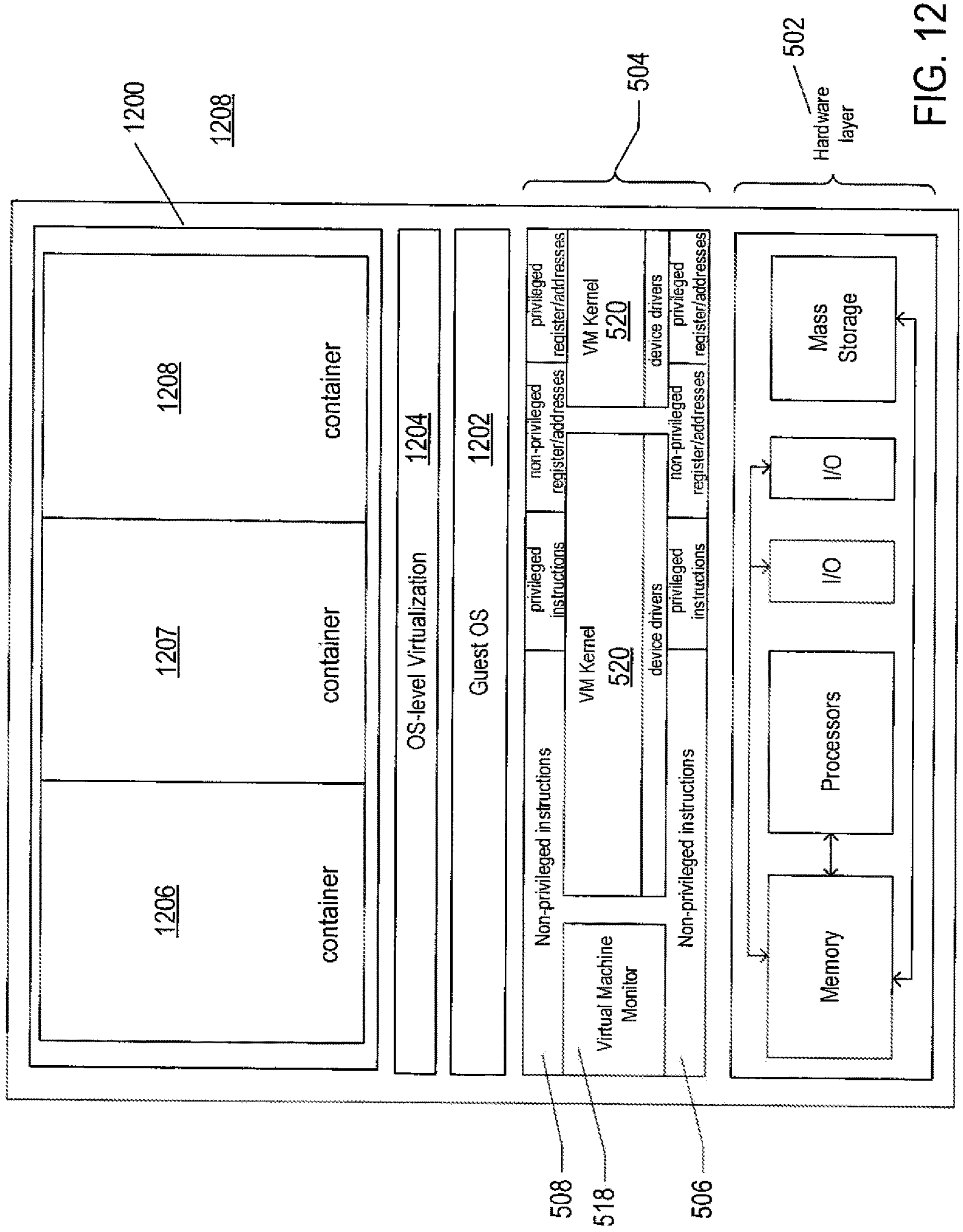
FIG. 12 shows an approach to implementing containers on a VM.

FIG. 12 shows an approach to implementing the containers on a VM. FIG. 12 shows a host computer similar to that shown in FIG. 5A, discussed above. The host computer includes a hardware layer 502 and a virtualization layer 504 that provides a virtual hardware interface 508 to a guest operating system 1102. Unlike in FIG. 5A, the guest operating system interfaces to an OSL-virtualization layer 1104 that provides container execution environments 1206-1208 to multiple application programs.

Note that, although only a single guest operating system and OSL virtualization layer are shown in FIG. 12, a single virtualized host system can run multiple different guest operating systems within multiple VMs, each of which supports one or more OSL-virtualization containers. A virtualized, distributed computing system that uses guest operating systems running within VMs to support OSL-virtualization layers to provide containers for running applications is referred to, in the following discussion, as a "hybrid virtualized distributed computing system."

Running containers above a guest operating system within a VM provides advantages of traditional virtualization in addition to the advantages of OSL virtualization. Containers can be quickly booted in order to provide additional execution environments and associated resources for additional application instances. The resources available to the guest operating system are efficiently partitioned among the containers provided by the OSL-virtualization layer 1204 in FIG. 12, because there is almost no additional computational overhead associated with container-based partitioning of computational resources. However, many of the powerful and flexible features of the traditional virtualization technology can be applied to VMs in which containers run above guest operating systems, including live migration from one host to another, various types of high-availability and distributed resource scheduling, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides for flexible and scaling over large numbers of hosts within large, distributed computing systems and a simple approach to operating-system upgrades and patches. Thus, the use of OSL virtualization above traditional virtualization in a hybrid virtualized distributed computing system, as shown in FIG. 12, provides many of the advantages of both a traditional virtualization layer and the advantages of OSL virtualization.

Figure 13:
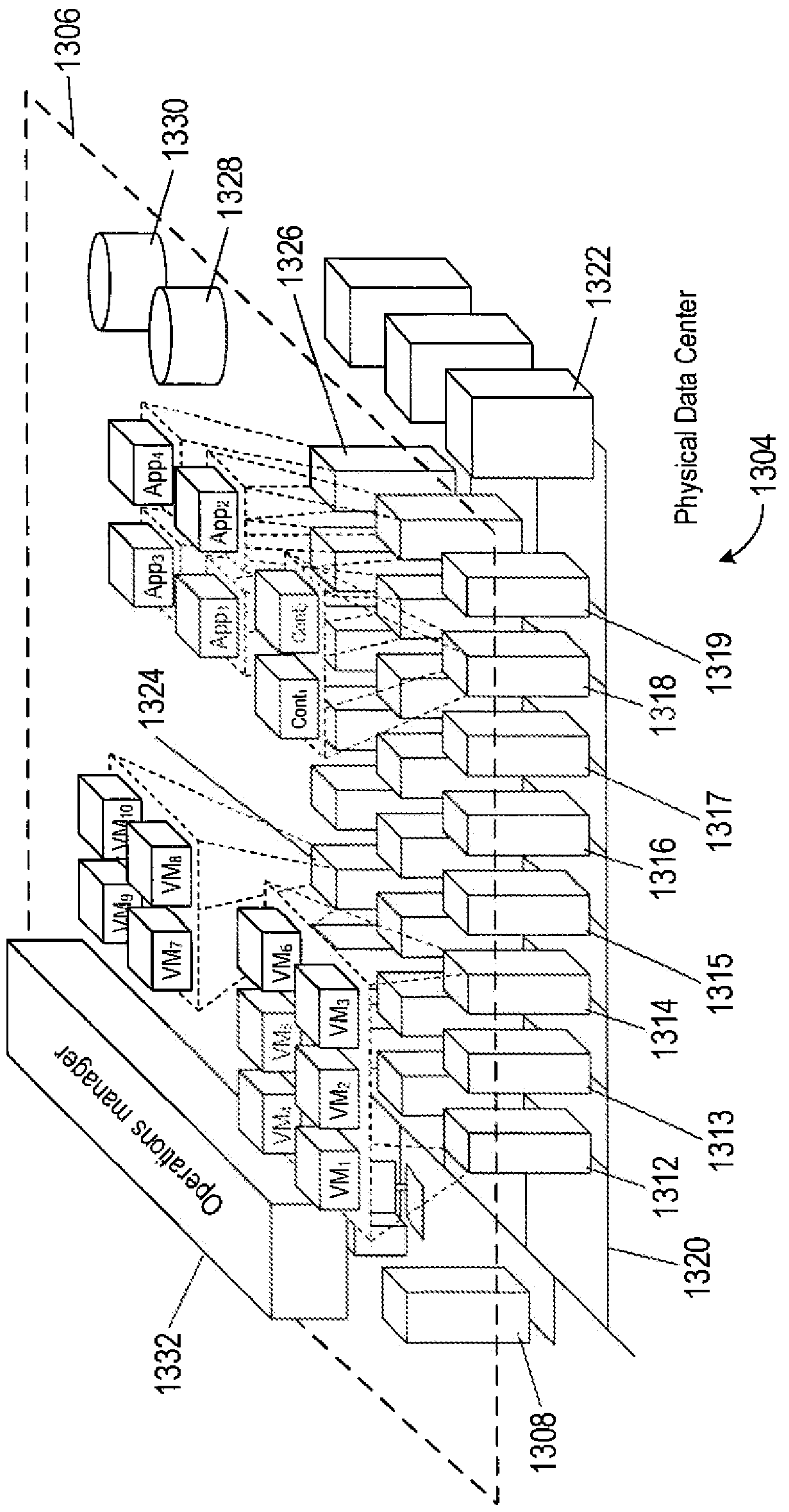
FIG. 13 shows an example of a virtualization layer located above a physical data center.

Methods and Systems for Discovering Problem Incidents in a Distributed Computing System Computer-implemented methods and systems described herein are directed to discovering problem incidents in a distributed computing system. FIG. 13 shows an example of a virtualization layer 1302 located above a physical data center 1304. For the sake of illustration, the virtualization layer 1302 is separated from the physical data center 1304 by a virtual-interface plane 1306. The physical data center 1304 is an example of a distributed computing system. The physical data center 1304 comprises physical objects, including an administration computer system 1308, any of various computers, such as PC 1310, on which a virtual data center ("VDC") management interface may be displayed to system administrators and other users, server computers, such as server computers 1312-1319, data-storage devices, and network devices. Each server computer may have multiple network interface cards ("NICs") to provide high bandwidth and networking to other server computers and data storage devices. The server computers may be networked together to form server-computer groups within the data center 1304. The example physical data center 1304 includes three server-computer groups each of which have eight server computers. For example, server-computer group 1320 comprises interconnected server computers 1312-1319 that are connected to a mass-storage array 1322. Within each server-computer group, certain server computers are grouped together to form a cluster that provides an aggregate set of resources (i.e., resource pool) to objects in the virtualization layer 1302. Different physical data centers may include many different types of computers, networks, data-storage systems, and devices connected according to many different types of connection topologies.

The virtual-interface plane 1306 abstracts the resources of the physical data center 1304 to one or more VDCs comprising the virtual objects and one or more virtual data stores, such as virtual data stores 1328 and 1330. For example, one VDC may comprise the VMs running on server computer 1324 and virtual data store 1328. The virtualization layer 1302 includes virtual objects, such as VMs, applications, and containers, hosted by the server computers in the physical data center 1304. The virtualization layer 1302 may also include a virtual network (not illustrated) of virtual switches, routers, load balancers, and NICs formed from the physical switches, routers, and NICs of the physical data center 1304. Certain server computers host VMs and containers as described above. For example, server computer 1318 hosts two containers identified as Conti and Conte; cluster of server computers 1312-1314 host six VMs identified as $VM_1$, $VM_2$, $VM_3$, $VM_4$, $VM_5$, and $VM_6$; server computer 1324 hosts four VMs identified as $VM_4$, $VM_8$, $VM_9$, Other server computers may host applications as described above with reference to FIG. 4. For example, server computer 1326 hosts an application identified as $App_4$.

Computer-implemented methods and systems described herein are executed by operations manager 1332 in one or more VMs on the administration computer system 1308. The operations manager 1332 provides several interfaces, such as graphical user interfaces, for data center management, system administrators, and application owners. The operations manager 1332 receives streams of information from objects of the data center. An "object" can be a physical object, such as a server computer and a network device, or to a virtual object, such as an application, VM, virtual network device, or a container. The operations manager 1332 receives information regarding each object of the data center. The object information includes metrics, log messages, and application traces.

Figure 14A:
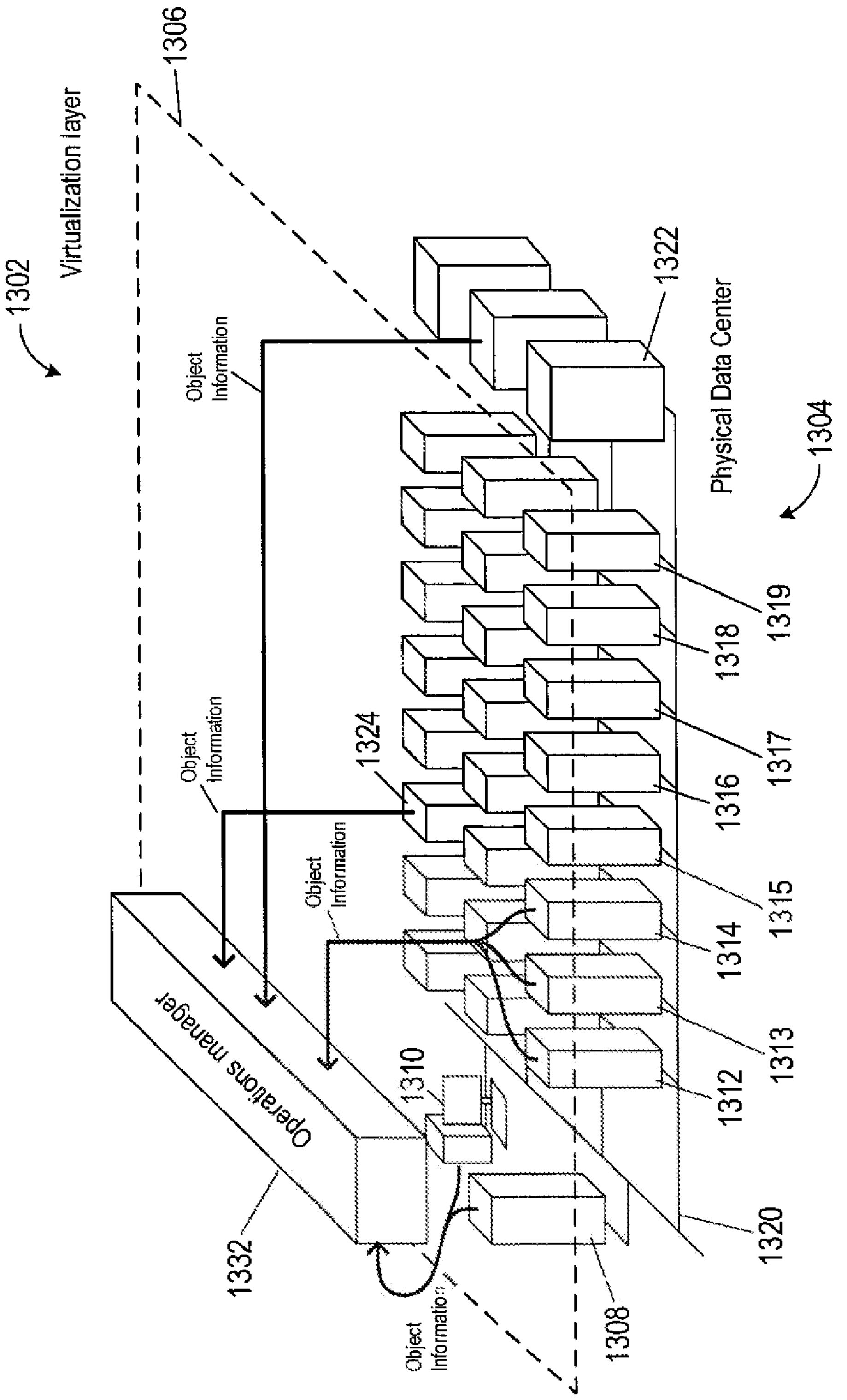
FIGS. 14A-14B show examples of an operations manager receiving object information from various physical and virtual objects.
Figure 14B:
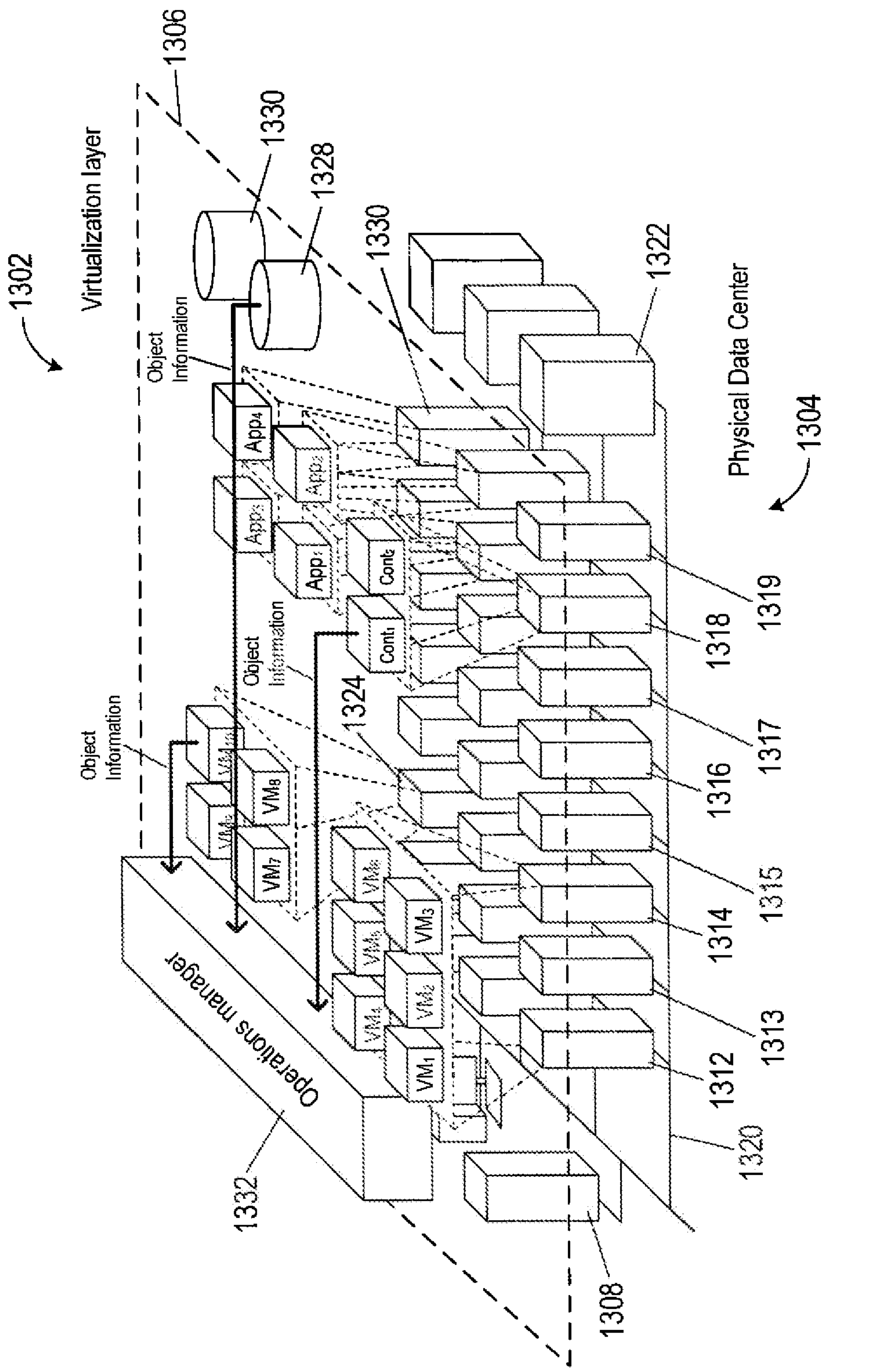

FIGS. 14A-14B show examples of the operations manager 1332 receiving object information from various physical and virtual objects. Directional arrows represent object information sent from physical and virtual resources to the operations manager 1332. In FIG. 14A, the operating systems of PC 1310, server computers 1308 and 1324, and mass-storage array 1322 send object information to the operations manager 1332. A cluster of server computers 1312-1314 send object information to the operations manager 1332. In FIG. 14B, the VMs, containers, applications, and virtual storage may independently send object information to the operations manager 1332. Certain objects may send metrics as the object information is generated while other objects may only send object information at certain times or when requested to send object information by the operations manager 1332. The operations manager 1332 collects and processes the object information as described below to sift through various types of events to detect problem incidents and may generate recommendations to correct the problem incident or automatically execute remedial measures. Remedial measures include reconfiguring a virtual network of a VDC, migrating VMs from one server computer to another, restarting server computers, replacing VMs disabled by physical hardware problems and failures, spinning up cloned VMs on additional server computers to ensure that services provided are accessible to increasing demand or when one or more of the VMs fails to run.

Event Streams

Metrics

As described above with reference to FIGS. 14A-14B, the operations manager 1332 receives numerous streams of time-dependent metric data about the performance or usage of different objects in a distributed computing system. Each stream of metric data is time-series data that may be generated by an event source, such as an operating system, a resource, or by an object itself. A stream of metric data associated with a resource comprises a sequence of time-ordered metric values that are recorded in spaced points in time called "time stamps." A stream of metric data is simply called a "metric" and is denoted by $$(x_i)_{i=1}^{N} = (x(t_i))_{i=1}^{N} \tag{1}$$

where

N is the number of metric values in a sequence of metric values;

$x_i=x(t_i)$ is a metric value;

$t_i$ is a time stamp indicating when the metric value was recorded in a data-storage device; and subscript i is a time stamp index i=1, . . . , N.

Figure 15:
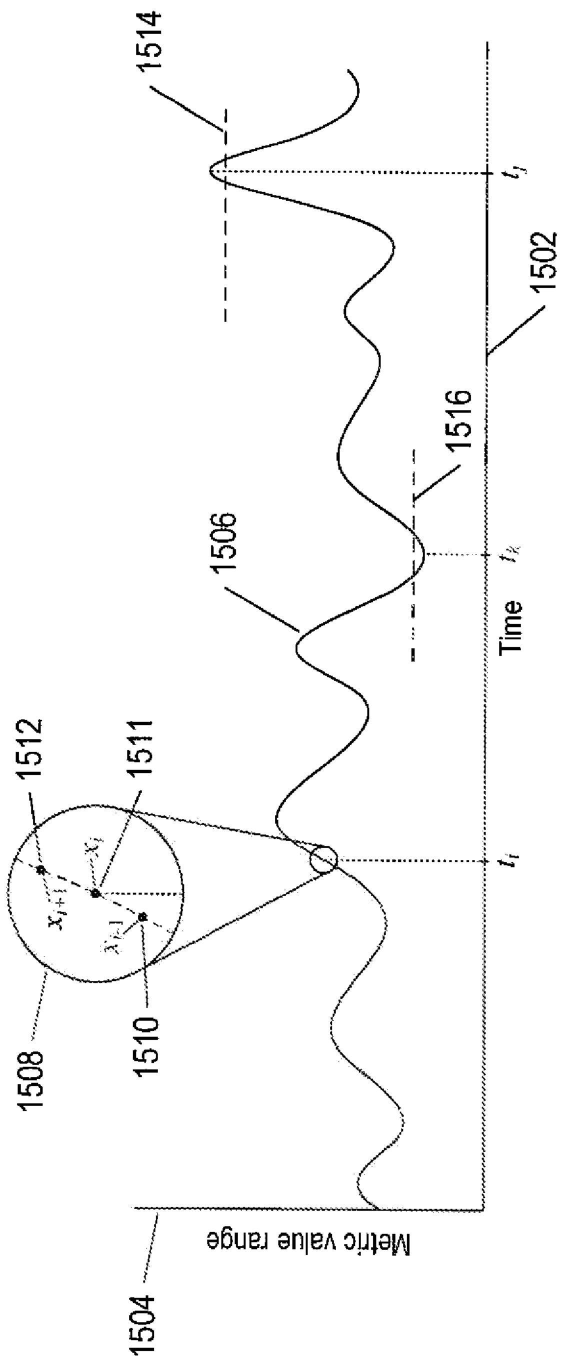
FIG. 15 shows a plot of an example of a metric.
Figure 18:
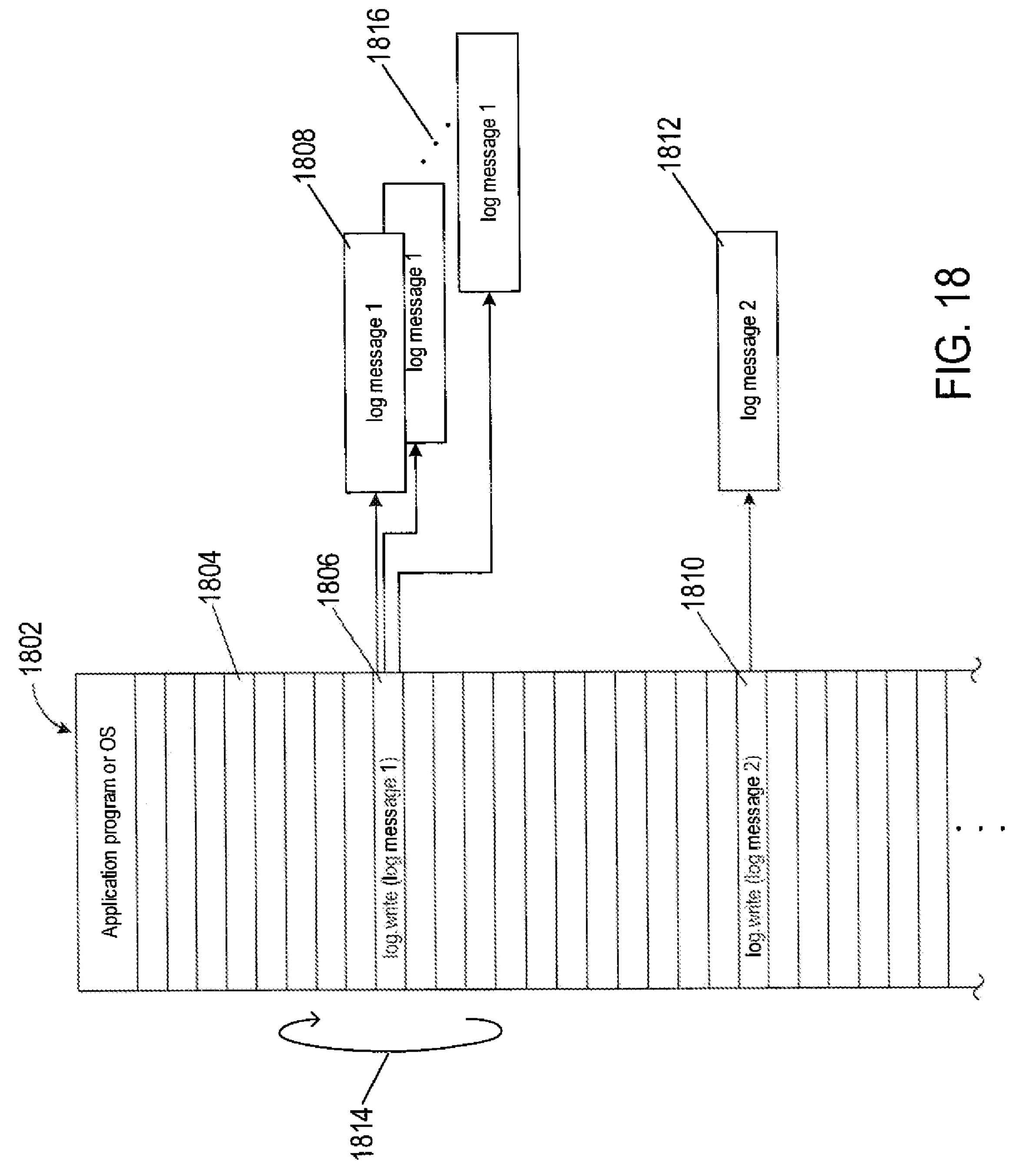
FIG. 18 shows an example source code of an event source that generates log messages.

FIG. 15 shows a plot of an example of a metric. Horizontal axis 1502 represents time. Vertical axis 1504 represents a range of metric values. Curve 1506 represents a metric as time-series data. In practice, a metric comprises a sequence of discrete metric values in which each metric value is recorded in a data-storage device. FIG. 18 includes a magnified view 1808 of three consecutive metric values represented by points. Each point represents an amplitude of the metric at a corresponding time stamp. For example, points 1810-1812 represent consecutive metric values (i.e., amplitudes) $x_{i-1}$, $x_i$, and $x_{i+1}$ recorded in a data-storage device at corresponding time stamps $t_{i-1}$, $t_i$, and $t_{i+1}$. The example metric may represent usage of a physical or virtual resource. For example, the metric may represent CPU usage of a core in a multicore processor of a server computer over time. The metric may represent the amount of virtual memory assigned to a VM over time. The metric may represent network throughput for a server computer. The metric may also represent object performance, such as CPU contention, response time to requests, and wait time for access to a resource of an object. The metric may also represent network flows, or simply net flows, used to monitor network traffic flow. Network flows include percentage of packets dropped, data transmission rate, data receiver rate, and total throughput.

Thresholds may be used to monitor metrics for events based on confidence-controlled sampling of the metrics over a period of time, such as a day, days, a week, weeks, a month, or a number of months. An event is detected when one or more metric values violate an upper threshold 1514 denoted by:

$$x_j \geq Th_{upper} \tag{2a}$$

where $Th_{upper}$ is an upper threshold; and

An event is detected when one or more metric values violates a lower threshold 1516 denoted by:

$$x_k \leq Th_{lower} \tag{2b}$$

where $Th_{lower}$ is a lower threshold.

When a threshold is violated, as described above with reference to Equations (2a) or (2b), an alert is generated, indicating that an object represented by the metric has entered an abnormal state. In one implementation, the thresholds in Equations (2a) and (2b) are time-independent thresholds. Time-independent thresholds can be determined for trendy and non-trendy randomly distributed metrics. In another implementation, the thresholds may be time-dependent, or dynamic, thresholds. Dynamic thresholds can also be determined for trendy and non-trendy periodic metric data. Time-independent thresholds may be determined as described in US Publication No. 2015/0379110A1, filed Jun. 25, 2014, which is owned by VMware Inc. and is herein incorporated by reference. Dynamic thresholds may be determined are described in U.S. Pat. No. 10,241,887, which is owned by VMware Inc. and is herein incorporated by reference.

Figure 16:
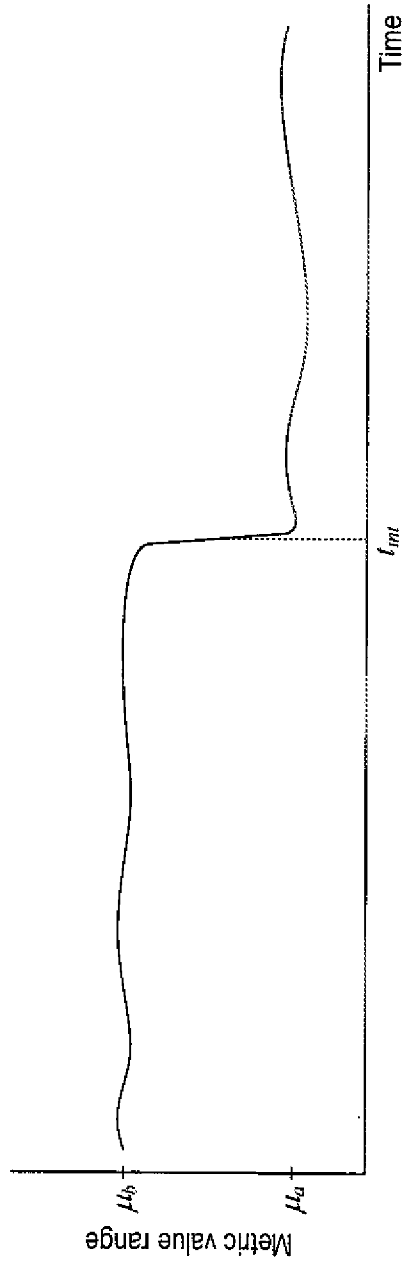
FIG. 16 shows a plot of an example metric with an event recorded as a shift in the moving average.

FIG. 16 shows a plot of an example metric in which an event is recorded when the moving average of the metric shifts. Curve 1602 represents a metric recorded over time. Prior to time, $t_{int}$, metric values are centered around a moving average $\mu_b$. After the time $t_{int}$, the moving average shifts to $\mu_a$, which, as shown in FIG. 16, indicates the metric has abruptly changed after time $t_{int}$. An abrupt change in which $|\mu_a-\mu_b|>Th_{shift}$, where $Th_{shift}$ is a shift threshold, is an event that triggers an alert.

Log Messages

A log message is an unstructured or semi-structured time-stamped message that records information about the state of an operating system, state of an application, state of a service, or state of computer hardware at a point in time and is recorded in a log file data base. Most log messages record benign events, such as input/output operations, client requests, logins, logouts, and statistical information about the execution of applications, operating systems, computer systems, and other devices of a data center. Other log messages, record critical events that describe problem incidents, such as alarms, warnings, errors, or emergencies.

Figure 17:
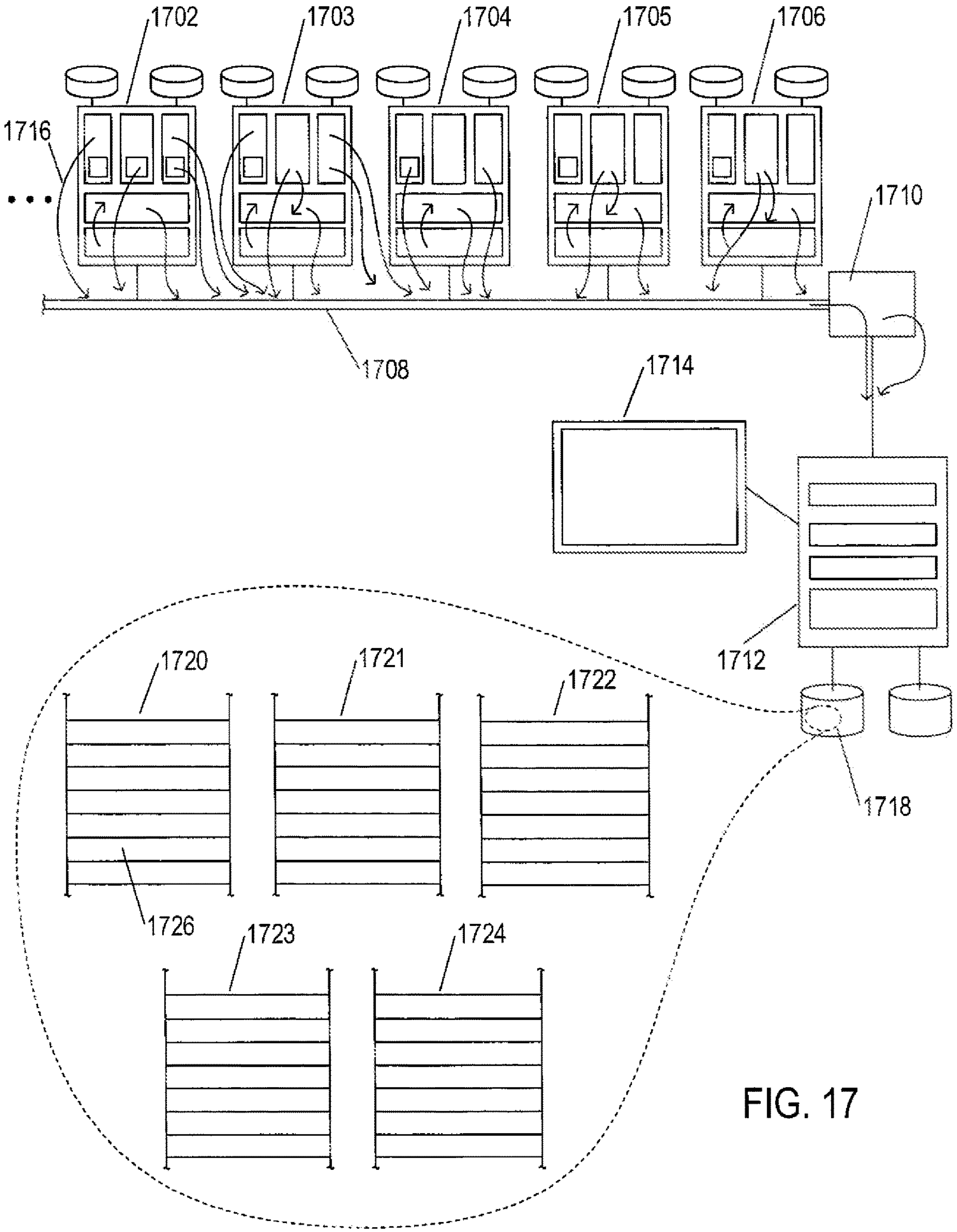
FIG. 17 shows an example of logging log messages in log files.

FIG. 17 shows an example of logging log messages in log files. In FIG. 17, computer systems 1702-1706 within a data center are linked together by an electronic communication medium 1708 and additionally linked through a communications bridge/router 1710 to an administration computer system 1712 that includes an administrative console 1714 and executes a log management server. For example, the administration computer system 1712 may be the server computer 1308 in FIG. 13 and the log management server may be part of the operations manager 1332. Each of the computer systems 1702-1706 may run a log monitoring agent that forward log messages to the log management server executing on the administration computer system 1712. As indicated by curved arrows, such as curved arrow 1716, multiple components within each of the discrete computer systems 1702-1706 as well as the communications bridge/router 1710 generate log messages that are forwarded to the log management server. Log messages may be generated by any event source. Event sources may be, but are not limited to, application programs, operating systems, VMs, guest operating systems, containers, network devices, machine codes, event channels, and other computer programs or processes running on the computer systems 1702-

1706, the bridge/router 1710 and any other components of a distributed computing system. Log messages may be received by log monitoring agents at various hierarchical levels within a discrete computer system and then forwarded to the log management server. The log messages are recorded in a data-storage device or appliance 1718 as log files 1720-1724. Rectangles, such as rectangle 1726, represent individual log messages. For example, log file 1720 may contain a list of log messages generated within the computer system 1702. Each log monitoring agent has a configuration that includes a log path and a log parser. The log path specifies a unique file system path in terms of a directory tree hierarchy that identifies the storage location of a log file on the administration computer system 1712 or the data-storage device 1718. The log monitoring agent receives a specific file and event channel log paths to monitor log files and the log parser includes log parsing rules to extract and format lines of the log message into log message fields described below. Each log monitoring agent sends a constructed structured log message to the log management server. The administration computer system 1712 and computer systems 1702-1706 may function without log monitoring agents and a log management server, but with less precision and certainty.

FIG. 18 shows an example source code 1802 of an event source, such as an application, an operating system, a VM, a guest operating system, or any other computer program or machine code that generates log messages. The source code 1802 is just one example of an event source that generates log messages. Rectangles, such as rectangle 1804, represent a definition, a comment, a statement, or a computer instruction that expresses some action to be executed by a computer. The source code 1802 includes log write instructions that generate log messages when certain events predetermined by a developer occur during execution of the source code 1802. For example, source code 1802 includes an example log write instruction 1806 that when executed generates a "log message 1" represented by rectangle 1808, and a second example log write instruction 1810 that when executed generates "log message 2" represented by rectangle 1812. In the example of FIG. 18, the log write instruction 1808 is embedded within a set of computer instructions that are repeatedly executed in a loop 1814. As shown in FIG. 18, the same log message 1 is repeatedly generated 1816. The same type of log write instructions may also be in different places throughout the source code, which in turns creates repeats of essentially the same type of log message in the log file.

In FIG. 18, the notation "log.write( )" is a general representation of a log write instruction. In practice, the form of the log write instruction varies for different programming languages. In general, log messages are relatively cryptic, including generally only one or two natural-language words and/or phrases as well as various types of text strings that represent file names, path names, and perhaps various alphanumeric parameters that may identify objects, such as VMs, containers, or virtual network interfaces. In practice, a log write instruction may also include the name of the source of the log message (e.g., name of the application program, operating system and version, server computer, and network device) and the name of the log file to which the log message is recorded. Log write instructions may be written in a source code by the developer of an application program or operating system in order to record events that occur while an operating system or application program is executing. For example, a developer may include log write instructions that record events including, but are not limited to, information identifying startups, shutdowns. I/O operations of applications or devices; errors identifying runtime deviations from normal behavior or unexpected conditions of applications or non-responsive devices; fatal events identifying severe conditions that cause premature termination: and warnings that indicate undesirable or unexpected behaviors that do not rise to the level of errors or fatal events. Problem-related log messages (i.e., log messages indicative of a problem) can be warning log messages, error log messages, and fatal log messages. Informative log messages are indicative of a normal or benign state of an event source.

FIG. 19 shows an example of a log write instruction 1902. In the example of FIG. 19, the log write instruction 1902 includes arguments identified with "$." For example, the log write instruction 1902 includes a time-stamp argument 1904, a thread number argument 1905, and an internet protocol ("IP") address argument 1906. The example log write instruction 1902 also includes text strings and natural-language words and phrases that identify the type of event that triggered the log write instruction, such as "Repair session" 1908. The text strings between brackets "[ ]" represent file-system paths, such as path 1910. When the log write instruction 1902 is executed by a log management agent, parameters are assigned to the arguments and the text strings and natural-language words, and phrases are stored as a log message of a log file.

FIG. 20 shows an example of a log message 2002 generated by the log write instruction 1902. The arguments of the log write instruction 1902 may be assigned numerical parameters that are recorded in the log message 2002 at the time the log message is written to the log file. For example, the time stamp 1904, thread 1905, and IP address 1906 arguments of the log write instruction 1902 are assigned corresponding numerical parameters 2004-2006 in the log message 2002. The time stamp 2004 represents the date and time the log message is generated. The text strings and natural-language words and phrases of the log write instruction 1902 also appear unchanged in the log message 2002 and may be used to identify the type of event (e.g., informative, warning, error, or fatal) that occurred during execution of the event source.

Figure 21:
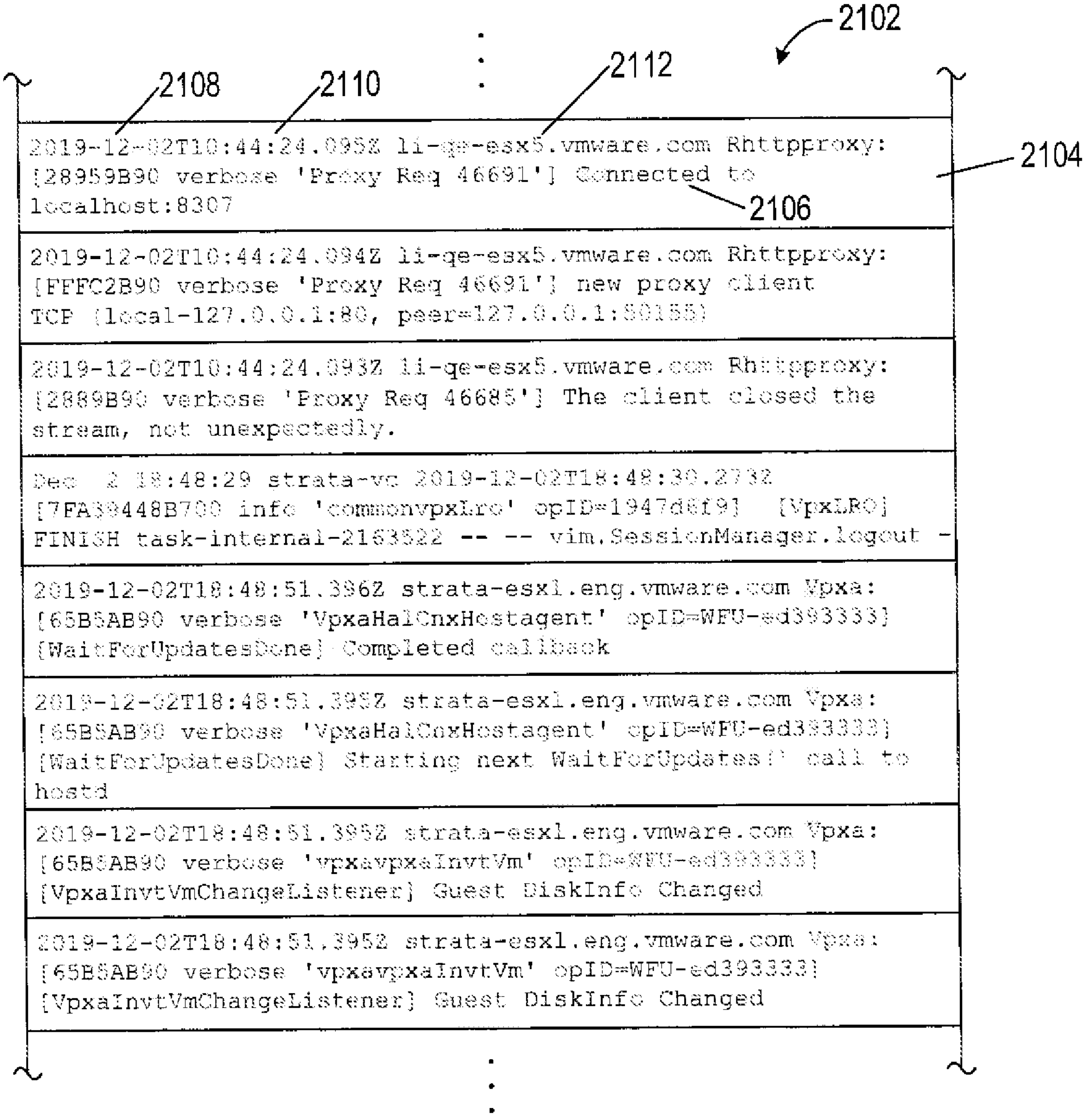
FIG. 21 shows an example of eight log message entries of a log file.

As log messages are received from various event sources, the log messages are stored in corresponding log files in the order in which the log messages are received. FIG. 21 shows an example of eight log message entries of a log file 2102. In FIG. 21, each rectangular cell, such as rectangular cell 2104, of the portion of the log file 2102 represents a single stored log message. For example, log message 2102 includes a short natural-language phrase 2106, date 2108 and time 2110 numerical parameters, and an alphanumeric parameter 2112 that appears to identify a host computer.

Computer-implemented methods and systems perform event analysis on each log message. Event analysis discards stop words, numbers, alphanumeric sequences, and other information that is not helpful to determining the event recorded in the log message, leaving plaintext words called "relevant tokens" that may be used to determine the event recorded in the log message. Event analysis uses regular expressions to identify plain tokens that, such as "error," "warning," "critical," and "emergency." The plain tokens can be used to determine whether the event recorded in a log message is a problem incident.

Figure 22:
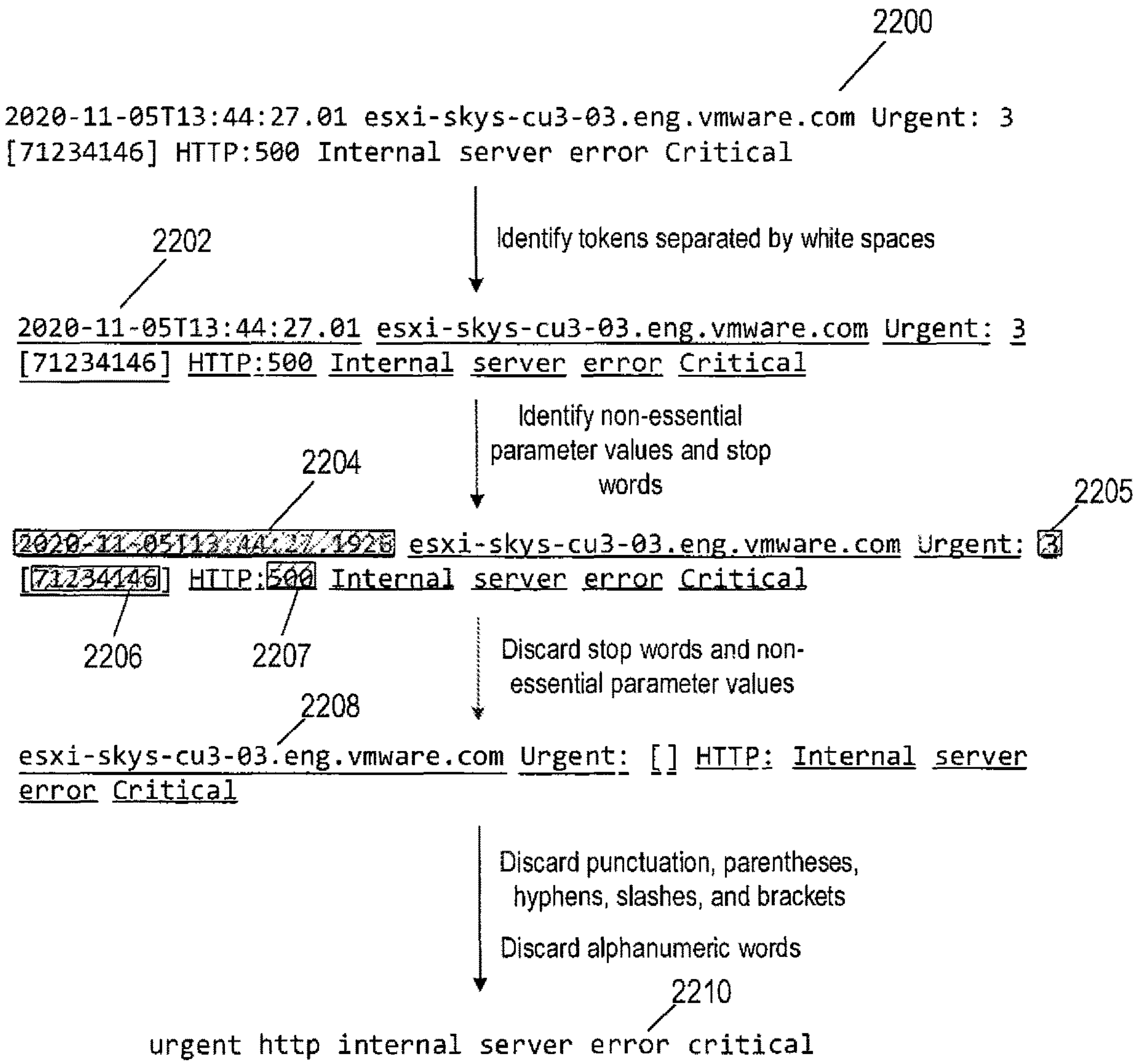
FIG. 22 shows an example of event analysis performed on an example log message to determine the event recorded in the log message.

FIG. 22 shows an example of event analysis performed on an example log message 2200 to determine the event recorded in the log message. The log message 2200 is tokenized by considering the log message as comprising tokens separated by non-printed characters, referred to as "white spaces." Tokenization of the log message 2200 is illustrated by underlining printed or visible tokens comprising characters, such as the date and time 2202. Next, a token-recognition pass identifies stop words and parameters. Stop words are common words, such as "they," "are," "do," that do not carry any useful information. Parameters are tokens or message fields that are likely to be highly variable over a set of messages of a particular type, such as date:time stamps and IP addresses. Additional examples of parameters include global unique identifiers ("GUIDs"), hypertext transfer protocol status values ("HTTP statuses"), universal resource locators ("URLs"), network addresses, and other types of common information entities that identify variable aspects of an event. Stop words and parametric tokens are indicated by shading, such as shaded rectangle 2204-2207. Stop words and parametric tokens are discarded leaving the non-parametric text strings, natural language words and phrases, punctuation, parentheses, and brackets. Various types of symbolically encoded values, including dates, times, machine addresses, network addresses, and other such parameters can be recognized using regular expressions or programmatically. For example, there are numerous ways to represent dates. A program or a set of regular expressions can be used to recognize symbolically encoded dates in any of the common formats. It is possible that the token-recognition process may incorrectly determine and discard alphanumeric strings. The log message 2200 is subject to textualization in which an additional token-recognition step of the non-parametric portions of the log message is performed to discard punctuation and separation symbols, such as parentheses and brackets, commas, and dashes that occur as separate tokens or that occur at the leading and trailing extremities of previously recognized non-parametric tokens. Uppercase letters are converted to lowercase letters. Alphanumeric words, such as interface names and universal unique identifiers 2208, are discarded, leaving plaintext relevant tokens 2210 that identify the event. In this example, the event contains the plaintext tokens "internal server error critical." A set of regular expressions that identify key words, such as "error," "warning," "critical," "emergency," may be used to determine whether the event is a problem incident. In this example, regular expressions that identify keys words "error" and "critical" would be used to identify the log message 2200 as recording an event associated with a problem incident.

Application Traces

Application traces and associated spans may also be used to identify events that indicate problem incidents with applications. Distributed tracing is used to construct application traces and associated spans of applications. A trace represents a workflow executed by an application, such as a distributed application with software components executed in VMs on one or more server computers. A trace represents how a request, such as a user request, propagates through components of a distributed application or through services provided by each component of a distributed application and is generated by an event source, such as the application itself, an agent that monitors performance of the application, or an operating system. A trace consists of one or more spans. Each span is a separate service performed by the application and the length of the span represents an amount of time spent performing the service.

Figure 23A:
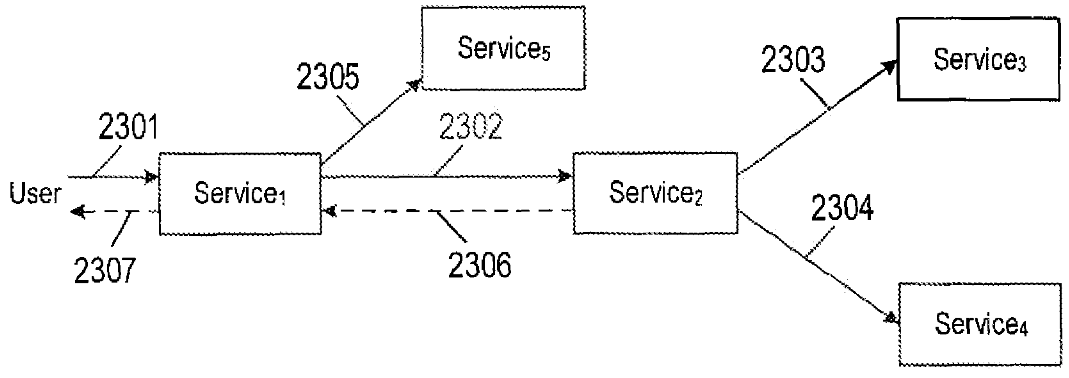
FIGS. 23A-23B show an example of a distributed application and an example application trace.
Figure 23B:
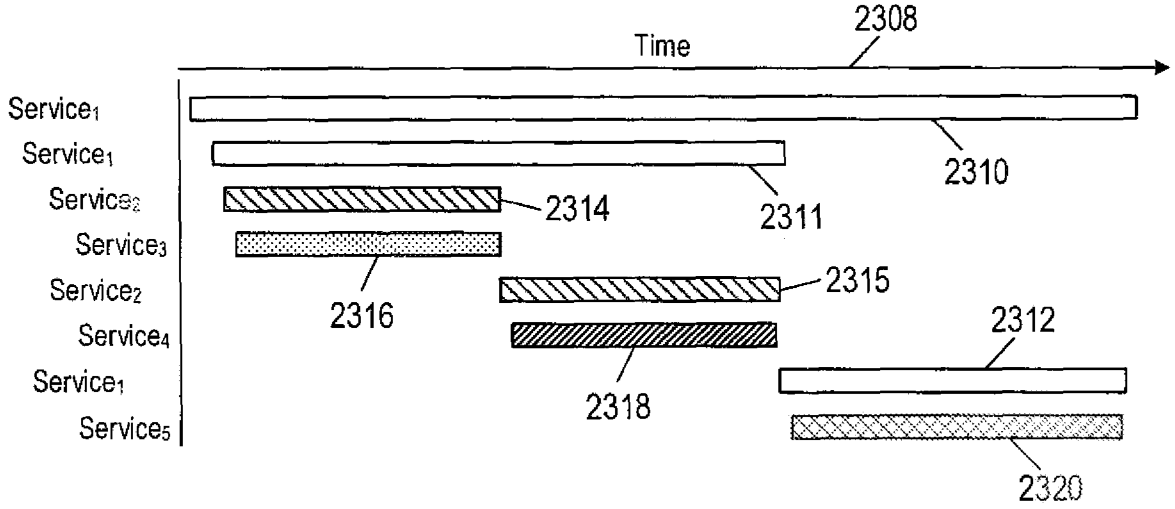

FIGS. 23A-23B show an example of a distributed application and an example application trace. FIG. 23A shows an example of five services provided by a distributed application. The services are represented by blocks identified as $Service_1$, $Service_2$, $Service_3$, $Service_4$, and $Service_5$. The services may be web services provided to customers. For example, $Service_1$ may be a web server that enables users to purchase items sold by the application owner. The services $Service_2$, $Service_3$, $Service_4$, and $Service_5$ represent backend computational services that execute operations to complete user requests. The services may be executed in a distributed application in which each component of the distributed application executes one of the services in a separate VM on one or more server computers. Directional arrows 2301-2305 represent requests for a service provided by the services $Service_1$, $Service_2$, $Service_3$, $Service_4$, and $Service_5$. For example, directional arrow 2301 represents a user's request for a service offered by $Service_1$, such as a service provided by a web site. After a request has been issued by the user, directional arrows 2303 and 2304 represent the $Service_1$ request for services performed by $Service_2$ and $Service_3$. Dashed directional arrows 2306 and 2307 represent responses. For example, $Service_2$ sends a response to $Service_1$ indicating that the services provided by $Service_3$ and $Service_4$ have been executed. The $Service_1$ then requests services provided $Service_5$, as represented by directional arrow 2305, and provides a response to the user, as represented by directional arrow 2307.

FIG. 23B shows an example trace of the services represented in FIG. 23A. Directional arrow 2308 is a time axis. Each bar represents a span, which is an amount of time (i.e., duration) spent executing a service. Unshaded bars 2310-2312 represent spans of time spent executing $Service_1$. For example, bar 2310 represents the span of time $Service_1$ spends interacting with a user. Bar 2311 represents the span of time $Service_1$ spends interacting with the services provided by $Service_2$. Hash marked bars 2314-2315 represent spans of time spent executing $Service_2$ with services $Service_3$ and $Service_4$. Shaded bar 2316 represents a span of time spent executing $Service_3$. Dark hash marked bar 2318 represents a span of time spent executing $Service_4$. Cross-hatched bar 2320 represents a span of time spent executing $Service_5$.

The example trace in FIG. 23B is a trace that represents normal operation of the services represented in FIG. 23A. In other words, normal operations of the services represented in FIG. 23A are expected to produce traces with spans of similar duration to the spans of the trace represented in FIG. 2313 and therefore is called a trace signature or a trace type for the services provided by the distributed application shown in FIG. 23A. A performance problem with the objects that execute the services of a distributed application include erroneous traces (e.g., traces that fail to approximately match the trace in FIG. 23B) and traces with extended spans or latencies in executing a service.

A trace signature, or typical trace, for services or a distributed application may be defined by nearly identical composition of spans, or by starting points of spans. Trace signatures with a large number of associated erroneous traces are an event associated with executing an application.

Figure 24A:
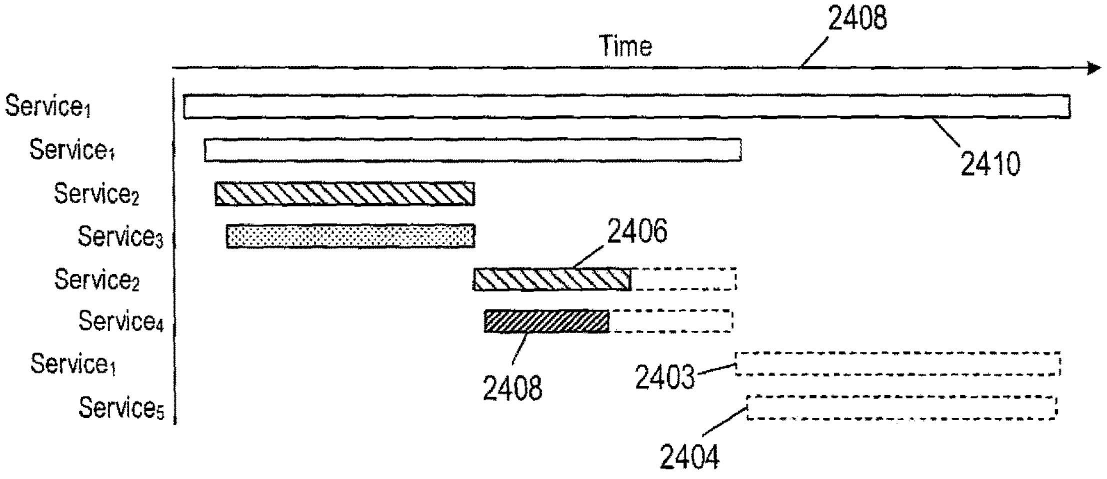
FIGS. 24A-24B show two examples of erroneous traces associated with the services represented in FIG. 23A.
Figure 24B:
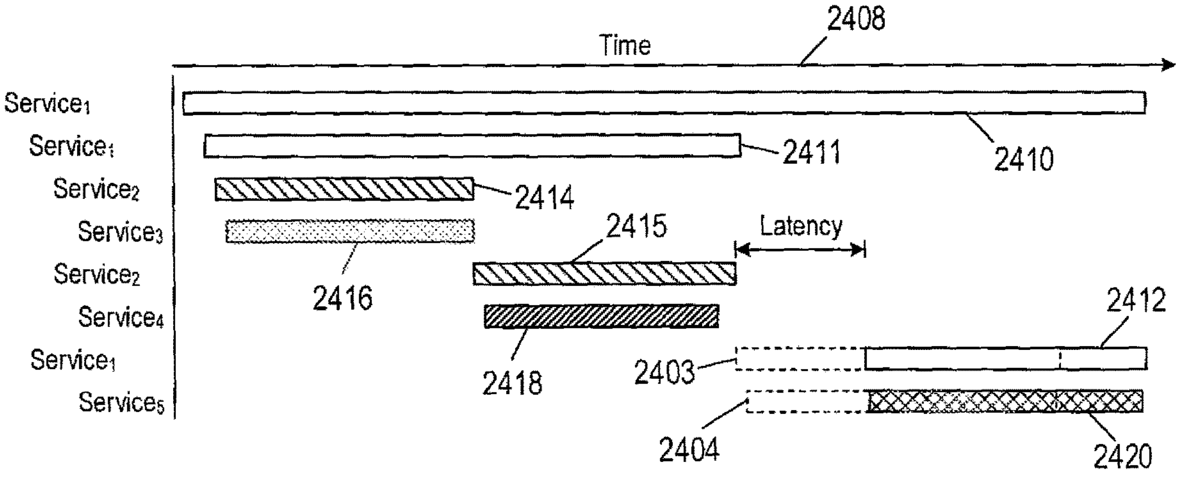

FIGS. 24A-24B show two examples of erroneous traces associated with the services represented in FIG. 23A. In FIG. 24A, dashed line bars 2401-2404 represent normal spans for services provided by $Service_1$, $Service_2$, $Service_4$, and $Service_5$ as represented by spans 2415, 2418, 2412, and 2420 in FIG. 23B. Spans 2406 and 2408 represent shortened spans for $Service_2$ and $Service_4$. No spans are present for $Service_1$ and $Service_5$ as indicated by dashed bars 2403 and 2404. In FIG. 24B, a latency pushes the spans 2412 and 2420 associated with executing corresponding $Service_1$ and Ser- $vice_5$ to later times. The erroneous traces illustrated in FIGS. 24A-24B are examples of events.

Each trace may characterized by a trace vector $(d(s_1), \ldots d(s_M))$ where $s_i$ is a span associated with the i-th service or i-th component of a distributed application, $d_i$ is the total duration of the span $s_i$, and M is the number of different spans or M different services executed by the distributed application. The total time duration for a span is given by $$d(s_i) = \sum_{j=1}^{NS} s_{ij} \tag{3}$$

where

NS is the number of times the i-th service or i-th component is executed during execution of the distributed application; and $s_{ij}$ is the span of the j-th time for executing the i-th service or i-th component.

For example, the total time duration of the service. $Service_1$, in FIGS. 24A-24B is the sum of the spans 2410, 2411, and 2412. The total time duration of the service $Service_5$ is simply the span 2420. A relative frequency trace vector is computed for multiple same type traces as follows:

$$RF = (d^{norm}(s_1), \ldots, d^{norm}(s_M)) \text{ where} \tag{4}$$

$$d^{norm}(s_i) = \frac{1}{NT}\sum_{j=1}^{NT} d_i(s_j)$$

and NT is the number times the distributed application with the same type traces is executed. Outlier traces may be identified using techniques described in U.S. Pat. No. 10,402,253, issued Sep. 3, 2019, owned by VMware Inc. and is hereby incorporated by reference and using techniques described in US Publication No. 2019/0163598, filed Nov. 30, 2017, owned by VMware Inc. and is hereby incorporated by reference. An outlier trace corresponds to an event associated with a problem incident in execution of an application.

Events and Sets of Historical Events

Computer-implemented methods and systems described herein identify unknown problem incidents in a distributed computing system. Computer-implemented methods and systems collect a set of historically detected events, $$\{E_i\}_{i=1}^{N},$$

that were previously generated by different event sources in the distributed computing system over a historical time period, where N is the number of events detected in the historical time period. Each event is defined by a set of attributes denoted by $$E_i = \{a_1, a_2, \ldots, a_Q\} \tag{5}$$

where $a_q$ is the q-th attribute; and

Q is the number of attributes.

The set of historically detected events may be generated by different event sources as described above. For example, the event $E_i$ may represent a metric threshold violation, a critical message recorded in a log message, or an application trace that deviates from normal behavior. A user may select the attributes for the events, one or more different types of resources of the distributed computing system, and a duration of a time interval, denoted by Δt, for sets of events using a graphical user interface ("GUI").

Figure 25:
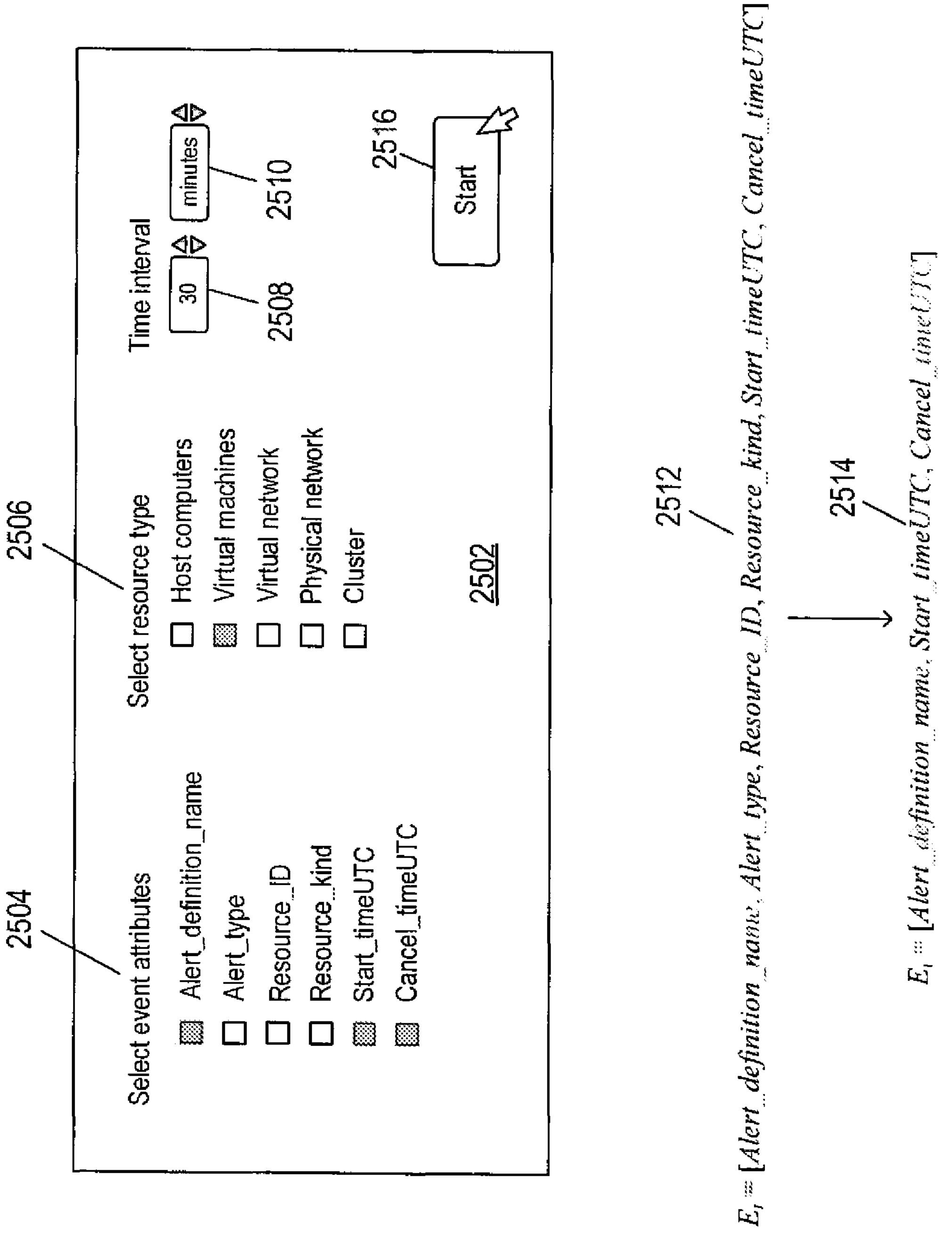
FIG. 25 shows an example graphical user interface that enables a user to select event attributes, types of resources, and a time interval.

FIG. 25 shows an example GUI 2502 that enables a user to select event attributes, one or more types of resources, and a time interval that defines the duration of a time interval for the sets of the historically detected events. Column 2504 is an example list of attributes that may be selected for the events. Column 2506 is an example list of resources for which events are collected. Duration of the time interval is entered in fields 2508 and 2510. Squares represent options a user may select for the attributes and the type of resources for which events are retrieved from an event data base. In this example, shaded squares represent attributes selected by a user for the events of the virtual machines running in the distributed computing system. The user also selected a thirty-minute time interval for the duration of the set of events. FIG. 25 also shows an example event 2512 with the full set of attributes in column 2504 reduced to corresponding event 2514. When a user selects start 2516, only the events with the selected attributes and are associated with the VMs are retrieved from an event data base.

Computer-implemented methods and systems are executed in two phases based on user selected attributes. In phase one, a machine learning technique is used to determine sets of historical events of historically detected events that are associated with historical problem incidents for the distributed computing system. In phase two, computer-implement methods identify a runtime problem incident in the distributed computing system as corresponding to one of the problem incidents based on historical events and runtime events of the runtime problem incident. After a runtime problem incident has been identified, computer-implemented methods and systems may generate recommendations for correcting the runtime problem incident or execute appropriate remedial measures that correct the runtime problem incident based on remedial measures used to correct a previous instance of the runtime problem incident.

Figure 26:
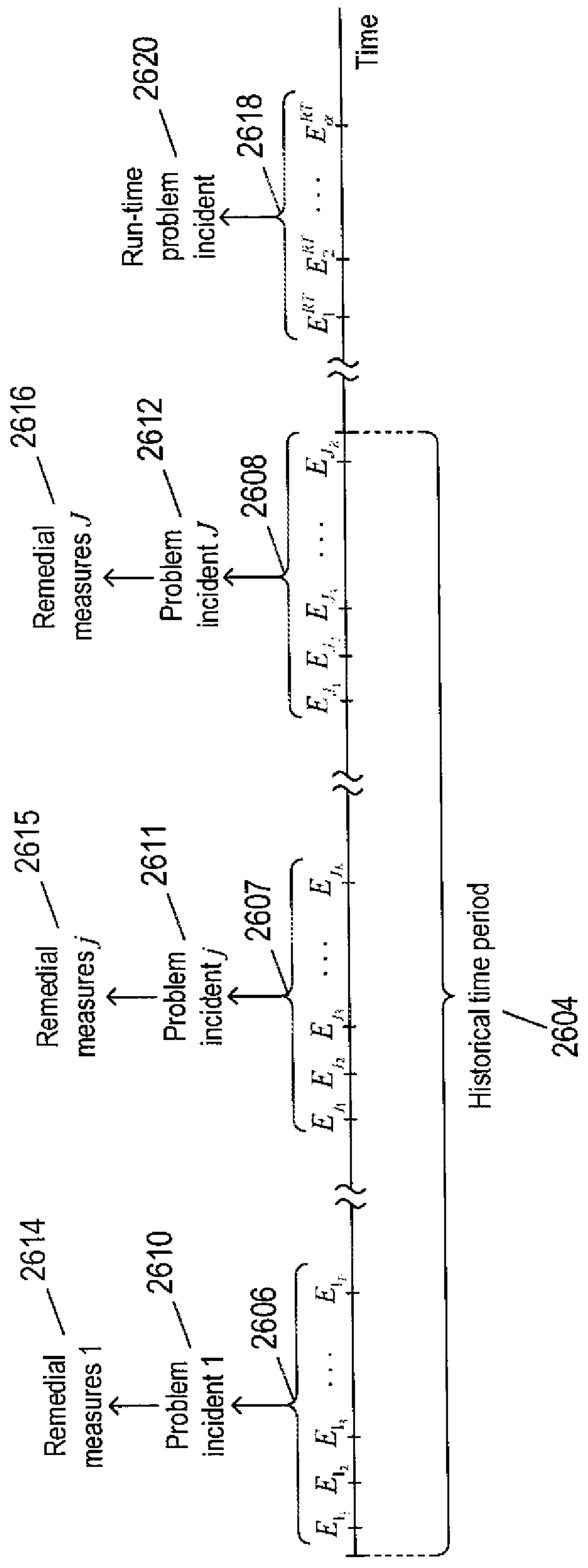
FIG. 26 shows an example of historically detected events associated with different historical problem incidents and an example set of runtime events associated with a runtime problem incident.

FIG. 26 shows an example of historically detected events associated with different historical problem incidents and an example set of runtime events associated with a runtime problem incident for a distributed computing system. Horizontal line 2602 represents a time range. The time range 2602 includes a historical time period 2604. Marks along the time axis 2602 denote times when events were generated by different event sources of the distributed computing system. Computer-implemented methods and systems described below utilize machine learning to identify sets of historical events that correspond to different historical problem incidents in the historical time period 2604. For example, a first set of historical events 2606 comprises a set of P events $\{E_{1_1}, E_{1_2}, \ldots, E_{1_P}\}$, a j-th set of historical events 2607 comprises a set of K events $\{E_{j_1}, E_{j_2}, \ldots, E_{j_K}\}$, and J-th set of historical events 2608 comprises a set of R events $\{E_{j_1}, E_{j_2}, \ldots, E_{j_R}\}$, where P, K, and R are positive integers that correspond to the number of events in each set of historical events. Each set of historical events corresponds to a problem incident for the distributed computing system. For example, the first set of historical events 2606 corresponds to a first problem incident l 2610, the j-th set of historical events 2607 corresponds to a problem incident j 2612, and J-th set of historical events 2608 corresponds to a problem incident j 2616. The problem incidents 2610-2612 have corresponding remedial measures 2614-2616 that were previously implemented by administrators or developers to correct the corresponding problem incidents. For example, suppose the j-th set of historical events 2607 corresponds to insufficient memory for executing a distributed application identified as problem incident j 2611. The remedial measure j 2615 may be to allocate more memory to the VMs of the distributed application. FIG. 26 also shows a set of runtime events $$\{E_1^{RT}, E_2^{RT}, \ldots, E_a^{RT}\}$$

2618, where a is the number of runtime events, associated with a runtime problem incident 2620 for the distributed computing system. Computer-implemented methods and systems described below compare the set of runtime events 2618 with the sets of historical events to determine which set of historical events is closest in proximity to the set of runtime events 2618. The historical problem incident of the closest proximity set of historical events is used to identify the runtime problem incident 2620 and generate a recommendation or execute appropriate remedial measures. For example, suppose the set of runtime events 2618 is closest in proximity to the set of historical events 2607. The runtime problem is identified as the same type of problem identified by problem incident j 2611 and the remedial measures 2615 may be used to correct the runtime problem incident.

Sets of historical events are determined for Δt long time intervals of the historical time period as follows. A start time (e.g., Start_timeUTC) of the oldest event in the historical time period marks the beginning of a first time interval. A subsequent time interval begins with the start time of an event that is not in the preceding time interval. A time interval is denoted by [Start_timeUTC, Start_timeUTC+Δt], where Start_timeUTC is the start time of the oldest event in the set of events with start times that lie within the time interval. The process is repeated for each event in the historical time period to form sets of historical events denoted by $$\{S_j\}_{j=1}^{J},$$

where $S_j$ is a set of events in the j-th time interval, and J is the number of historical events in the historical time period.

Figure 27:
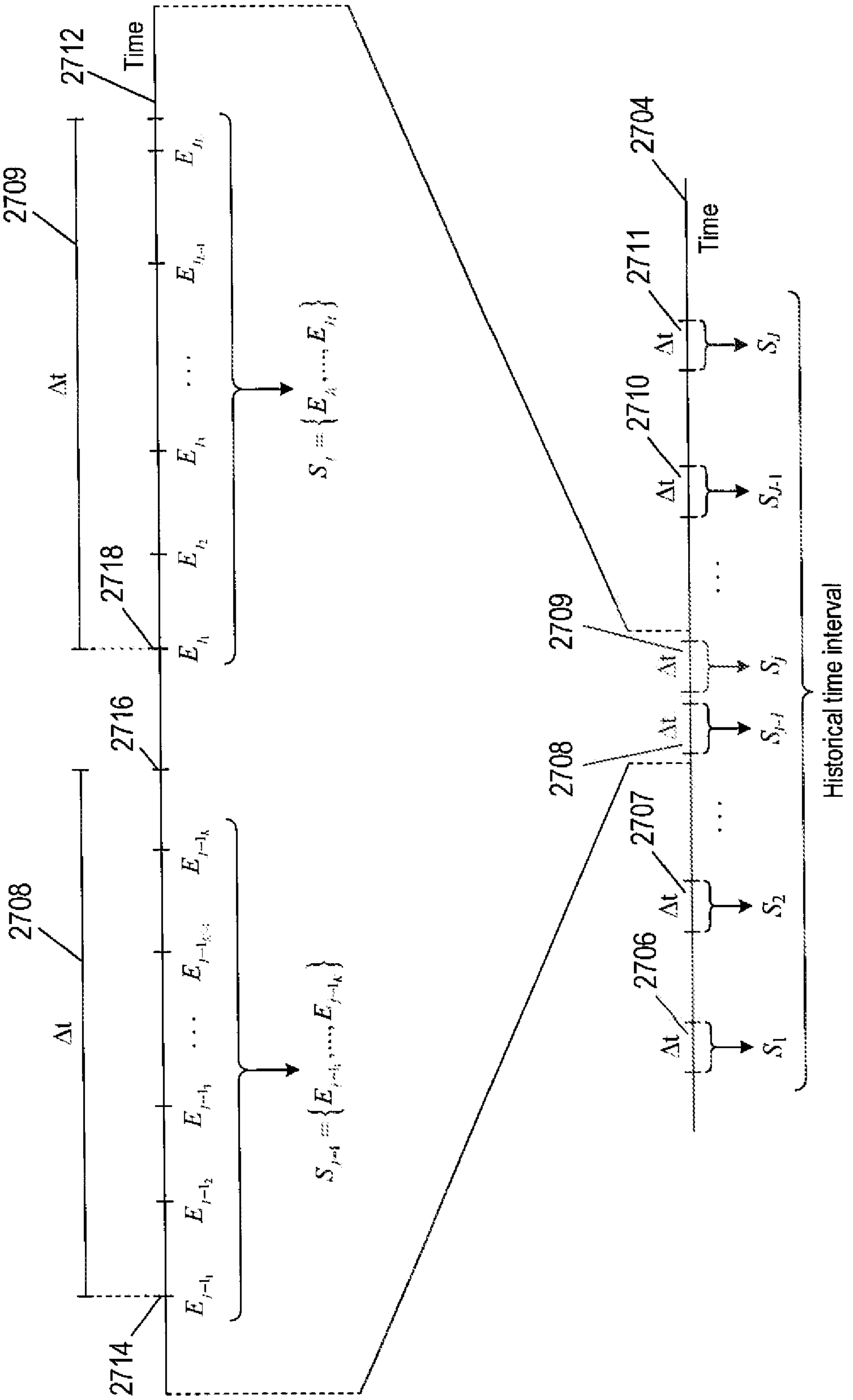
FIG. 27 shows an example sets of historical events.

FIG. 27 shows an example of determining sets of historical events. Historical time period 2702 of a time axis 2704 is broken into example time intervals 2706-2711 each with a duration Δt. Each time interval has a corresponding set of historical events, denoted by $S_j$, with start times that lie within the time intervals. FIG. 27 shows an enlarged segment 2712 of the time axis 2704. Marks along the segment 2712 denote start times of events in sets of historical events $S_{j-1}$ and $S_j$ for corresponding time intervals 2708 and 2709. Start time 2714 of event $E_{j-1_1}$ marks the beginning of time interval 2708 and time 2716 marks the end of time interval 2708. Events in the set of events $S_{j-1}$ have start times that lie within the time interval 2708. Start time 2718 of event $E_{j_1}$ is outside the time interval 2708 and marks the beginning of a subsequent time interval 2709. Events in the set of events $S_j$ have start times that lie within the time interval 2709.

Feature Vectors

For each time interval in the historical time period, a feature vector denoted by $V_j$ is constructed from the corresponding set of historical events $S_j$, where j=1, . . . , J. A feature vector $V_j$ is a binary vector with elements determined based on alert definition names of the events in the corresponding set of historical events $S_j$. The feature vectors form a set of feature vectors denoted by $$\{V_j\}_{j=1}^{J},$$

where $V_j$ is the feature vector of the set of historical events $S_j$. Let M={$e_1$, . . . , $e_{|M|}$} be a set of unique alert definition names without redundancy, where $e_m$ represents an alert definition name with m=1, . . . , |M| and |M| is the number of unique alert definition names in the set M. For each set of historical events $S_j$, a corresponding feature vector is given by $$V_j = \begin{bmatrix} v_1 \\ \vdots \\ v_{|M|} \end{bmatrix} \tag{6}$$

where vector elements are determined by $$v_m = \begin{cases} 1 & \text{if } e_m \text{ defines an event in } S_j \\ 0 & \text{otherwise} \end{cases}$$

Note that the feature vector $V_j$ does not represent multiple occurrences of events in the set of historical events $S_j$ with the same alert definition name. The set of historical events $S_j$ may have two or more events with the same alert definition name, but the alert definition name is only represented once by an element "I" in the feature vector $V_j$.

FIGS. 28A-28C show tables of example alert definition names of events. FIG. 28A shows a table of example alert definition names of events associated with VMs. FIG. 28B shows a table of example alert definition names of events associated with hosts. FIG. 28C shows a table of example alert definition names of events associated with a cluster of hosts. Note that |M| may be difference for each type of object. For example, |M| may be equal to 12 for hosts, |M| may be equal to 15 for VMs, and IMI may be equal to 14 for clusters. When the resource type selected in FIG. 25 is VMs, the set of alert definition names given in FIG. 28A is used for the set M. When the resource type selected in FIG. 25 is host computers, the set of alert definition names given in FIG. 28B is used for the set M. When the resource type selected in FIG. 25 is a cluster, the set of alert definition names given in FIG. 28C is used for the set M. When the resource type selected in FIG. 25 is a physical or virtual network, the corresponding set of alert definition names (not shown) is used for the set M.

Figure 29:
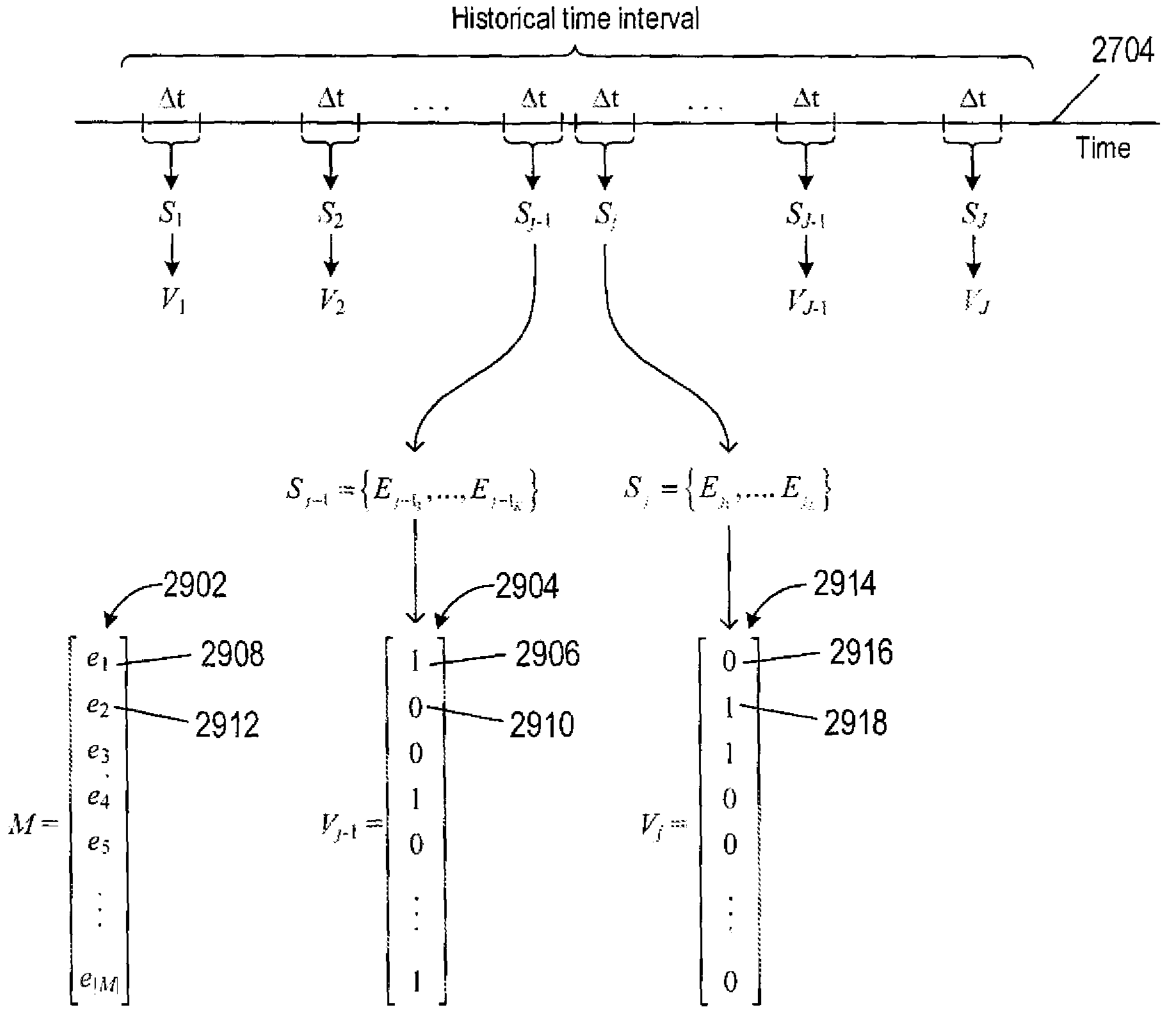
FIG. 29 shows an example of constructing two feature vectors from events in corresponding sets of events.

FIG. 29 shows an example of constructing two feature vectors from events in corresponding sets of historical events of FIG. 27. A set of alert definition names is represented by column vector 2902. For example, the set M may comprise alert definition names for VMs. Feature vector $V_{j-1}$ is represented by column vector 2904. A first element 2906 is assigned value "1" because alert definition name $e_1$ 2908 is an alert definition name of at least one of the events in the set $D_{j-1}$. A second element 2910 is assigned value 0 because none of the events in the set $S_{j-1}$ has alert definition name $e_z$ 2912. Feature vector $V_j$ is represented by column vector 2914. A first element 2916 is assigned value "0" because none of the events in the set $S_j$ has alert definition name $e_1$ 2908. A second element 2918 is assigned value "1"

because alert definition name $e_2$ 2912 is an alert definition name of at least one of the events in the set $S_j$.

Feature Vector Clustering

Hierarchical clustering is used to identify clusters of feature vectors based on a distance measure between each pair of feature vectors in the set of feature vectors $$\{V_j\}_{j=1}^{J}.$$

For example, the Jaccard-Needham ("JN") distance may be used to measure the distance between each pair of feature vectors:

$$d(V_x, V_y) = 1 - J(V_x, V_y) \quad \text{where } V_x, V_y \in \{V_j\}_{j=1}^{J}. \tag{7a}$$

The quantity $J(V_x, V_y)$ in Equation (7a) is a similarity metric between the pair of feature vectors $V_x$ and $V_y$ given by $$J(V_x, V_y) = \frac{M_{11}}{M_{01} + M_{10} + M_{11}} \tag{7b}$$

where

- $M_{01}$ is the total count of elements in feature vector $V_x$ with value 0 and corresponding elements of feature vector $V_y$ have value 1;
- $M_{10}$ is the total count of elements in feature vector $V_x$ with value 1 and corresponding elements of feature vector $V_y$ have value 0; and
- $M_{11}$ is the total count of corresponding elements of feature vectors $V_x$ and $V_y$ with value 1.

The JN distance satisfies the condition $0 \le d(V_x, V_y) \le 1$, where $d(V_x, V_y)=0$ for $V_x=V_y$ and $d(V_x V_y)=1$ for $M_{11}=0$ (i.e., feature vectors $V_x$ and $V_y$ have no common elements in the same position).

FIGS. 30A-30E show calculation of a JN distance for an example pair of feature vectors $V_x$ and $V_y$. FIG. 30A shows binary value elements of the example pair of features vectors $V_x$ and $V_y$. In FIG. 30B, dashed lines 3002-3004 identify three corresponding elements of the feature vectors $V_x$ and $V_y$ with values of 1. As a result, $M_{11}=3$. In FIG. 30C, dashed lines 3005 and 3006 identify corresponding elements of the feature vectors $V_x$ and $V_y$ with value 1 in feature vector $V_x$ and value 0 in feature vector $V_y$. As a result, $M_{10}=2$. In FIG. 30D, dashed lines 3007-3009 identify corresponding elements of the feature vectors $V_x$ and $V_y$ with 0 in feature vector $V_x$ and 1 in feature vector $V_y$. As a result, $M_{01}=3$. In FIG. 30E, the NJ distance is calculated from the values for $M_{11}$, $M_{01}$, and $M_{10}$ in FIGS. 30B-30D.

Implementations are not limited to using the JN distance to calculate distance measures between feature vectors. In another implementation, a cosine distance may be used to measure the distance between any two feature vectors as follows:

$$d(V_x, V_y) = 1 - \frac{V_x \cdot V_y}{\|V_x\|\|V_y\|} \tag{7c}$$

where

"•" is scalar product of $V_x$ and $V_y$; and

‖•‖ is the length of the feature vector.

Figure 31A:
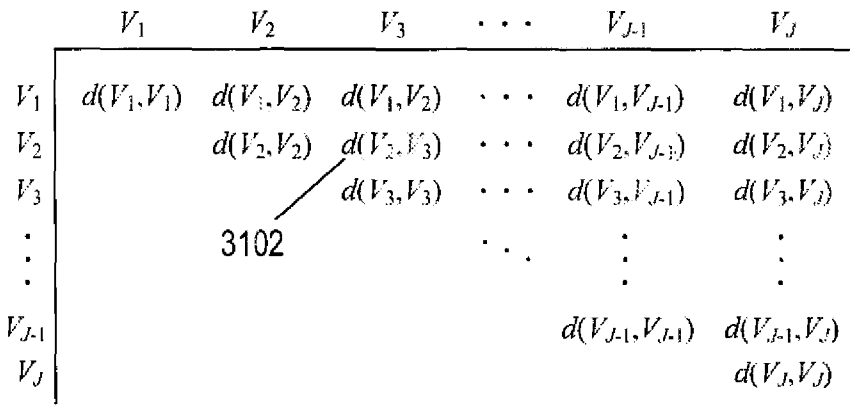
FIG. 31A shows an example JN distance matrix of JN distances calculated for pairs of feature vectors.

After distances have been calculated for each pair of feature vectors associated with a set of historical events, hierarchical clustering analysis may be used to identify clusters of feature vectors within the historical time period. FIG. 31A shows an example distance matrix of distances calculated for each pair of feature vectors in the set of feature vectors $$\{V_j\}_{j=1}^{J}.$$

The matrix elements are denoted by $d(V_x, V_y)$, where $1 \le x, y \le J$. For example, distance matrix element $d(V_2, V_3)$ 3102 represents the distance between feature vectors $V_2$ and $V_3$. Note that because $d(V_x, V_y)=d(V_y, V_x)$ the distance matrix is symmetric with only the upper diagonal matrix elements represented. The diagonal elements are equal to zero (i.e., $d(V_x,V_x)=0$).

Hierarchical clustering analysis may be applied to the distances in the distance matrix using an agglomerative approach and maximum or complete linkage criterion to create a dendrogram of clusters of feature vectors. A dendrogram is a branching tree diagram that represents a hierarchy of relationships between feature vectors (i.e., sets of historical events). The resulting dendrogram may then be used to form clusters of feature vectors (i.e., clusters of corresponding sets of events).

Figure 31B:
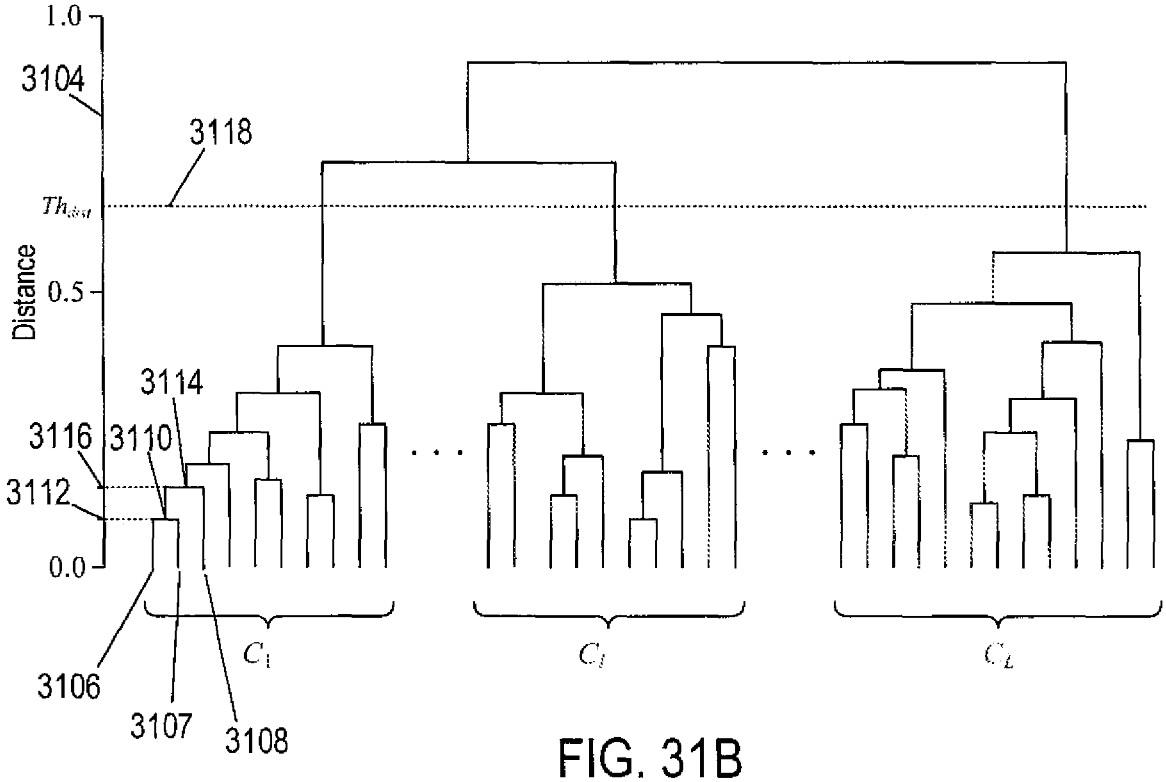
FIG. 31B shows an example dendrogram.

FIG. 31B shows an example dendrogram constructed from distances between pairs of feature vectors. Vertical axis 3104 represents a range of distances between 0 and 1. The dendrogram is a branching tree diagram in which the ends of the dendrogram, called "leaves," represent the feature vectors. For example, leaves 3106-3108 represent three different feature vectors. The branch points represent the distances between the feature vectors. For example, branch point 3110 represents the distance 3112 between the feature vectors 3106 and 3107. Branch point 3114 represents the distance 3116 between the feature vectors 3107 and 3108. The height of a branch point represents the distance, or degree of similarity, between two feature vectors. In the example of FIG. 31B, the smaller the value of a branch point, the more similar the feature vectors are to each other. For example, because the branch point 3112 is closer to zero than the branch point 3116, the feature vectors 3106 and 3107 are more similarity to one another than the feature vectors 3107 and 3108.

A distance threshold, $Th_{dist}$, may be used to separate or cut feature vectors into clusters. The distance threshold may be selected to obtain a desired clustering of feature vectors. Feature vectors connected by branch points (i.e., distances) that are greater than the distance threshold are separated or cut into clusters. For example, in FIG. 31B, dashed line 3118 represents a distance threshold. Feature vectors connected by branch points greater than the threshold $Th_{dist}$ are separated into clusters. In other words, feature vectors with distances that are less than the threshold 3118 form clusters. For example, $C_1$ is a cluster of feature vectors connected by branch points that are less than the threshold $Th_{dist}$, $C_l$ is a cluster of feature vectors connected by branch points that are less than the threshold $Th_{dist}$, and $C_L$ is a cluster of feature vectors connected by branch points that are less than the threshold $Th_{dist}$.

Figures 32A, 32B:
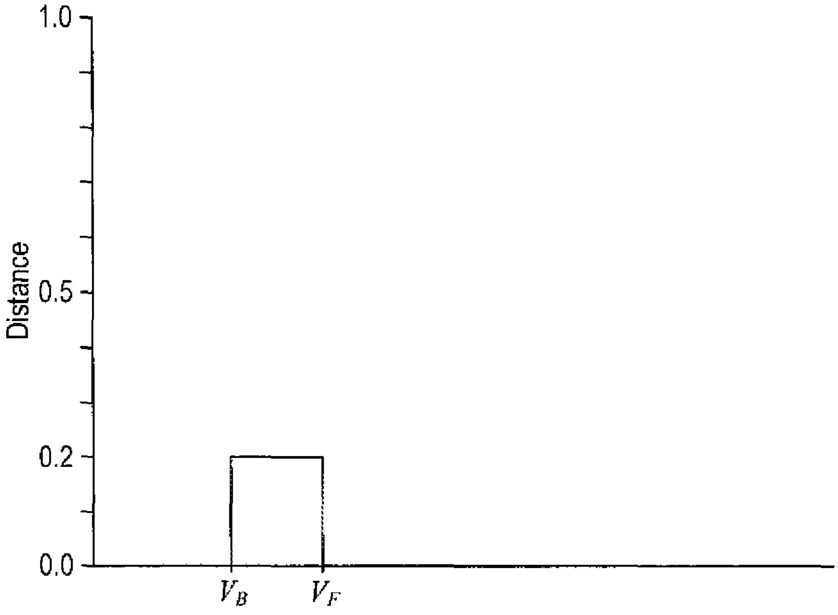
FIGS. 32A-32L show an example of hierarchical clustering applied to a set of feature vectors.
Figures 32C, 32D:
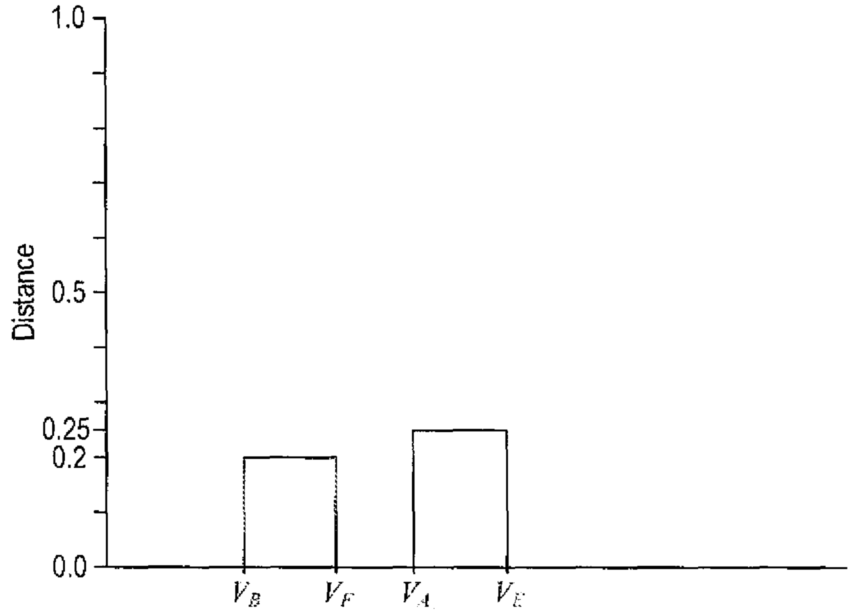
Figures 32E, 32F:
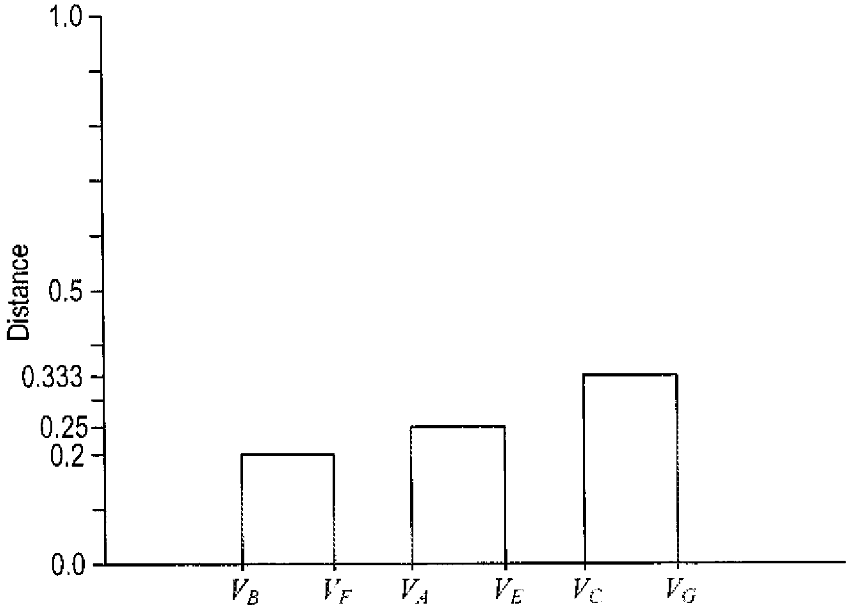
Figures 32G, 32H:
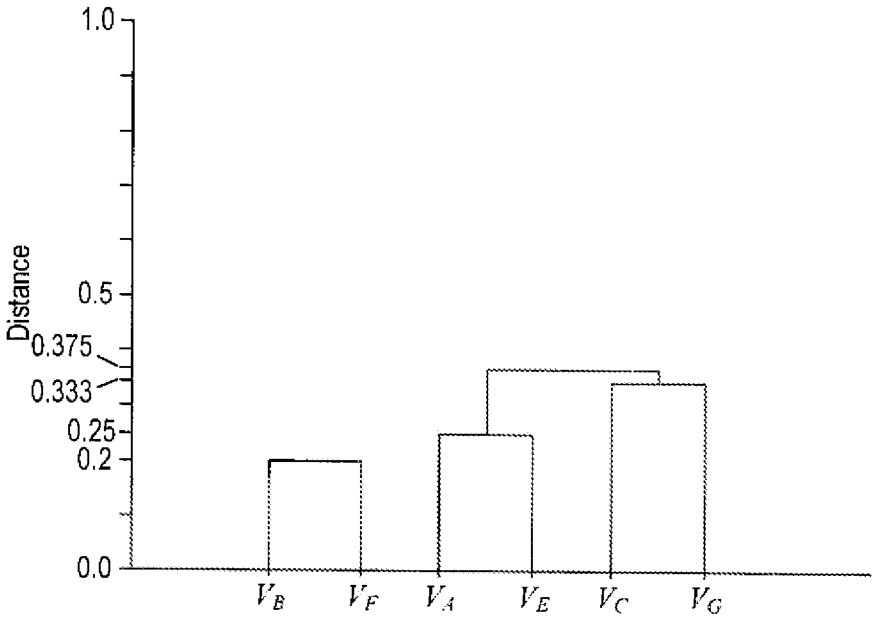
Figures 32I, 32J:
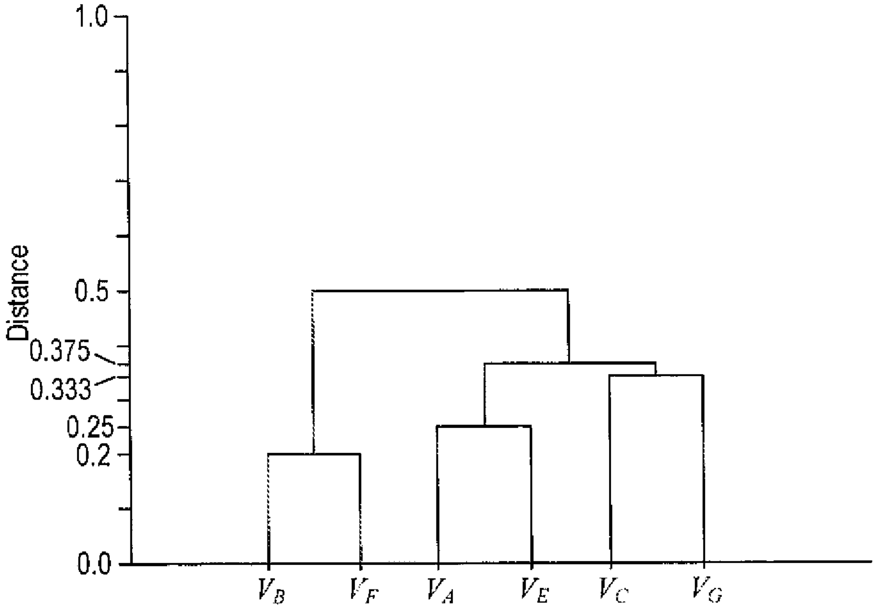
Figures 32K, 32L:
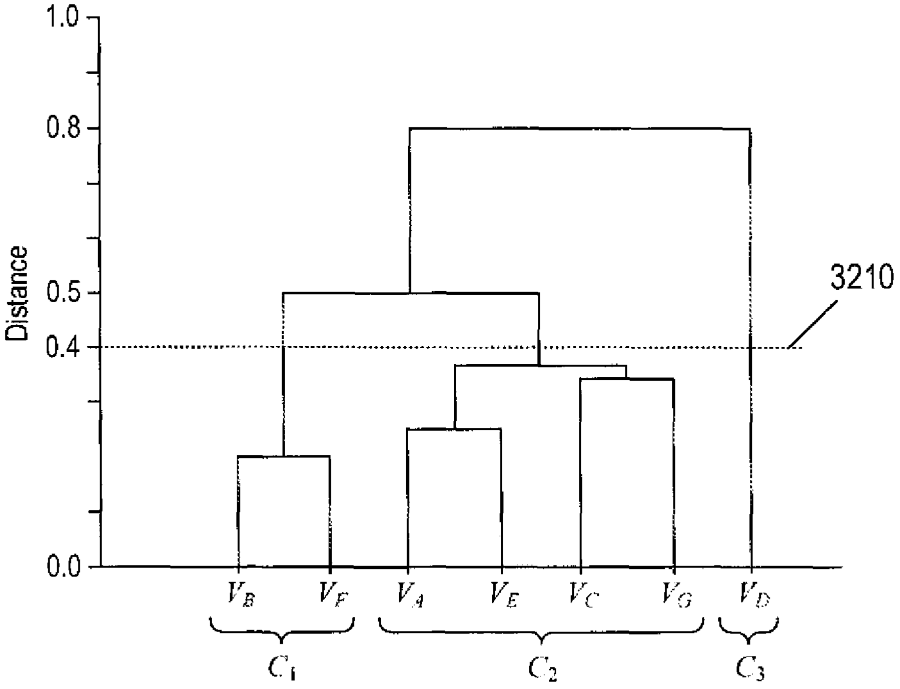

FIGS. 32A-32L show an example of hierarchical clustering applied to seven feature vectors using a minimum linkage (i.e., minimum distance) criterion. The feature vectors are denoted by $V_A$, $V_E$, $V_C$, $V_D$, $V_E$, $V_F$, and $V_G$. FIG. 32A shows an example distance matrix calculated for each pair of the seven feature vectors. An initial step in hierarchical clustering is identifying a pair of feature vectors with the shortest distance. In the example of FIG. 32A, feature vectors $V_B$ and $V_F$ have the smallest distance of 0.2. In FIG. 32B, the two feature vectors $V_B$ and $V_F$ are the first two leaves of a dendrogram and are joined at the distance 0.2. After the pair of feature vectors have been linked, a reduced distance matrix is formed in FIG. 32C. The two feature vectors $V_B$ and $V_F$ are removed from the distance matrix in FIG. 32C and linked feature vectors ($V_B$, $V_F$) is introduced. The minimum linkage criterion may be used to determine the distances between the linked feature vectors ($V_B$, $V_F$) and the other feature vectors in the row 3202. The distance at each element of the row 3202 is the minimum of the distance of the linked feature vectors ($V_B$, $V_F$) with each of the remaining feature vectors. For example, d($V_B$, $V_C$) is 0.704 and d ($V_F$, $V_C$) is 0.667 obtained from corresponding matrix elements in FIG. 32A. The min(d($V_B$, $V_C$), d($V_F$, $V_C$)) is 0.667. Therefore, the distance between the linked feature vectors ($V_B$, $V_F$) and the feature vector $V_C$ is 0.667 as represented by matrix element 3204. The remaining elements in the row 3202 in FIG. 32C are determined in the same manner. The smallest distance in the JN matrix of FIG. 32C is 0.25 for feature vectors $V_A$ and $V_E$. In FIG. 32D, the two feature vectors $V_A$ and $V_E$ are two more leaves in the dendrogram joined at the distance 0.25. The rows associated with the feature vectors $V_A$ and $V_E$ are removed from the distance matrix shown in FIG. 32E and the minimum linkage criterion is repeated for the linked feature vectors ($V_A$, $V_E$) in order to obtain the distances in the row 3208 in FIG. 32E. For example, the distance between ($V_B$, $V_F$) and $V_A$ is 0.5 and the distance between ($V_S$, $V_F$) and $V_E$ is 0.667 as revealed by the corresponding matrix elements in FIG. 32C. The minimum of the two distances is 0.5 as represented by the matrix element 3206 in FIG. 32E. The remaining elements in the row 3208 in FIG. 32E are determined in the same manner. The smallest distance in the distance matrix of FIG. 32E is 0.333. In FIG. 32F, the two feature vectors $V_C$ and $V_G$ are two more leaves added to the dendrogram and are joined at the distance 0.333. FIGS. 32G-32L show distance matrices and corresponding dendrograms constructed using the minimum linkage criterion at each step. FIG. 32L shows the final dendrogram.

In FIG. 32L, dashed line 3201 represents a distance threshold of 0.40. In other words, the distance threshold of 0.40 is a maximum distance. Feature vectors with distances smaller than the distance threshold form clusters. For example, feature vectors $V_B$ and $V_F$ have a distance of 0.2 and the feature vectors $V_A$, $V_E$, $V_C$, and $V_C$ have distances that are less than 0.4. But the feature vectors $V_B$ and $V_F$ have a minimum linked feature vector distance of 0.5 with the feature vectors $V_A$, $V_E$, $V_C$, and $V_C$, which is greater than the threshold of 0.40. Therefore, the feature vectors $V_B$ and $V_F$ form a cluster $C_1$ and the feature vectors $V_A$, $V_E$, $V_C$, and $V_C$ form another cluster $C_2$. Because the feature vector $V_D$ has a distance of 0.8 with the feature vectors in the clusters $C_1$ and $C_2$, feature vector $V_D$ is the element of the cluster $C_3$.

Figure 33:
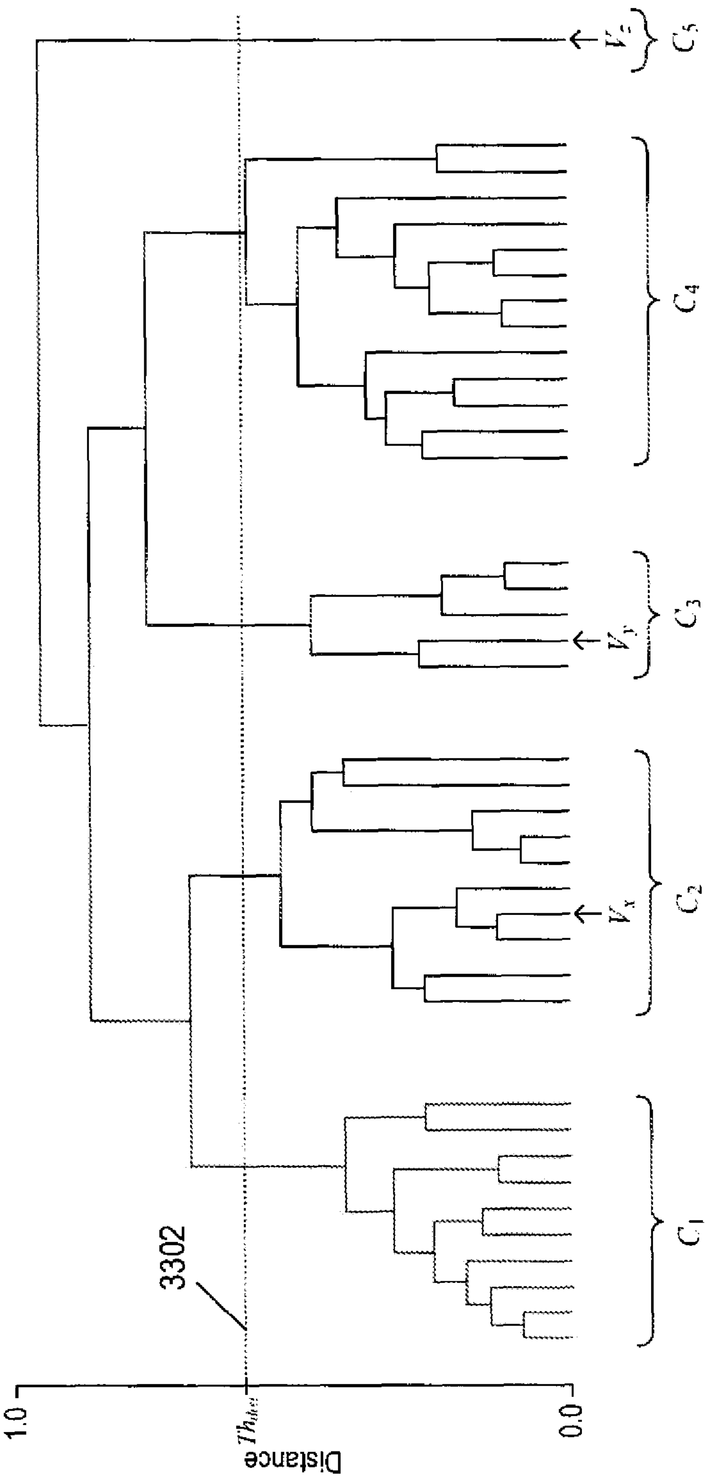
FIG. 33 shows an example dendrogram of clusters of feature vectors.

Clusters with fewer feature vectors than an item count threshold θ, are discarded. FIG. 33 shows an example dendrogram of clusters of feature vectors. Dashed line 3302 represents a distance threshold $Th_{dist}$ that creates fives clusters of feature vectors denoted by $C_1$, $C_2$, $C_3$, $C_4$, and $C_5$. For example, cluster $C_2$ includes a feature vector $V_x$, cluster $C_3$ includes a feature vector $V_y$, and cluster $C_5$ comprises only one feature vector $V_z$. In this example, the item count threshold θ equals 6. As a result, clusters $C_3$ and $C_5$ are discarded, leaving clusters $C_1$, $C_2$, and $C_4$.

Note that each cluster comprises a set of similar feature vectors. As described above with reference to FIG. 29, each feature vector is formed from a set of historical events in a time interval Δt. As a result, each cluster corresponds to sets of historical events represented by the feature vectors of the cluster. For example, suppose a cluster comprises a set of feature vectors $$\{V_i\}_{i=1}^{I},$$

where I is the number of feature vectors in the cluster. Each feature vector $V_i$ represents a corresponding set of historical events $S_i$ in $$\{S_i\}_{i=1}^{I}$$

that corresponds to a problem incident. As a next step, problem incident types are defined based on the corresponding event types.

Cluster Ranking

The clusters with more feature vectors than the item count threshold θ are rank ordered based on an average redundancy of events contained in the cluster. Frequently occurring events in a cluster are typically less important than events that occur with a lower frequency. In one implementation, for each cluster, an average redundancy of events is computed as an average inverse document frequency ("IDF") weight of each event associated with the cluster. The IDF weights of each cluster are averaged. The average IDF weights of each cluster are used to rank the clusters. Let $$\{C_p\}_{p=1}^{P}$$

be a set of clusters of feature vectors, where P is the number of clusters with $|C_p|>\theta$ for cluster index p=1, 2, . . . , P. For each cluster $C_p$, an IDF weight is calculated for each event $E_r$ in the historical events $$\{E_r\}_{r=1}^{\beta}$$

represented by feature vectors in the cluster $C_p$ as follows:

$$w_{IDF}(E_r, C_p) = \log\left(\frac{|C_p|}{n(E_r)}\right) \tag{8}$$

where $n(E_r)$ is the frequency of the event $E_r$ in the historical events $$\{E_r\}_{r=1}^{\beta};$$

and $|C_p|$ is the number of feature vectors in the cluster $C_p$ (i.e., cardinality of $C_p$).

The IDF weight in Equation (8) reduces the weight (or relevance) of events that frequently occur in the cluster $C_p$ and increases the weight of events that rarely occur. A score for the cluster $C_p$ is computed as an average of the IDF weights of the cluster:

$$W_p = \frac{1}{|C_p|}\sum_{r=1}^{|C_p|} w_{IDF}(E_r, C_p) \tag{9a}$$

Each cluster has a corresponding score. Let $$\{W_p\}_{p=1}^{P}$$

be a set of scores that correspond to clusters in the set of clusters $$\{C_p\}_{p=1}^{P}.$$

FIGS. 34A-34C show an example of calculating a set of scores for a set of clusters. FIG. 34A shows a set of clusters 3402 and the feature vectors 3404 of a cluster $C_p$. Each feature vector represents a different subset of a set of historical events $\{E_1, E_2, E_3, E_4, E_5, E_6\}$. For example, as shown in FIG. 34A, feature vector $V_1$ represents a set of historical events 3406, feature vector $V_2$ represents a set of historical events 3407, feature vector $V_3$ represents a set of historical events 3408, and feature vector $V_4$ represents a set of events 3409. Note that a number of the sets have the same event (i.e., sets of events may intersect). For example, the sets 3406, 3408, and 3409 include the event $E_1$. FIG. 34B shows calculation of an IDF weight for each event in the sets 3406-3409 using Equation (8). The total number of feature vectors $|C_p|$ is 4. Table 3410 displays event frequencies $n(E_r)$ and the IDF weight of each event. Column 3412 list the events. Column 3413 list the frequency of the events associated with the cluster $C_p$. Column 3414 list the corresponding IDF weights calculated with $\log_2$. The least frequently occurring event $E_3$ has the largest IDF weight 3416. The most frequently occurring event $E_4$ has the smallest IDF weight 3418. The score $W_p$ 3420 is computed by averaging the IDF weights 3414. FIG. 34C shows a score associated with each cluster in the set of clusters 3402.

The scores are used to rank order the clusters and determine which clusters correspond to historical problem incidents. In one implementation, each of the scores for the different clusters may be compared with a cluster threshold denoted by $Th_{cluster}$ When a score $W_p$ of a cluster $C_p$ satisfies the follow condition:

$$W_p > Th_{cluster} \tag{9b}$$

the cluster $C_p$ is associated with a problem incident. Alternatively, when a score $W_p$ of a cluster $C_p$ satisfies the follow condition:

$$W_p \le Th_{cluster} \tag{9c}$$

the cluster $C_p$ is regarded as not being associated with a problem incident and the cluster is discarded. Ranking clusters with a score and discarding clusters that do satisfy the condition given by Equation (9b) reduces the number of clusters in the set of clusters $$\{C_p\}_{p=1}^{P}.$$

Determining Representative Events of Clusters

Computer-implemented methods identify representative events of each cluster in the set of clusters $$\{C_p\}_{p=1}^{P}.$$

In one implementation, unsupervised normalized mutual information, is used to identify representative events of each cluster in the set of clusters $$\{C_p\}_{p=1}^{P}$$

Mutual information is a measure of mutual dependence of two random variables and is given by $$I(X;Y) = \sum_{x\in A}\sum_{y\in B} p(x,y)\log\frac{p(x,y)}{p(x)p(y)} \tag{10a}$$

where

- X and Y are discrete random variables with alphabets A and B, respectively;
- p(x, y) is a joint probability mass function; and
- p(x) and p(y) are marginal probabilities.

In the following discussion, the alphabets A and B are sets of events associated with a cluster $C_p$ and the parameters x and y represent the events.

$$\text{Let } F_{p_i} = \left\{E_{k_j}^{p_i}\right\}_{k=1}^{K} \text{ and } F_p = \bigcup_{i=1}^{|C_p|} F_{p_i}$$

where $F_{p_i}$ comprises the events used to form the $p_i$-th feature vector of the cluster $C_p$, and K is the number of events in the $p_i$-th feature vector of the cluster $C_p$. Computer-implemented methods construct a set of q representative events $$\Sigma_p\left(\text{i.e., } \Sigma_p \subset \{E_k\}_{k=1}^{K}\right)$$

that maximizes the mutual information $I(C, \Sigma)$ between a class C and the set of representative events $\Sigma_p$. The class C comprises events in the set of events $F_p$ that are not in the set of representative events $\Sigma_p$ (i.e., $C=F_p-\Sigma_p$).

The set of representative events $\Sigma_p$ corresponding to the cluster $C_p$ is initially an empty set (i.e., $\Sigma_p=\{\emptyset\}$). Mutual information is computed for each event $E_k \in F_p$ (i.e., initially $C=E_k$) by $$I(C, E_k) = \sum_{E_i\in C} p(E_i, E_k)\log\frac{p(E_i, E_k)}{p(E_i)p(E_k)} \tag{10b}$$

The joint probability in Equation (10b) is given by $$p(E_i, E_k) = \frac{\|(E_i, E_k)\|}{\sum_{j=1}^{L}\|E_j\|} \tag{10c}$$

where $\|(E_i, E_k)\|$ is the number of occurrences of the events $E_i$ and $E_k$ within the $\Delta t$ time window;

$\|E_j\|$ is the number of occurrences of the event $E_j$ associated with the cluster $C_p$; and L is the number of events associated with the cluster $C_p$.

The denominator is the number of independent occurrences of the events associated with the cluster $C_p$. The marginal probabilities of Equation (10b) are given by $$p(E_i) = \frac{\|E_i\|}{\sum_{j=1}^{L}\|E_j\|} \tag{10d}$$

The mutual information calculated for each event associated with the cluster $C_p$ forms a set $$\Omega = \{I(C, E_k)\}_{k=1}^{K}.$$

An event $E_l$ that corresponds to a maximum mutual information in the set $$\Omega \text{ such that } I(C, E_l) = \max\left(\{I(C, E_k)\}_{k=1}^{K}\right)$$

is determined. The event $E_l$ is removed from the set $F_p$ and added to the set of representative events $\Sigma_p$. (i.e., $\Sigma=\{E_l\}$). The following operations are repeated until the cardinality $|\Sigma_p|=q$:

(1) Calculate the mutual information for all pairs of events $(E_k, E_s)$, where $E_k \in F$ and $E_s \in \Sigma$, as follows:

$$I(E_k; E_s) = \sum_{E_s\in\Sigma}\sum_{E_k\in F} p(E_k, E_s)\log\frac{p(E_k, E_s)}{p(E_k)p(E_s)} \tag{10f}$$

The joint and marginal probabilities are calculated as described above with reference to Equations (10d) and (10e).

(2) For each $E_k \in F_p$, a relevance measure is calculated as follows:

$$G(E_k) = I(C; E_k) - \frac{1}{|\sum|}\sum_{f_s\in\Sigma} NI(E_k; E_s) \tag{10g}$$

where $NI(E_k; E_s)$ is the normalized mutual information for the pair of events $(E_k; E_s)$.

The mutual information is normalized in Equation (10g) by the minimum entropy of the events $E_k$ and $E_s$ as follows:

$$NI(E_k; E_s) = \frac{I(E_k; E_s)}{\min\{H(E_k), H(E_s)\}}$$

-continued where $$H(E_k) = -\sum_{E_k\in F} p(E_k)\log p(E_k)$$

$$H(E_s) = -\sum_{E_s\in S} p(E_s)\log p(E_s)$$

The probabilities $p(E_k)$ and $p(E_S)$ are the marginal probabilities for the events $E_k$ and $E_S$ and are obtained as described above with reference to Equation (10d) and (10e). The event that maximizes the relevance measure G $(E_k)$ for $E_k \in F_p$ is added to the set of relevant events $\Sigma_p$. The set of representative events $\Sigma_p$ contains the events that are regarded as relevant. By contrast, events remaining in the set $F_p$ are regarded as irrelevant. In other words, the events in the set $\Sigma_p$ are correlated and representative of a particular problem incident with a distributed computing system while the events remaining in the set $F_p$ are not correlated and regarded as not informative with respect to the problem incident with the distributed computing system. The process described above with respect to Equations (10a)-(10g) is repeated for the events associated with each cluster in the set of clusters set of clusters $$\{C_p\}_{p=1}^{P}$$

to obtain corresponding sets of representative events $$\{\Sigma_p\}_{p=1}^{P},$$

comprises the set of representative events associated with the cluster $C_p$.

Figure 35A:
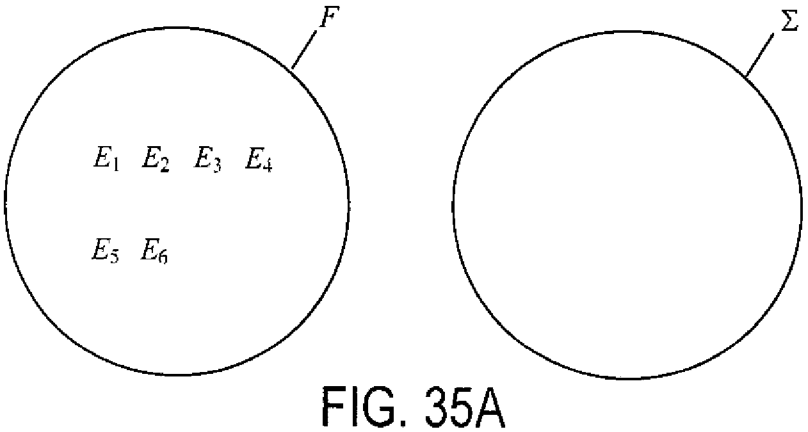
FIGS. 35A-35C show an example of constructing a set of relevant events from a set of events.
Figure 35B:
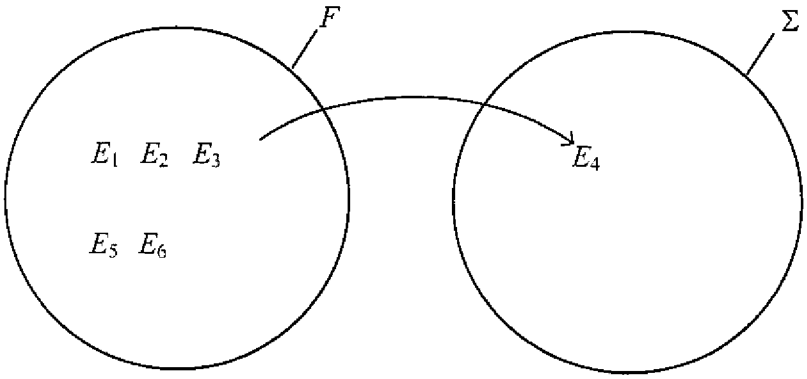
Figure 35C:
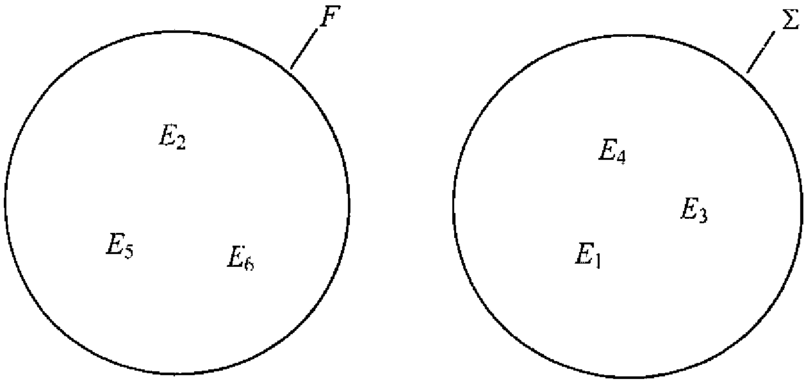

FIGS. 35A-35C show an example of constructing a set of representative events from a set of events associated with a cluster of feature vectors. FIG. 35A shows an example of an initial set $F=\{E_1, E_2, E_3, E_4, E_5, E_6\}$ and an initially empty set of representative events $\Sigma$. The cardinality of the set F is 6 (i.e., $|F|=6$). A user selects the number of relevant events q to be added to the set $\Sigma$ at 3 (i.e., $|\Sigma|=3$). The mutual information is computed between each pair of events in F to form a set $$\Omega = \{I(C, E_k)\}_{k=1}^{6}$$

as described above with reference to Equation (10b). In this example, event $E_4$ has the largest mutual information with $$I(C, E_4) = \max_{k=1,\ldots,6}(I(C, E_k)).$$

As result, the event $E_4$ is removed from the set F and added to the set $\Sigma$ as shown in FIG. 35B. Operations (1) and (2) described above with reference to Equations (10c)-(10g) are repeated until $|\Sigma|=3$. FIG. 35C shows the set $\Sigma$ formed from the event $E_4$ and events $E_1$ and $E_3$ that maximize the relevance measure G in Equation (10g). The set of representative events is $\Sigma=\{E_1, E_3, E_4\}$. The representative events are correlated and may be used to identify a runtime problem incident as described below.

Figure 36:
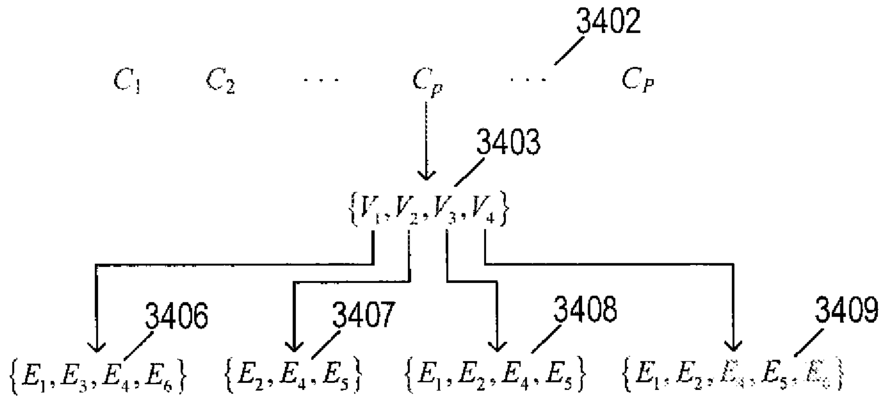
FIG. 36 shows an example of relevant events of the cluster described above with reference to FIG. 34A.

In another implementation, the top X most frequent events of a cluster may be used as the representative events for the cluster. FIG. 36 shows the events of the cluster 3402 described above with reference to FIG. 34A. Table 3602 displays the events associated with the cluster $C_p$ in column 3604 and the frequency of each of the events in column 3606. In this example, the topmost frequent events 3608 are events with a frequency greater than or equal to three and are used as the set of representative events $\Sigma_p$ for the cluster $C_p$. Representative events of each cluster in the set of clusters 3402 are determined in the same manner.

In another implementation, the events that are in the intersection of sets of events associated with each of the feature vectors of a cluster may be used to form the representative events of the cluster. In FIG. 36, for example, the event $E_4$ lies in the intersection of the sets of events 3406-3409 of the cluster $C_p$ and is used as the set of representative events $\Sigma_p$ for the cluster $C_p$. Representative events of each cluster in the set of clusters 3402 are determined in the same manner.

In another implementation, a centroid is calculated for each cluster of the set of clusters based on the feature vectors of the cluster. The set of events associated with the feature vector with the lowest score is the set of representative events for the cluster. The score of each feature vector $V_i \in C_p$ of a cluster is calculated as follows:

$$\text{score}(V_i) = \frac{1}{|C_p|}\sum_{j=1}^{|C_p|}(1 - J(V_i, V_j)),\ V_j \in C_p \tag{11}$$

The set of historical events used to obtain the feature vector with the lowest score are the set of representative events $\Sigma_p$ for the cluster $C_p$.

Figure 37:
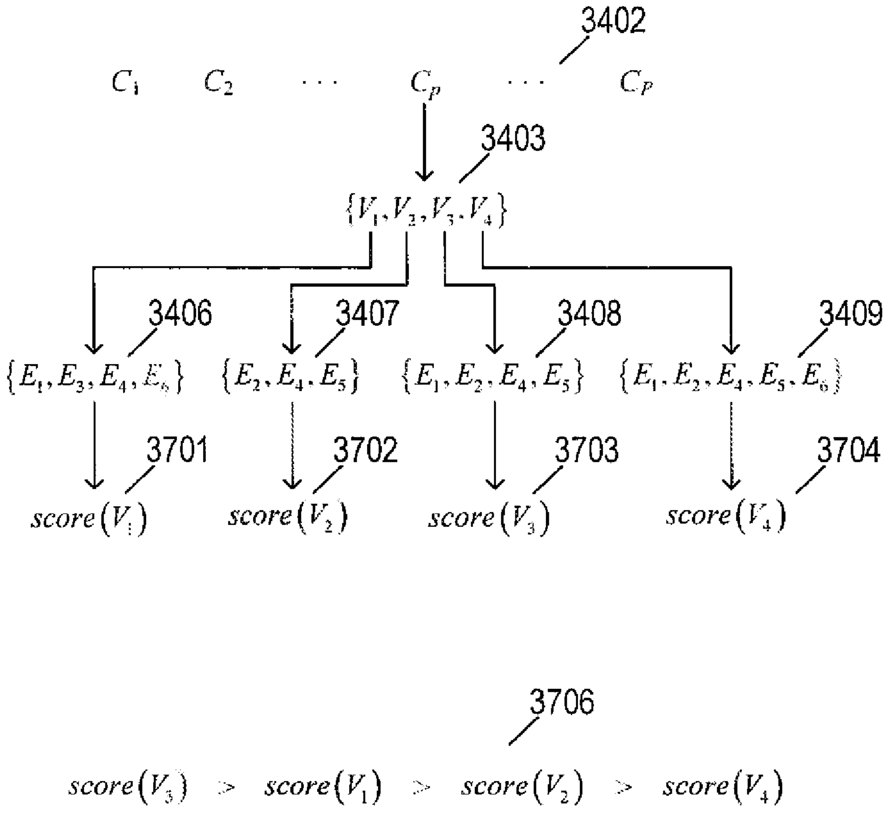
FIG. 37 shows an example of scores associated with feature vectors of a cluster described above with reference to FIG. 34A.

FIG. 37 shows an example of scores associated with feature vectors of a cluster in the clusters 3402 described above with reference to FIG. 34A. Scores 3701-3704 are calculated for each of the feature vectors of the cluster $C_p$. In this example, the scores are rank ordered 3706 from largest to smallest with the feature vector $V_4$ having the smallest score score($V_4$). The corresponding set of events 3409 are for the set of representative events $\Sigma_p$ for the cluster $C_p$. Representative events of each cluster in the set of clusters 3402 are determined in the same manner.

The set of representative events $\Sigma_p$ can be used to define the type of problem incident associate with the cluster $C_p$. A representative feature vector can be formed from the set of representative events $\Sigma_p$. The representative feature vector represents the problem incident associated with the cluster. A representative feature vector is constructed for each set of representative events as described above with reference to Equation (6) and FIG. 29. The representative feature vectors of the set of clusters $$\{C_p\}_{p=1}^{P}$$

are denoted by $$\{V_p^{rep}\}_{p=1}^{P},$$

where $$V_p^{rep}$$

is a feature vector constructed from representative events in the set of representative events $\Sigma_p$. For example, a cluster of $C_1$ may correspond to problem incident of high CPU usage. The set of representative events $\Sigma_1$ and the corresponding representative feature vector V $$V_1^{rep}$$

also represent a high CPU usage. As another example, a cluster of $C_2$ may correspond to network traffic problem incident in which the capacity of channel has been reached. The set of representative events $\Sigma_2$ and the corresponding representative feature vector $$V_2^{rep}$$

also represent a network traffic problem incident. As another example, a cluster of $C_3$ may correspond to storage is full. The set of representative events $E_3$ and the corresponding representative feature vector $$V_3^{rep}$$

also represent a storage is full problem incident.

Classifying a Runtime Problem Incident

Computer-implemented methods classify a runtime problem incident as corresponding to one of the historical problem incidents associated with one of the clusters of the historical time period. Let $$\{E_1^{RT}, E_2^{RT}, \ldots , E_\alpha^{RT}\}$$

be a set of runtime events associated with a runtime problem incident. A runtime feature vector denoted by $V_{RT}$ is constructed for the set of runtime events as described above with reference to FIG. 29. A distance is calculated between the runtime feature vector $V_{RT}$ and each of the representative feature vector $$V_p^{rep}$$

of each of clusters $\{C_1, C_2, \ldots, C_p\}$. The distance may be calculated using the JN distance given by Equations (7a)-(7b) or the cosine distance given by Equation (7c) and minimum distance between the runtime feature vector and the representative feature vectors is identified as follows $$d(V_p^{rep}, V^{RT}) = \min_{p=1,\ldots,P}\{d(V_p^{rep}, V^{RT})\} \tag{12}$$

The runtime problem incident is classified as the same type of problem incident as the cluster $C_p$ with a corresponding representative feature vector $$V_p^{rep}$$

that is closest to the runtime feature vector shortest. The remedial measures used to correct the historical problem incident of the cluster may be executed to remedy the runtime problem incident.

In another implementation, a user selects a number k of nearest neighboring feature vectors of the historical clusters $\{C_1, C_2, \ldots, C_p\}$. The k nearest neighbor feature vectors to the runtime feature vector $V_{RT}$ have the k shortest distances. A runtime problem incident is classified as being the same type of problem incident as the cluster with the largest number of nearest neighbor feature vectors to the runtime feature vector. The remedial measures used to correct the problem incident of the cluster with the largest number of nearest neighbor feature vectors to the runtime feature vector may be executed to remedy the runtime problem incident. Depending on the type of problem incident, remedial measures include, but are not limited to, manually executed deleting a VM, restarting a VM, migrating a VM to a different host, restarting a host creating one or more additional VMs, the additional VMs to share the workload of a distributed application.

Figure 38:
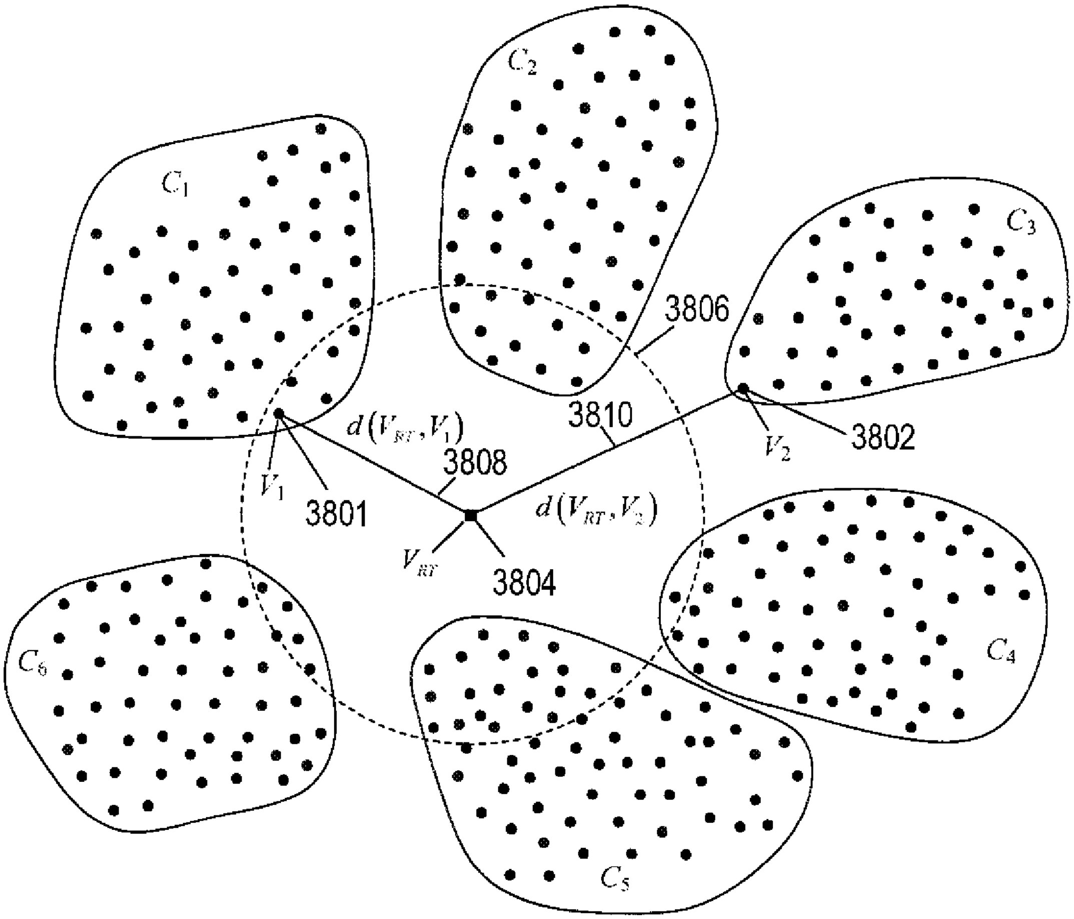
FIG. 38 shows an example of classifying a runtime problem incident based on clusters of historical feature vectors.

FIG. 38 shows an example of classifying a runtime problem incident based on six clusters of historical feature vectors denoted by $\{C_1, C_2, C_3, C_4, C_5, C_6\}$. Feature vectors of the clusters Lie within an IMI-dimensional space but are illustrated in a two-dimensional space for convenience. Shaded dot represents feature vector of one of the clusters. For example, shaded dot 3801 represents a feature vector $V_1$ in the cluster $C_1$ and shaded dot 3802 represents a feature vector $V_2$ in the cluster $C_3$. Shaded square 3804 represents the runtime feature vector $V_{RT}$. In this example, k equals 40 nearest neighbor feature vectors to the runtime feature vector $V_{RT}$. Dashed circle 3806 is centered on the location of the runtime feature vector $V_{RT}$ and encloses the 40 nearest feature vectors of the clusters to the runtime feature vector $V_{RT}$. For example, line 3808 represents the distance between the runtime feature vector $V_{RT}$ and the feature vector $V_1$ which is one of the 40 nearest neighbor feature vectors to the runtime feature vector. Line 3810 represents the distance between the runtime feature vector $V_{RT}$ and the feature vector $V_2$ which is not one of the 40 nearest feature vectors to the runtime feature vector. The number of nearest neighbor feature vectors of each cluster are counted. Table 3812 shows a list of the number of nearest neighbor feature vectors for each cluster. Cluster $C_5$ has 20 of the 40 nearest neighbor feature vectors to the runtime feature vector. As a result, the runtime problem incident is classified as being of the same type of problem incident as the problem incident associated with the cluster $C_5$. The remedial measures used to correct the problem incident associated with the cluster $C_5$ may be executed to remedy the runtime problem incident.

The computer-implemented methods described below with reference to FIGS. 39-45 are stored in one or more data-storage devices as machine-readable instructions that when executed by one or more processors of the computer system, such as the computer system shown in FIG. 1, identify problem incidents in a distributed computing system.

Figure 39:
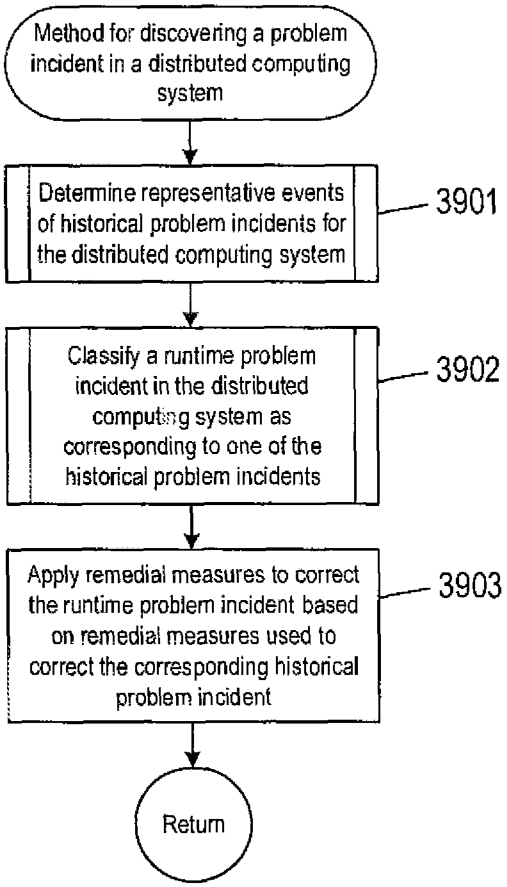
FIG. 39 is a flow diagram illustrating an example implementation of a "method for discovering a problem incident in a distributed computing system."

FIG. 39 is a flow diagram illustrating an example implementation of a "method for discovering a problem incident in a distributed computing system." In block 3901, a "determine representative events of historical problem incidents for the distributed computing system" process is performed. An example implementation of "determine representative events of historical problem incidents for the distributed computing system" procedure is described below with reference to FIG. 40. In block 3902, a "classify a runtime problem incident in the distributed computing system as corresponding to one of the historical problem incidents" process is performed. An example implementation of "classify a runtime problem incident in the distributed computing system as corresponding to one of the historical problem incidents" procedure is described below with reference to FIG. 44. In block 3903, remedial measures are applied to correct the runtime problem incident based on remedial measures used to correct the corresponding historical problem incident.

Figure 40:
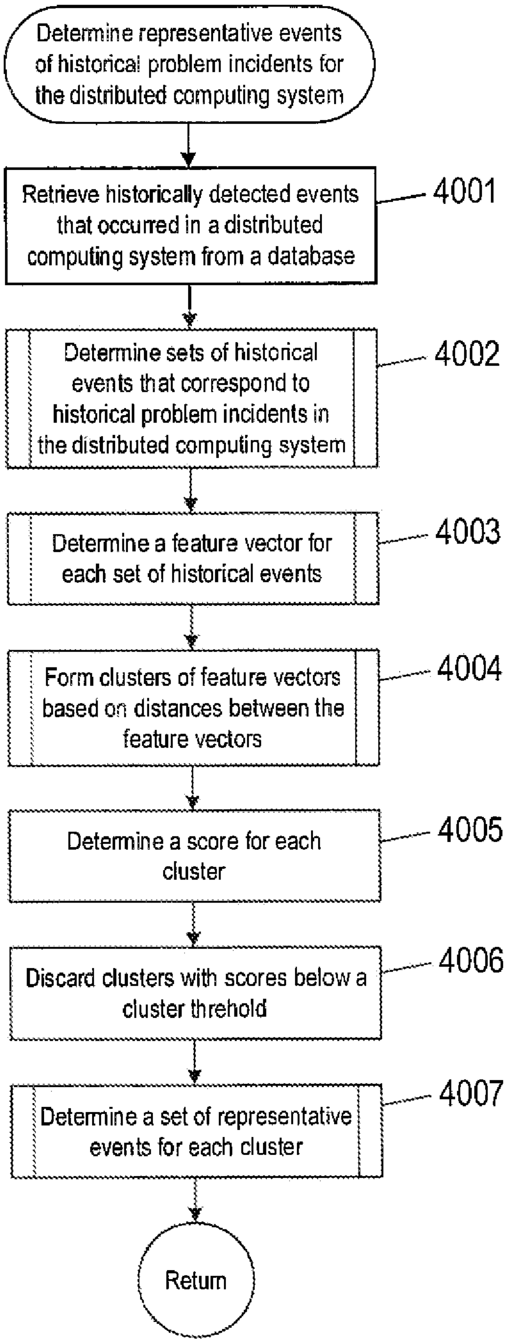
FIG. 40 is a flow diagram illustrating an example implementation of the "determine representative events of historical problem incidents for the distributed computing system" procedure performed in FIG. 39.

FIG. 40 is a flow diagram illustrating an example implementation of the "determine representative events of historical problem incidents for the distributed computing system" procedure performed in block 3901. In block 4001, historically detected events that occurred in the distributed computing system and in a historical time period are retrieved from a database. In block 4002, a "determine sets of historical events that correspond to historical problem incidents in the distributed computing system" process is performed. An example implementation of "determine sets of historical events that correspond to historical problem incidents in the distributed computing system" procedure is described below with reference to FIG. 41. In block 4003, a "determine a feature vector for each set of historical events" process is performed. An example implementation of "determine a feature vector for each set of historical events" procedure is described below with reference to FIG. 42. In block 4004, a "form clusters of feature vectors based on distances between the feature vectors" process is performed. An example implementation of "form clusters of feature vectors based on distances between the feature vectors" procedure is described below with reference to FIG. 43. In block 4005, determine a score for each cluster as described above with reference to Equation (9a). In block 4006, discard clusters with scores below a cluster threshold as described above with reference to Equations (9b) and (9c). In block 4007, a "determine a set of representative events for each cluster" process is performed. An example implementation of "determine a set of representative events for each cluster" procedure is described below with reference to FIG. 44.

Figure 41:
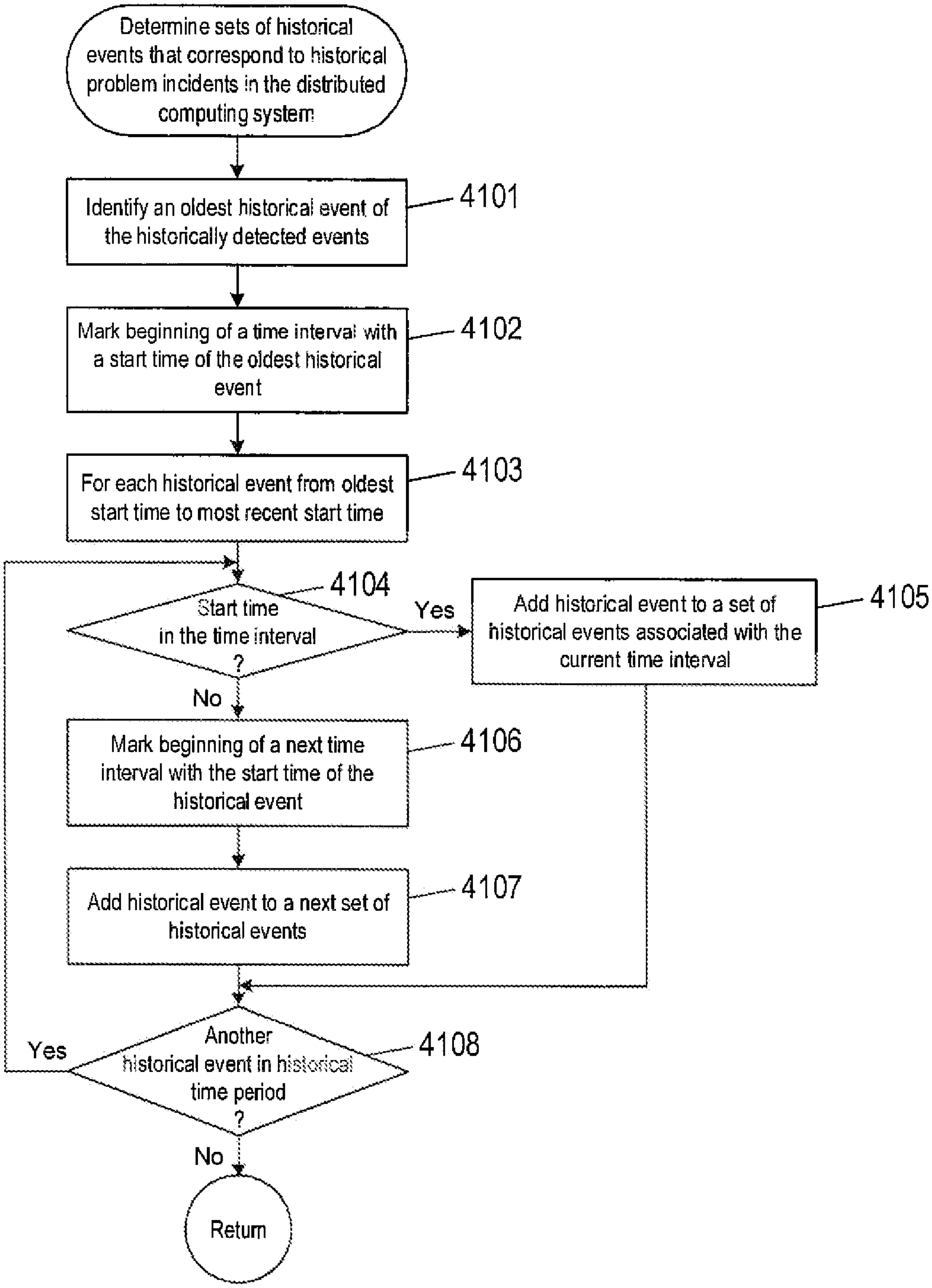
FIG. 41 is a flow diagram illustrating an example implementation of the "determine sets of historical events that correspond to historical problem incidents in the distributed computing system" procedure performed in FIG. 39.

FIG. 41 is a flow diagram illustrating an example implementation of the "determine sets of historical events that correspond to historical problem incidents in the distributed computing system" procedure performed in block 4002. In block 4101, the oldest historical event of the historically detected events in a historical time period is identified. In block 4102, mark beginning of a time interval with a start time of the oldest historical event. A for loop beginning in block 4103 repeats the computational operations represented by blocks 4104-4107 for each historical event in the historical time period from the oldest to the most recent historical event. In decision block 4104, when the start time of the historical event is in the time interval control flows to block 4105. In block 4105, the historical event is added to the set of historical events associated with the current time interval. In block 4106, mark beginning of a next time interval with the start time of the historical event. In block

4107, the historical event is added to a next set of historical events. In decision block 4108, blocks 4104-4107 are repeated for another historical event in the historical time period.

Figure 42:
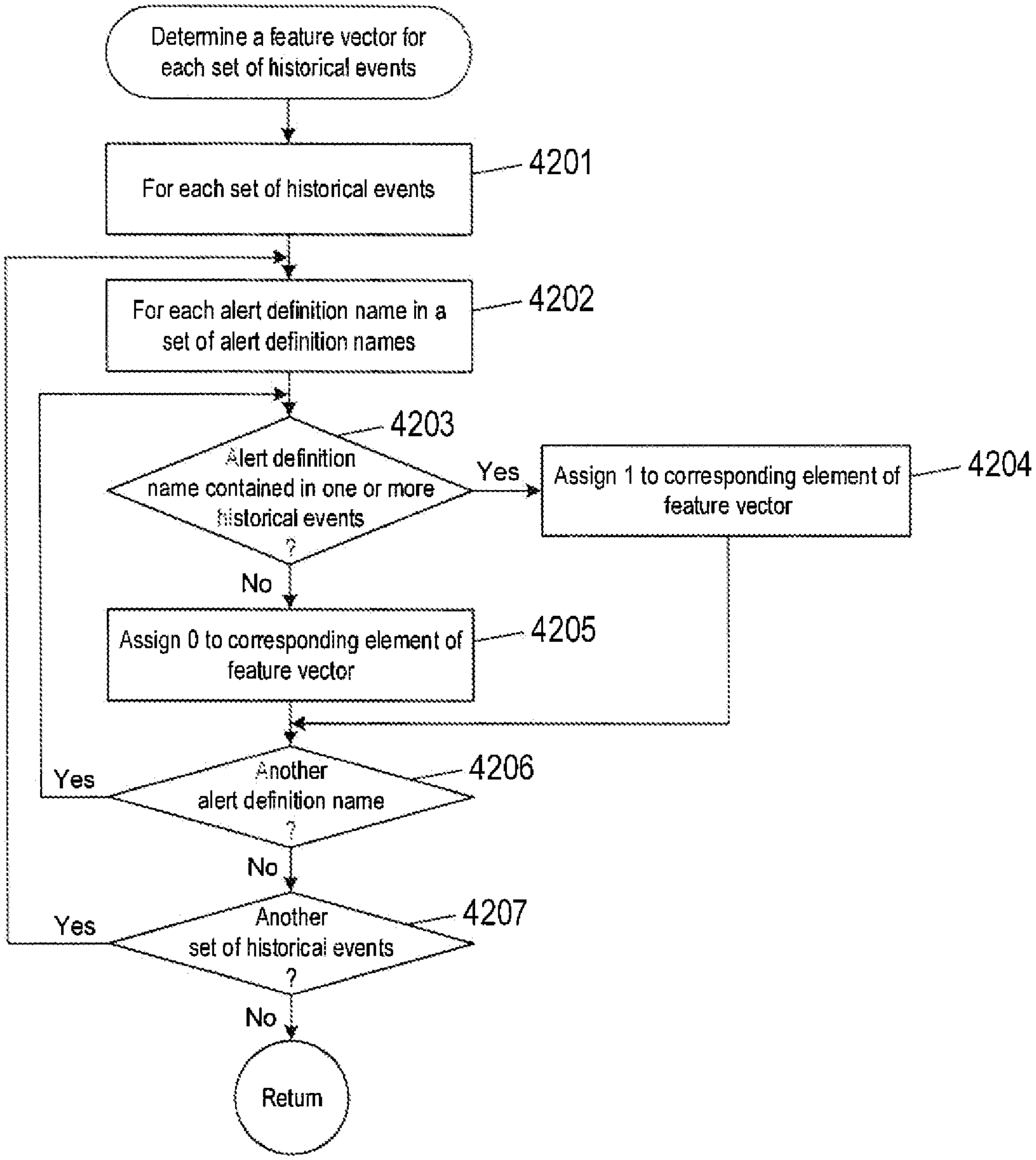
FIG. 42 is a flow diagram illustrating an example implementation of the "determine a feature vector for each set of historical events" procedure performed in FIG. 39.

FIG. 42 is a flow diagram illustrating an example implementation of the "determine a feature vector for each set of historical events" procedure performed in block 4003. A for loop beginning with block 4201 repeats the computational operations represented by blocks 4202-4206 for each set of historical events obtained in block 4002 of FIG. 40. A loop beginning with block 4202 repeats the computational operations represented by blocks 4203-4205 for each alert definition name in set of alert definitions. In decision block 4203, when an alert definition name is contained in one or more historical events, control flows to block 4204. Otherwise, control flows to block 4205. In block 4204, the value 1 is assigned to a corresponding element of a feature vector. In block 4205, the value 0 is assigned to a corresponding element of a feature vector. In decision block 4206, blocks 4203-4205 are repeated for another alert definition name. In decision block 4207, blocks 4202-4206 are repeated for another set of historical events.

Figure 43:
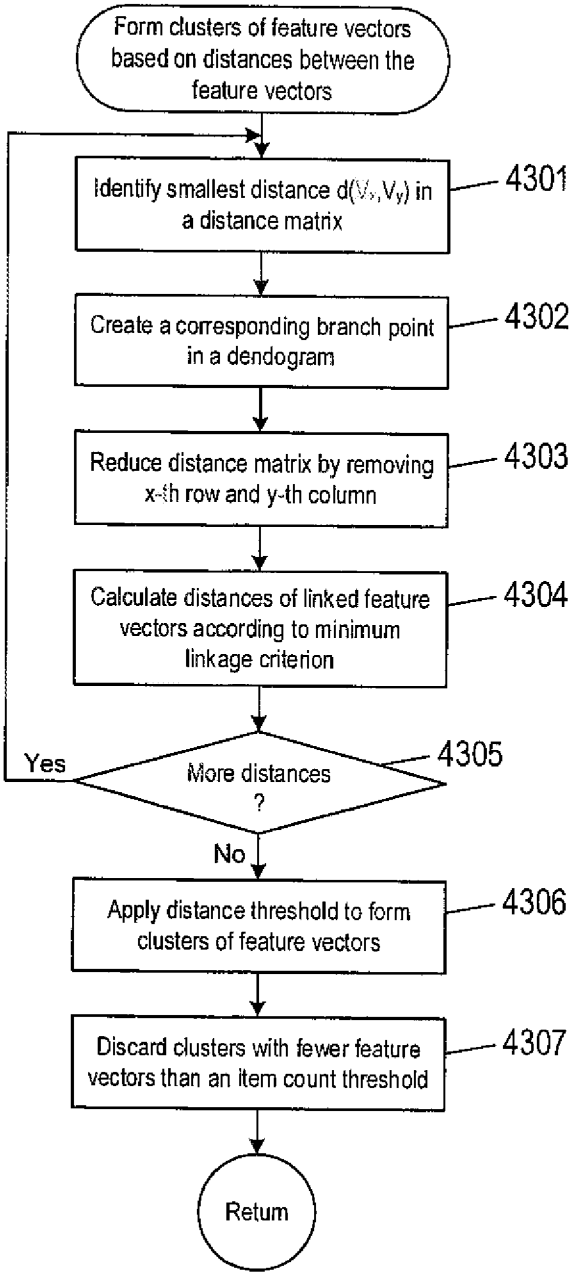
FIG. 43 is a flow diagram illustrating an example implementation of the "form clusters of feature vectors based on distances between the feature vectors" procedure performed in FIG. 39.

FIG. 43 is a flow diagram illustrating an example implementation of the "form clusters of feature vectors based on distances between the feature vectors" procedure performed in block 4004. In block 4301, a smallest distance in a distance matrix d ($V_x$, $V_y$) is identified as described above with reference to FIG. 32A. In block 4302, a corresponding branch point is created in a dendrogram. In block 4303, the distance matrix is reduced by removing the x-th row and y-column. In block 4304, distances of linked feature vectors are calculated according to the minimum linkage criterion described above with reference to FIG. 32C. In decision block 4305, when more distances are in the distance matrix control returns to block 4301. Otherwise control flows to block 4306. In block 4306, a distance threshold is applied to form clusters of feature vectors as described above with reference to FIG. 32L. In block 4307, clusters with fewer feature vectors than an item count threshold are discarded as described above with reference to FIG. 33.

Figure 44:
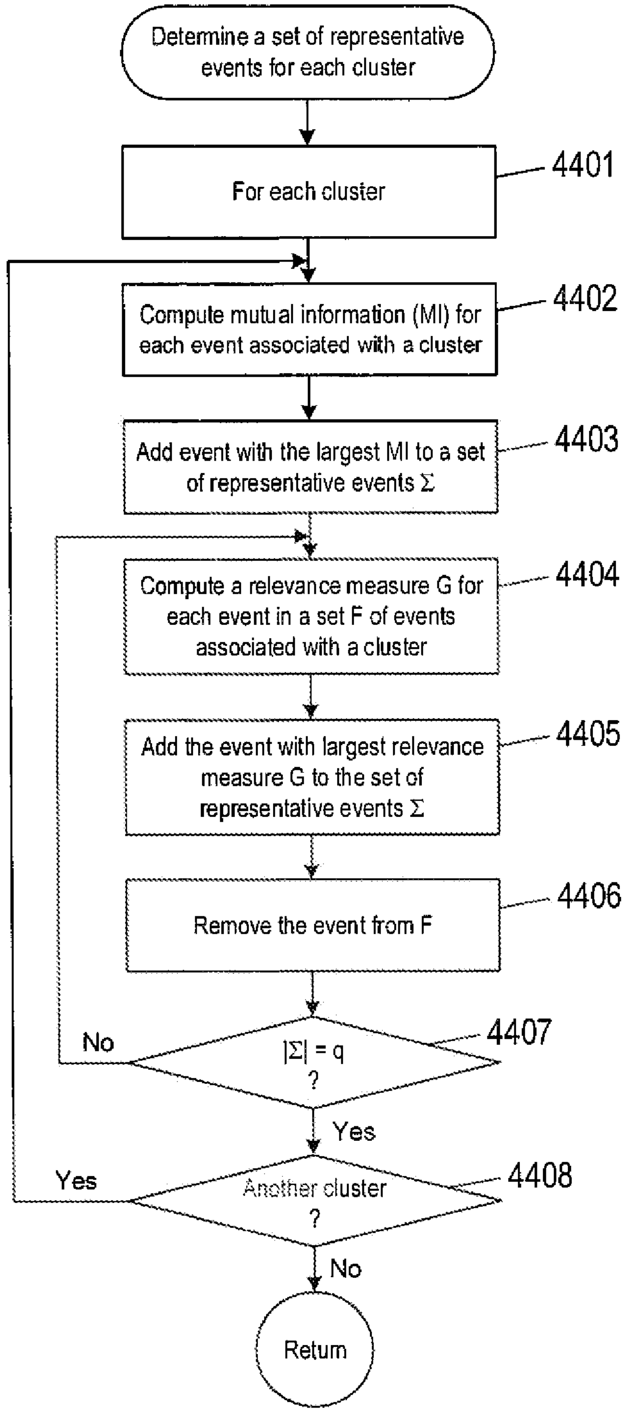
FIG. 44 is a flow diagram illustrating an example implementation of the "determine a set of representative events for each cluster" procedure performed in FIG. 40.

FIG. 44 is a flow diagram illustrating an example implementation of the "determine a set of representative events for each cluster" procedure performed in block 4007. A for-loop beginning with block 4401 repeats the computational operations represented by blocks 4402-4408 for each cluster. In block 4402, mutual information ("MI") is computed for each event in a set of events, F, associated with a cluster as described above with reference to Equation (10b). In block 4403, the event with largest MI is added to a set of representative events E and removed from the set of events F. In block 4404, a relevance measure G is computed for each event in the set of events F. In block 4405, the event with the largest relevance measure is added to the set of representative events Σ. In block 4406, the event is removed from the set of events F. In decision block 4407, the operations represented by blocks 4404-4406 are repeated until the cardinality of the set of representative events E equals a user selected number of events q. In decision block 4408, the operations represented by blocks 4402-4407 are repeated for another cluster.

Figure 45:
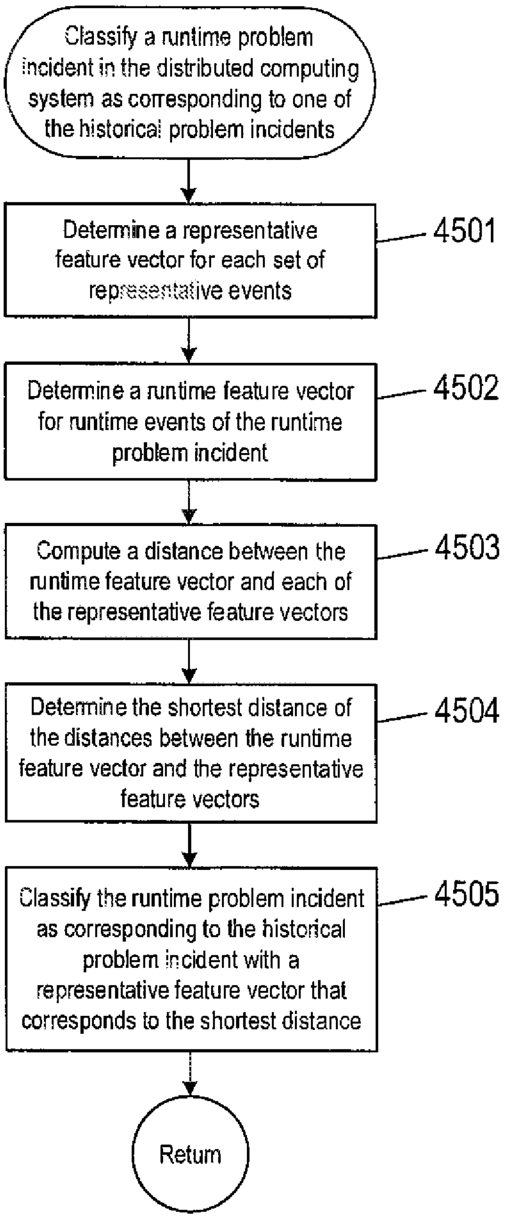
FIG. 45 is a flow diagram illustrating an example implementation of a "classify a runtime problem incident in the distributed computing system as corresponding to one of the historical problem incidents" procedure performed in FIG. 39.

FIG. 45 is a flow diagram illustrating an example implementation of the "classify a runtime problem incident in the distributed computing system as corresponding to one of the historical problem incidents" procedure performed in block 3903. In block 4501, a representative feature vector is determined for each set of representative events as described above with reference to FIG. 29. In block 4502, a runtime feature vector is determined for runtime events of the runtime problem incident as described above with reference to FIG. 29. In block 4503, a distance is computed between the runtime feature vector and each of the representative feature vectors as described above with reference to Equations (7a)-(7b) or Equation (7c). In block 4504, the shortest distance of the distances between the runtime feature vector and the representative feature vectors is determined as described above with reference to Equation (12). In block 4505, the runtime problem incident is classified as corresponding to the historical problem incident with a representative feature vector that corresponds to the shortest distance determined in block 4504.

It is appreciated that the previous description of the disclosed embodiments is provided to enable any person skilled in the art to make or use the present disclosure. Various modifications to these embodiments will be apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method stored in one or more data-storage devices and executed using one or more processors of a computer system for discovering problem incidents in a distributed computing system, the method comprising:

determining sets of representative events of historical problem incidents for the distributed computing system;

determining a representative feature vector for each set of representative events;

determining a runtime feature vector for runtime events of a runtime problem incident;

classifying the runtime problem incident as corresponding to a historical problem incident with a representative feature vector that is closest to the runtime feature vector; and applying remedial measures to correct the runtime problem incident based on remedial measures used to correct the historical problem incident.

2. The method of claim 1 wherein determining representative events of the historical problem incidents for the distributed computing system comprises:

retrieving historically detected events that occurred in the distributed computing system and in a historical time period from a database;

determining sets of historical events that correspond to problem incidents in the distributed computing system;

determining a feature vector for each set of historical events;

forming clusters of feature vectors based on distances between the feature vectors;

determining a score for each cluster;

discarding clusters with scores below a cluster threshold; and determining a set of representative events for each cluster above the cluster threshold.

3. The method of claim 2 wherein determining the sets of historical events comprise:

identifying the oldest historical event of historically detected events in the historical time period;

marking a beginning of a time interval with a start time of the oldest historical event; and for each historical event in the historical time period from the oldest to the most recent historical event, when the start time of the historical event is in the time interval adding the historical event to the set of historical events associated with the current time interval, and when the start time of the historical event is not in the time interval, marking a beginning of a next time interval with the start time of the historical event, and adding the historical event to a next set of historical events.

4. The method of claim 2 wherein determining the feature vector for each set of historical events comprises:

for each set of historical events, for each alert definition name in a set of alert definitions, when an alert definition name is contained in one or more historical events assigning a value 1 to a corresponding element of a feature vector, and when an alert definition name is contained in one or more historical events assigning a value 0 to a corresponding element of a feature vector.

5. The method of claim 2 wherein forming clusters of feature vectors based on distances between the feature vectors comprises:

identifying the smallest distance in a distance matrix between the feature vectors;

creating a corresponding branch point in a dendrogram;

removing a row and column of the distance matrix that correspond to the smallest distance;

distances of linked feature vectors are calculated according to a minimum linkage criterion;

applying a distance threshold to form clusters of feature vectors in the dendrogram; and discarding clusters of feature vectors with fewer feature vectors than an item count threshold.

6. The method of claim 2 wherein determining the set of representative events for each cluster comprises:

for each cluster, computing mutual information for each event in a set of events associated with the;

adding the event with largest mutual information to a set of representative events;

removing the event from the set of events;

computing a relevance measure for each event in the set of events;

adding the event with the largest relevance measure to the set of representative events; and removing the event from the set of events.

7. The method of claim 1 wherein classifying the runtime problem incident in the distributed computing system as corresponding to the historical problem incident comprises:

computing a distance between the runtime feature vector and each of the representative feature vectors;

determining the shortest distance of the distances between the runtime feature vector and the representative feature vectors; and classifying the runtime problem incident as corresponding to the historical problem incident with a representative feature vector that corresponds to the shortest distance.

8. A computer system for discovering problem incidents in a distributed computing system, the system comprising:

one or more processors;

one or more data-storage devices; and machine-readable instructions stored in the one or more data-storage devices that when executed using the one or more processors controls the system to execute operations comprising:

retrieving sets of historical problem incidents of the distributed computing system from the one or more data-storage devices;

determining representative feature vectors for representative events of the historical problem incidents;

determining a runtime feature vector for runtime events of a runtime problem incident in the distributed computing system;

classifying the runtime problem as corresponding to one of the historical problem incidents with a representative feature vector that is closest to the runtime feature vector; and applying remedial measures to correct the runtime problem incident based on remedial measures used to correct the historical problem incident.

9. The computer system of claim 8 wherein determining representative events of the historical problem incidents for the distributed computing system comprises:

retrieving historically detected events that occurred in the distributed computing system and in a historical time period from a database;

determining sets of historical events that correspond to problem incidents in the distributed computing system;

determining a feature vector for each set of historical events;

forming clusters of feature vectors based on distances between the feature vectors;

determining a score for each cluster;

discarding clusters with scores below a cluster threshold; and determining a set of representative events for each cluster above the cluster threshold.

10. The computer system of claim 9 wherein determining the sets of historical events comprise:

identifying the oldest historical event of historically detected events in the historical time period;

marking a beginning of a time interval with a start time of the oldest historical event; and for each historical event in the historical time period from the oldest to the most recent historical event, when the start time of the historical event is in the time interval adding the historical event to the set of historical events associated with the current time interval, and when the start time of the historical event is not in the time interval, marking a beginning of a next time interval with the start time of the historical event, and adding the historical event to a next set of historical events.

11. The computer system of claim 9 wherein determining the feature vector for each set of historical events comprises:

for each set of historical events, for each alert definition name in a set of alert definitions, when an alert definition name is contained in one or more historical events assigning a value 1 to a corresponding element of a feature vector, and when an alert definition name is contained in one or more historical events assigning a value 0 to a corresponding element of a feature vector.

12. The computer system of claim 9 wherein forming clusters of feature vectors based on distances between the feature vectors comprises:

identifying the smallest distance in a distance matrix between the feature vectors;

creating a corresponding branch point in a dendrogram;

removing a row and column of the distance matrix that correspond to the smallest distance;

distances of linked feature vectors are calculated according to a minimum linkage criterion;

applying a distance threshold to form clusters of feature vectors in the dendrogram; and discarding clusters of feature vectors with fewer feature vectors than an item count threshold.

13. The computer system of claim 9 wherein determining the set of representative events for each cluster comprises:

for each cluster, computing mutual information for each event in a set of events associated with the;

adding the event with largest mutual information to a set of representative events;

removing the event from the set of events;

computing a relevance measure for each event in the set of events;

adding the event with the largest relevance measure to the set of representative events; and removing the event from the set of events.

14. The computer system of claim 8 wherein classifying the runtime problem incident in the distributed computing system as corresponding to one of the historical problem incidents comprises:

computing a distance between the runtime feature vector and each of the representative feature vectors;

determining the shortest distance of the distances between the runtime feature vector and the representative feature vectors; and classifying the runtime problem incident as corresponding to the historical problem incident with a representative feature vector that corresponds to the shortest distance.

15. A non-transitory computer-readable medium encoded with machine-readable instructions that when executed by one or more processors of a computer system perform operations comprising:

determining set of representative events of historical problem incidents for a distributed computing system;

determining a representative feature vector for each set of representative events;

determining a runtime feature vector for runtime events of a runtime problem incident;

classifying the runtime problem incident as corresponding to a historical problem incident with a representative feature vector that is closest to the runtime feature vector; and applying remedial measures to correct the runtime problem incident based on remedial measures used to correct the historical problem incident.

16. The medium of claim 15 wherein determining representative events of the historical problem incidents for the distributed computing system comprises:

retrieving historically detected events that occurred in the distributed computing system and in a historical time period from a database;

determining sets of historical events that correspond to problem incidents in the distributed computing system;

determining a feature vector for each set of historical events;

forming clusters of feature vectors based on distances between the feature vectors;

determining a score for each cluster;

discarding clusters with scores below a cluster threshold; and determining a set of representative events for each cluster above the cluster threshold.

17. The medium of claim 16 wherein determining the sets of historical events comprise:

identifying the oldest historical event of historically detected events in the historical time period;

marking a beginning of a time interval with a start time of the oldest historical event; and for each historical event in the historical time period from the oldest to the most recent historical event, when the start time of the historical event is in the time interval adding the historical event to the set of historical events associated with the current time interval, and when the start time of the historical event is not in the time interval, marking a beginning of a next time interval with the start time of the historical event, and adding the historical event to a next set of historical events.

18. The medium of claim 16 wherein determining the feature vector for each set of historical events comprises:

for each set of historical events, for each alert definition name in a set of alert definitions, when an alert definition name is contained in one or more historical events assigning a value 1 to a corresponding element of a feature vector, and when an alert definition name is contained in one or more historical events assigning a value 0 to a corresponding element of a feature vector.

19. The medium of claim 16 wherein forming clusters of feature vectors based on distances between the feature vectors comprises:

identifying the smallest distance in a distance matrix between the feature vectors;

creating a corresponding branch point in a dendrogram;

removing a row and column of the distance matrix that correspond to the smallest distance;

distances of linked feature vectors are calculated according to a minimum linkage criterion;

applying a distance threshold to form clusters of feature vectors in the dendrogram; and discarding clusters of feature vectors with fewer feature vectors than an item count threshold.

20. The medium of claim 16 wherein determining the set of representative events for each cluster comprises:

for each cluster, computing mutual information for each event in a set of events associated with the;

adding the event with largest mutual information to a set of representative events;

removing the event from the set of events;

computing a relevance measure for each event in the set of events;

adding the event with the largest relevance measure to the set of representative events; and removing the event from the set of events.

21. The medium of claim 15 wherein classifying the runtime problem incident in the distributed computing system as corresponding to the historical problem incident comprises:

computing a distance between the runtime feature vector and each of the representative feature vectors;

determining the shortest distance of the distances between the runtime feature vector and the representative feature vectors; and classifying the runtime problem incident as corresponding to the historical problem incident with a representative feature vector that corresponds to the shortest distance.

* * * * *